(12) United States Patent
Jiao et al.

(10) Patent No.: US 12,127,188 B2
(45) Date of Patent: Oct. 22, 2024

(54) METHOD FOR DETERMINING CHANNEL STATE INFORMATION REFERENCE SIGNAL RESOURCE MAPPING AND APPARATUS

(71) Applicant: Huawei Technologies Co., Ltd., Shenzhen (CN)

(72) Inventors: Chunxu Jiao, Shanghai (CN); Zhengzheng Xiang, Shanghai (CN); Wenting Guo, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 17/657,042

(22) Filed: Mar. 29, 2022

(65) Prior Publication Data

US 2022/0240280 A1   Jul. 28, 2022

Related U.S. Application Data

(63) Continuation of application No. PCT/CN2019/115720, filed on Nov. 5, 2019.

(30) Foreign Application Priority Data

Sep. 30, 2019   (WO) ................ PCT/CN2019/109395

(51) Int. Cl.
*H04W 72/1263*   (2023.01)
*H04L 1/00*   (2006.01)
(Continued)

(52) U.S. Cl.
CPC ....... *H04W 72/1263* (2013.01); *H04L 1/0061* (2013.01); *H04L 5/0051* (2013.01);
(Continued)

(58) Field of Classification Search
None
See application file for complete search history.

(56) References Cited

U.S. PATENT DOCUMENTS 10,412,754 B2 *   9/2019   Khoryaev ......... H04W 72/1263
10,693,606 B2 *   6/2020   Cha .......................... H04L 5/00
(Continued)

FOREIGN PATENT DOCUMENTS

CN   107852294 A   3/2018
CN   108111269 A   6/2018
(Continued)

OTHER PUBLICATIONS

ZTE, "On CSI-RS for CSI acquisition", 3GPP TSG RAN WG1 Meeting #90, R1-1712303, Prague, Czechia, Aug. 21-25, 2017, 6 pages.
(Continued)

*Primary Examiner* — Melvin H Pollack
(74) *Attorney, Agent, or Firm* — Slater Matsil, LLP

(57) ABSTRACT

This application provide a method, includes: receiving first information, where the first information is included in sidelink control information (SCI); obtaining a cyclic redundancy check, CRC, code based on the first information; and obtaining the reference signal sequence of the channel state information reference signal, CSI-RS, based on a scrambling identity, where the scrambling identity is L least significant bits of the CRC code or L most significant bits of the CRC code and L is a positive integer.

20 Claims, 16 Drawing Sheets

(51) Int. Cl.
*H04L 5/00* (2006.01)
*H04L 27/26* (2006.01)
*H04W 72/0446* (2023.01)
*H04W 72/0453* (2023.01)
*H04W 72/20* (2023.01)
*H04W 72/542* (2023.01)

(52) U.S. Cl.
CPC ... *H04L 27/26025* (2021.01); *H04W 72/0446* (2013.01); *H04W 72/0453* (2013.01); *H04W 72/20* (2023.01); *H04W 72/542* (2023.01)

(56) References Cited

U.S. PATENT DOCUMENTS

| | | | |
|---|---|---|---|
| 11,233,607 B2* | 1/2022 | He | H04L 5/0055 |
| 11,233,613 B2* | 1/2022 | Tang | H04L 5/0094 |
| 11,246,148 B2* | 2/2022 | Li | H04W 72/20 |
| 11,368,265 B2* | 6/2022 | Pawar | H04L 5/0048 |
| 11,382,083 B2* | 7/2022 | Guo | H04W 88/023 |
| 11,405,896 B2* | 8/2022 | Zhao | H04L 27/2613 |
| 11,432,369 B2* | 8/2022 | Xiong | H04L 5/0091 |
| 11,575,484 B2* | 2/2023 | Noh | H04W 72/541 |
| 11,576,059 B2* | 2/2023 | Kimura | H04W 4/40 |
| 11,616,616 B2* | 3/2023 | Werner | H04L 1/1861 370/329 |
| 11,616,618 B2* | 3/2023 | Baldemair | H04L 5/0048 370/330 |
| 11,659,544 B2* | 5/2023 | Yeo | H04W 72/56 370/329 |
| 11,683,812 B2* | 6/2023 | Dahlman | H04L 5/0098 370/329 |
| 11,700,601 B2* | 7/2023 | Lee | H04W 52/367 370/329 |
| 11,723,038 B2* | 8/2023 | Yi | H04W 72/23 370/329 |
| 11,757,498 B2* | 9/2023 | Baldemair | H04L 1/1812 370/329 |
| 11,838,132 B2* | 12/2023 | Yeo | H04L 1/1812 |
| 11,864,181 B2* | 1/2024 | Hong | H04L 5/0058 |
| 11,876,747 B2* | 1/2024 | Lee | H04L 1/1864 |
| 11,929,835 B2* | 3/2024 | Guthmann | H04L 5/0053 |
| 11,950,225 B2* | 4/2024 | Lei | H04W 52/0235 |
| 11,979,853 B2* | 5/2024 | Agiwal | H04W 68/005 |
| 12,010,053 B2* | 6/2024 | Khoryaev | H04L 5/06 |
| 12,022,503 B2* | 6/2024 | Park | H04L 43/16 |
| 12,028,832 B2* | 7/2024 | Zhang | H04W 72/0453 |
| 12,028,877 B2* | 7/2024 | Wang | H04W 76/28 |
| 12,035,164 B2* | 7/2024 | Lee | H04L 5/0057 |
| 12,035,298 B2* | 7/2024 | Zhang | H04L 1/1614 |
| 12,041,656 B2* | 7/2024 | Zhang | H04W 72/20 |
| 12,052,743 B2* | 7/2024 | Panteleev | H04L 5/0053 |
| 12,058,649 B2* | 8/2024 | Zhou | H04L 5/0053 |
| 12,058,655 B2* | 8/2024 | Chae | H04W 72/0446 |
| 12,068,820 B2* | 8/2024 | Chae | H04L 5/005 |
| 2018/0234278 A1 | 8/2018 | Xu et al. | |
| 2019/0109761 A1 | 4/2019 | Frenne et al. | |
| 2021/0068101 A1* | 3/2021 | Chen | H04L 1/0072 |
| 2021/0135810 A1* | 5/2021 | Yamada | H04W 16/28 |
| 2021/0168858 A1* | 6/2021 | Liu | H04W 72/23 |
| 2021/0194652 A1* | 6/2021 | Khoryaev | H04L 5/06 |
| 2021/0235508 A1* | 7/2021 | Liu | H04W 74/0833 |
| 2021/0314750 A1* | 10/2021 | Nguyen | H04W 72/20 |
| 2021/0377893 A1* | 12/2021 | Khoryaev | H04L 5/0053 |
| 2021/0377976 A1* | 12/2021 | Karaki | H04L 5/0048 |
| 2022/0060215 A1* | 2/2022 | Nakamura | H04W 72/21 |
| 2022/0070894 A1* | 3/2022 | Parkvall | H04B 7/0695 |
| 2022/0140964 A1* | 5/2022 | Chen | H04L 5/0048 370/330 |
| 2022/0159674 A1* | 5/2022 | Deng | H04W 72/566 |
| 2022/0174779 A1* | 6/2022 | Zhang | H04W 72/0446 |
| 2022/0240280 A1* | 7/2022 | Jiao | H04W 72/0446 |
| 2022/0321291 A1* | 10/2022 | Yoshioka | H04W 72/0446 |
| 2023/0180206 A1* | 6/2023 | Wu | H04W 72/20 370/329 |
| 2023/0224931 A1* | 7/2023 | Kim | H04W 56/002 370/329 |
| 2024/0007996 A1* | 1/2024 | Wang | H04W 76/14 |
| 2024/0063978 A1* | 2/2024 | Falkenberg | H04W 72/23 |
| 2024/0089982 A1* | 3/2024 | Lee | H04W 72/1263 |
| 2024/0106572 A1* | 3/2024 | Parkvall | H04L 1/1671 |
| 2024/0114496 A1* | 4/2024 | Huang | H04B 7/15542 |
| 2024/0130000 A1* | 4/2024 | Hong | H04W 76/10 |
| 2024/0155460 A1* | 5/2024 | Back | H04W 40/12 |
| 2024/0236744 A1* | 7/2024 | Baldemair | H04B 7/0695 |
| 2024/0267185 A1* | 8/2024 | Eriksson | H04L 5/0094 |

FOREIGN PATENT DOCUMENTS

| | | | | |
|---|---|---|---|---|
| CN | 108111273 A | | 6/2018 | |
| CN | 109565363 A | | 4/2019 | |
| CN | 110198207 A | | 9/2019 | |
| EP | 3890415 A1 | * | 10/2021 | ........... H04L 5/0007 |
| KR | 20210111845 A | * | 5/2020 | |
| KR | 20200052892 A | * | 9/2021 | |
| WO | 2014046516 A1 | | 3/2014 | |
| WO | 2018201908 A1 | | 11/2018 | |

OTHER PUBLICATIONS

Huawei et al., "Sidelink reference signal design for NR V2X", 3GPP TSG RAN WG1 Meeting #97, R1-1906009, Reno, NV, US, May 13-17, 2019, 11 pages.
3GPP TS 38.211 V15.7.0 (Sep. 2019), 3rd Generation Partnership Project; Technical Specification Group Radio Access Network; NR; Physical channels and modulation (Release 15), 97 pages.
3GPP TS 38.331 V15.7.0 (Sep. 2019), 3rd Generation Partnership Project; Technical Specification Group Radio Access Network; NR; Radio Resource Control (RRC) protocol specification (Release 15), 527 pages.
Samsung et al., "Remaining issues on NR CSI-RS", 3GPP TSG RAN WG1 Meeting #89, R1-1707981, Hangzhou, China, May 15-19, 2017, 15 pages.
NTT Docomo, Inc., "Sidelink physical layer structure for NR V2X", 3GPP TSG RAN WG1 #98, R1-1909185, Prague, CZ, Aug. 26-30, 2019, 13 pages.
3GPP TS 38.212 V15.7.0 (Sep. 2019), 3rd Generation Partnership Project; Technical Specification Group Radio Access Network; NR; Multiplexing and channel coding (Release 15), 101 pages.
3GPP TS 38.213 V15.7.0 (Sep. 2019), 3rd Generation Partnership Project; Technical Specification Group Radio Access Network; NR; Physical layer procedures for control (Release 15), 108 pages.
3GPP TS 38.214 V15.7.0 (Sep. 2019), 3rd Generation Partnership Project; Technical Specification Group Radio Access Network; NR; Physical layer procedures for data (Release 15), 106 pages.
TSG-RAN WG1 NR Ad-Hoc#2 R1-1711303, "On the CSI-RS configurations for NR CSI acquisition", Nokia, Alcatel-Lucent Shanghai Bell, Jun. 27-30, 2017, Qingdao, P.R. China, total 5 pages.
NTT Docomo, Inc. "Sidelink physical layer structure for NR V2X", 3GPP TSG RAN WG1 #98, R1-1909185, Aug. 26-30, 2019, 14 pages, Prague, CZ.
Huawei et al., "Sidelink CSI", 3GPP TSG RAN WG1 Meeting #98, R1-1909438, Aug. 26-30, 2019, 9 pages, Prague, Czech Republic.
Ericsson, "PHY layer structure for NR sidelink", 3GPP TSG-RAN WG1 Meeting #98, R1-1908911, Aug. 26-30, 2019, 21 Pages, Prague, CZ.

* cited by examiner

METHOD FOR DETERMINING CHANNEL STATE INFORMATION REFERENCE SIGNAL RESOURCE MAPPING AND APPARATUS

CROSS-REFERENCE TO RELATED APPLICATIONS

This application is a continuation of International Application No. PCT/CN2019/115720, filed on Nov. 5, 2019, which claims priority to International Application No. PCT/CN2019/109395, filed on Sep. 30, 2019. The disclosures of the aforementioned applications are hereby incorporated by reference in their entireties.

TECHNICAL FIELD

Embodiments of this application relate to the field of wireless communication, and in particular, to a method for determining channel state information reference signal (CSI-RS) resource mapping and an apparatus.

BACKGROUND

In the past decades, a wireless communications system underwent technical evolution from a first-generation analog communications system to a new radio (NR) system, but requirements of systems of various generations for channel state information (CSI) have never changed. At a signal transmit end, the CSI may be used to calculate a transmit parameter, thereby optimizing usage efficiency of a radio channel based on the transmit parameter. At a signal receive end, the CSI may be used to implement correct signal reception.

For example, in an NR system, a channel state information reference signal (CSI-RS) may be transmitted through a radio link connection (for example, a Uu link) between a base station (BS) and user equipment (UE). A specific process is as follows: The base station sends configuration information of the CSI-RS to the UE, the UE receives the configuration information, from the base station, of the CSI-RS, and determines a time-frequency resource of the CSI-RS based on the configuration information of the CSI-RS, the base station sends the CSI-RS to the UE on the time-frequency resource of the CSI-RS, and the UE receives the CSI-RS from the base station on the time-frequency resource of the CSI-RS, and measures and calculates the received CSI-RS to obtain CSI. On the Uu link, the time-frequency resource of the CSI-RS is relatively flexible, and the CSI-RS supports a relatively large quantity of code division multiplexing (CDM) types. Therefore, the configuration information of the CSI-RS needs to be used to indicate a relatively large quantity of pieces of parameter information (for example, a port quantity corresponding to the CSI-RS, a frequency-domain density corresponding to the CSI-RS, a CDM type corresponding to the CSI-RS, and a frequency domain bandwidth corresponding to the CSI-RS).

In the NR system, in addition to the Uu link, there is a radio link connection (for example, a sidelink (SL)) between user equipment. The UE also needs to transmit an SL CSI-RS through the SL. Therefore, the SL CSI-RS may be transmitted by referring to the foregoing method for transmitting the CSI-RS on the Uu link. However, on the SL, a port quantity corresponding to the SL CSI-RS and/or a CDM type corresponding to the SL CSI-RS are/is limited, and transmitting the SL CSI-RS by using the foregoing method for transmitting the CSI-RS on the Uu link causes relatively high signaling overheads.

SUMMARY

Embodiments of this application provide a method for determining channel state information reference signal resource mapping and an apparatus, to resolve a problem of high signaling overheads of channel state information reference signal transmission in a communication scenario in which a port quantity corresponding to a channel state information reference signal and/or a CDM type corresponding to a channel state information reference signal are/is limited.

To achieve the foregoing objective, the following methods are used in the embodiments of this application.

According to a first aspect, an embodiment of this application provides a method for determining channel state information reference signal resource mapping. The method includes: receiving, by a first terminal device, configuration information from a second terminal device or a network device, where the configuration information includes a port quantity corresponding to a channel state information reference signal and a frequency-domain density corresponding to the channel state information reference signal, and the frequency-domain density is an average quantity of resource elements REs occupied on a resource block RB by each port corresponding to the channel state information reference signal; determining, by the first terminal device, a first parameter set based on the port quantity and the frequency-domain density, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group; and determining, by the first terminal device based on the first parameter set, a resource that is on a data channel of the second terminal device and that is used to map the channel state information reference signal and a mapping value on an RE in the resource that is on the data channel and that is used to map the channel state information reference signal.

According to the method provided in the first aspect, the first terminal device may receive the configuration information from the second terminal device. The configuration information includes the port quantity corresponding to the channel state information reference signal and the frequency-domain density corresponding to the channel state information reference signal. After receiving the port quantity and the frequency-domain density, the first terminal device may determine the first parameter set based on the port quantity of and the frequency-domain density, and determine, based on the first parameter set, the resource that is on the data channel of the second terminal device and that is used to map the channel state information reference signal and the mapping value on the RE in the resource that is on the data channel and that is used to map the channel state information reference signal. In this way, the configuration information does not need to include information such as a CDM type corresponding to the channel state information reference signal and a frequency domain bandwidth corresponding to the channel state information reference signal, but the first terminal device can also determine the resource that is on the data channel of the second terminal device and that is used to map the CSI-RS and the mapping value on the RE in the resource that is on the data channel and that is used to map the channel state information reference signal, so that signaling overheads are reduced.

In a possible implementation, the method further includes: receiving, by the first terminal device, the data channel from the second terminal device, and performing channel estimation based on the resource used to map the channel state information reference signal and the mapping value on the RE in the resource used to map the channel state information reference signal. Based on the foregoing method, the first terminal device may receive the data channel from the second terminal device, and perform channel estimation based on the resource used to map the channel state information reference signal and the mapping value on the RE in the resource used to map the channel state information reference signal. Subsequently, correct signal reception can be implemented based on a result of the channel estimation.

In a possible implementation, the determining, by the first terminal device based on the first parameter set, a mapping value on an RE in the resource that is on the data channel of the second terminal device and that is used to map the channel state information reference signal includes: the mapping value on the RE in the resource that is on the data channel of the second terminal device and that is used to map the channel state information reference signal satisfies: $a_{k,l}^{(p,\mu)} = \beta_{CSIRS} w_f(k')r(m')$, where $a_{k,l}^{(p,\mu)}$ represents a mapping value on an RE corresponding to a time domain resource number l, a frequency domain resource number k, a space domain resource number p, and a subcarrier spacing number μ, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'^{th}$ element in a reference signal sequence of the channel state information reference signal, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of an RB, α is an intermediate variable calculated based on the port quantity and the frequency-domain density, $\lfloor \ \rfloor$ represents rounding down, $\lceil \ \rceil$ represents rounding up, ρ represents the frequency-domain density, $\bar{k}$ represents a frequency domain resource starting point of the code division multiplexing group, and $N_{sc}^{RB}$ represents a quantity of subcarriers in an RB. Based on the foregoing method, the first terminal device may determine, according to the foregoing formula, the mapping value on the RE in the resource used to map the channel state information reference signal. In addition, when the port quantity is greater than or equal to 2, and the frequency-domain density is greater than or equal to 2, the channel state information reference signal sequence may be properly used, to improve detection performance of the channel state information reference signal sequence.

In a possible implementation, the first terminal device maintains a first mapping table, and the first mapping table includes a mapping relationship between both at least one port quantity and at least one frequency-domain density and at least one first parameter set; and the determining, by the first terminal device, a first parameter set based on the port quantity and the frequency-domain density includes: obtaining, by the first terminal device, the first parameter set through table lookup based on the port quantity and the frequency-domain density. Based on the foregoing method, the first terminal device may obtain the first parameter set through table lookup based on the port quantity and the frequency-domain density, and the configuration information does not need to include the first parameter set, so that signaling overheads are reduced.

In a possible implementation, the configuration information further includes first indication information, and the first indication information is used to indicate a frequency domain offset; and the determining, by the first terminal device, a first parameter set based on the port quantity and the frequency-domain density includes: determining, by the first terminal device, the first parameter set based on the port quantity, the frequency-domain density, and the frequency domain offset. Based on the foregoing method, the first terminal device may determine the first parameter set based on the port quantity, the frequency-domain density, and the frequency domain offset that is indicated in the configuration information, so that a degree of freedom of a frequency domain resource used to map the channel state information reference signal can be improved.

In a possible implementation, the resource used to map the channel state information reference signal includes a frequency domain resource used to map the channel state information reference signal, a time domain resource used to map the channel state information reference signal, and a space domain resource used to map the channel state information reference signal. Based on the foregoing method, the first terminal device may determine, based on the first parameter set, the mapping value on the RE in the resource corresponding to the frequency domain resource used to map the channel state information reference signal, the time domain resource used to map the channel state information reference signal, and the space domain resource used to map the channel state information reference signal.

In a possible implementation, the time domain resource used to map the channel state information reference signal is the last symbol on the data channel; or the configuration information further includes second indication information, and the second indication information is used to indicate the time domain resource used to map the channel state information reference signal. Based on the foregoing method, the first terminal device may determine that the time domain resource used to map the channel state information reference signal is the last symbol on the data channel, or the first terminal device may determine, based on the second indication information, the time domain resource used to map the channel state information reference signal, thereby determining the mapping value on the RE in the resource that is on the data channel and that is used to map the channel state information reference signal.

In a possible implementation, the method further includes: obtaining, by the first terminal device, the reference signal sequence of the channel state information reference signal based on a scrambling identity. Based on the foregoing method, the first terminal device may obtain the reference signal sequence of the channel state information reference signal based on the scrambling identity. Subsequently, the first terminal device may determine, based on the reference signal sequence of the channel state information reference signal and the first parameter set, the mapping value on the RE in the resource that is on the data channel and that is used to map the channel state information reference signal.

In a possible implementation, the configuration information further includes third indication information, and the third indication information is used to indicate the scrambling identity. Based on the foregoing method, the first terminal device may obtain the scrambling identity based on the third indication information in the configuration information, thereby determining, based on the reference signal sequence of the channel state information reference signal and the first parameter set, the mapping value on the RE in the resource that is on the data channel and that is used to map the channel state information reference signal.

In a possible implementation, the method further includes: receiving, by the first terminal device, control information from the second terminal device, where the control information includes a physical layer source identity and/or a physical layer destination identity; and determining, by the first terminal device, the physical layer source identity or the physical layer destination identity as the scrambling identity. Based on the foregoing method, the first terminal device may determine the scrambling identity based on the physical layer source identity and/or the physical layer destination identity that are/is in the control information, thereby determining, based on the reference signal sequence of the channel state information reference signal and the first parameter set, the mapping value on the RE in the resource that is on the data channel and that is used to map the channel state information reference signal.

In a possible implementation, the method further includes: receiving, by the first terminal device, control information from the second terminal device; obtaining, by the first terminal device, a cyclic redundancy check code based on the control information; and using, by the first terminal device, L least significant bits or L most significant bits of the cyclic redundancy check code as the scrambling code identifier, where L is a positive integer, and L is greater than or equal to 1 and less than or equal to a length of the cyclic redundancy check code. Based on the foregoing method, the first terminal device may obtain the cyclic redundancy check code based on the control information, and obtain the scrambling identity based on the cyclic redundancy check code, thereby determining, based on the reference signal sequence of the channel state information reference signal and the first parameter set, the mapping value on the RE in the resource that is on the data channel and that is used to map the channel state information reference signal.

According to a second aspect, an embodiment of this application provides a method for determining channel state information reference signal resource mapping. The method includes: determining, by a second terminal device, a first parameter set based on a port quantity corresponding to a channel state information reference signal and a frequency-domain density corresponding to the channel state information reference signal, where the frequency-domain density is an average quantity of resource elements REs occupied on a resource block RB by each port corresponding to the channel state information reference signal, and the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group; and determining, by the second terminal device based on the first parameter set, a resource that is on a data channel of the second terminal device and that is used to map the channel state information reference signal and a mapping value on an RE in the resource that is on the data channel and that is used to map the channel state information reference signal.

According to the method provided in the second aspect, the second terminal device may determine the first parameter set based on the port quantity corresponding to the channel state information reference signal and the frequency-domain density corresponding to the channel state information reference signal, and determine, based on the first parameter set, the resource that is on the data channel of the second terminal device and that is used to map the channel state information reference signal and the mapping value on the RE in the resource that is on the data channel and that is used to map the channel state information reference signal. In this way, configuration information does not need to include information such as a CDM type corresponding to the channel state information reference signal and a frequency domain bandwidth corresponding to the channel state information reference signal, so that signaling overheads are reduced.

In a possible implementation, the method further includes: sending, by the second terminal device, the data channel to a first terminal device. Based on the foregoing method, the second terminal device may send the data channel to the first terminal device, so that the first terminal device performs channel estimation based on the resource used to map the channel state information reference signal and the mapping value on the RE in the resource used to map the channel state information reference signal.

In a possible implementation, the method further includes: sending, by the second terminal device, configuration information to a first terminal device. Based on the foregoing method, the second terminal device may send the configuration information to the first terminal device, so that the first terminal device determines the first parameter set based on the port quantity and the frequency-domain density, and determines, based on the first parameter set, the resource that is on the data channel of the second terminal device and that is used to map the channel state information reference signal and the mapping value on the RE in the resource used to map the channel state information reference signal.

In a possible implementation, the determining, by the second terminal device based on the first parameter set, a mapping value on an RE in the resource that is on the data channel of the second terminal device and that is used to map the channel state information reference signal includes: the mapping value on the RE in the resource that is on the data channel of the second terminal device and that is used to map the channel state information reference signal satisfies: where $a_{k,l}^{(p,\mu)}$ represents a mapping value on an RE corresponding to a time domain resource number l, a frequency domain resource number k, a space domain resource number p, and a subcarrier spacing number $\mu$, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'_{th}$ element in a reference signal sequence of the channel state information reference signal, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of an RB, α is an intermediate variable calculated based on the port quantity and the frequency-domain density, $\lfloor \ \rfloor$ represents rounding down, $\lceil \ \rceil$ represents rounding up, ρ represents the frequency-domain density, $\bar{k}$ represents a frequency domain resource starting point of the code division multiplexing group, and $N_{sc}^{RB}$ represents a quantity of subcarriers in an RB. Based on the foregoing method, the second terminal device may determine, according to the foregoing formula, the mapping value on the RE in the resource used to map the channel state information reference signal. In addition, when the port quantity is greater than or equal to 2, and the frequency-domain density is greater than or equal to 2, the channel state information reference signal sequence may be properly used, to improve detection performance of the channel state information reference signal sequence.

In a possible implementation, the second terminal device maintains a first mapping table, and the first mapping table includes a mapping relationship between both at least one port quantity and at least one frequency-domain density and at least one first parameter set; and the determining, by a second terminal device, a first parameter set based on a port quantity and a frequency-domain density includes: obtaining, by the second terminal device, the first parameter set through table lookup based on the port quantity and the frequency-domain density. Based on the foregoing method, the second terminal device may obtain the first parameter set through table lookup based on the port quantity and the frequency-domain density, and the configuration information does not need to include the first parameter set, so that signaling overheads are reduced.

In a possible implementation, the configuration information further includes first indication information, and the first indication information is used to indicate a frequency domain offset; and the determining, by a second terminal device, a first parameter set based on a port quantity and a frequency-domain density includes: determining, by the second terminal device, the first parameter set based on the port quantity, the frequency-domain density, and the frequency domain offset. Based on the foregoing method, the second terminal device may determine the first parameter set based on the port quantity, the frequency-domain density, and the frequency domain offset that is indicated in the configuration information, so that a degree of freedom of a frequency domain resource used to map the channel state information reference signal can be improved.

In a possible implementation, the resource used to map the channel state information reference signal includes a frequency domain resource used to map the channel state information reference signal, a time domain resource used to map the channel state information reference signal, and a space domain resource used to map the channel state information reference signal. Based on the foregoing method, the second terminal device may determine, based on the first parameter set, the mapping value on the RE in the resource corresponding to the frequency domain resource used to map the channel state information reference signal, the time domain resource used to map the channel state information reference signal, and the space domain resource used to map the channel state information reference signal.

In a possible implementation, the time domain resource used to map the channel state information reference signal is the last symbol on the data channel; or the configuration information further includes second indication information, and the second indication information is used to indicate the time domain resource used to map the channel state information reference signal. Based on the foregoing method, the second terminal device may determine that the time domain resource used to map the channel state information reference signal is the last symbol on the data channel, or the second terminal device may determine, based on the second indication information, the time domain resource used to map the channel state information reference signal, thereby determining the mapping value on the RE in the resource that is on the data channel and that is used to map the channel state information reference signal.

In a possible implementation, the method further includes: obtaining, by the second terminal device, the reference signal sequence of the channel state information reference signal based on a scrambling identity. Based on the foregoing method, the second terminal device may obtain the reference signal sequence of the channel state information reference signal based on the scrambling identity. Subsequently, the second terminal device may determine, based on the reference signal sequence of the channel state information reference signal and the first parameter set, the mapping value on the RE in the resource that is on the data channel and that is used to map the channel state information reference signal.

In a possible implementation, the configuration information further includes third indication information, and the third indication information is used to indicate the scrambling identity. Based on the foregoing method, the second terminal device may obtain the scrambling identity based on the third indication information in the configuration information, thereby determining, based on the reference signal sequence of the channel state information reference signal and the first parameter set, the mapping value on the RE in the resource that is on the data channel and that is used to map the channel state information reference signal.

In a possible implementation, the method further includes: sending, by the second terminal device, control information to the first terminal device, where the control information includes a physical layer source identity and/or a physical layer destination identity; and determining, by the second terminal device, the physical layer source identity or the physical layer destination identity as the scrambling identity. Based on the foregoing method, the second terminal device may determine the scrambling identity based on the physical layer source identity and/or the physical layer destination identity that are/is in the control information, thereby determining, based on the reference signal sequence of the channel state information reference signal and the first parameter set, the mapping value on the RE in the resource that is on the data channel and that is used to map the channel state information reference signal.

In a possible implementation, the method further includes: sending, by the second terminal device, control information to the first terminal device; obtaining, by the second terminal device, a cyclic redundancy check code based on the control information; and using, by the second terminal device, L least significant bits or L most significant bits of the cyclic redundancy check code as the scrambling code identifier, where L is a positive integer, and L is greater than or equal to 1 and less than or equal to a length of the cyclic redundancy check code. Based on the foregoing method, the second terminal device may obtain the cyclic redundancy check code based on the control information, and obtain the scrambling identity based on the cyclic redundancy check code, thereby determining, based on the reference signal sequence of the channel state information reference signal and the first parameter set, the mapping value on the RE in the resource that is on the data channel and that is used to map the channel state information reference signal.

According to a third aspect, an embodiment of this application provides a communications apparatus. The communications apparatus has a function of implementing the method according to the first aspect. The function may be implemented by hardware, or may be implemented by hardware executing corresponding software. The hardware or the software includes one or more modules corresponding to the function.

According to a fourth aspect, an embodiment of this application provides a communications apparatus. The communications apparatus has a function of implementing the method according to the second aspect. The function may be implemented by hardware, or may be implemented by hardware executing corresponding software. The hardware or the software includes one or more modules corresponding to the function.

According to a fifth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for determining channel state information reference signal resource mapping according to the first aspect and the possible implementations of the first aspect is implemented.

According to a sixth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for determining channel state information reference signal resource mapping according to the second aspect and the possible implementations of the second aspect is implemented.

According to a seventh aspect, this application provides a system on a chip. The system on a chip may be used in a communications apparatus. The system on a chip includes at least one processor. A related program instruction is executed in the at least one processor, to implement a function of the first terminal device in the method in the first aspect and any design of the method in the first aspect. Optionally, the system on a chip may further include at least one memory. The memory stores the related program instruction.

According to an eighth aspect, this application provides a system on a chip. The system on a chip may be used in a communications apparatus. The system on a chip includes at least one processor. A related program instruction is executed in the at least one processor, to implement a function of the second terminal device in the method in the second aspect and any design of the method in the second aspect. Optionally, the system on a chip may further include at least one memory. The memory stores the related program instruction.

According to a ninth aspect, an embodiment of this application provides a computer-readable storage medium such as a non-transitory computer-readable storage medium. The computer-readable storage medium stores a computer program. When the computer program is run on a computer, the computer is enabled to perform any possible method in the first aspect. For example, the computer may be at least one storage node.

According to a tenth aspect, an embodiment of this application provides a computer-readable storage medium such as a non-transitory computer-readable storage medium. The computer-readable storage medium stores a computer program. When the computer program is run on a computer, the computer is enabled to perform any possible method in the second aspect. For example, the computer may be at least one storage node.

According to an eleventh aspect, an embodiment of this application provides a computer program product. When the computer program product runs on a computer, any method provided in the first aspect is enabled to be performed. For example, the computer may be at least one storage node.

According to a twelfth aspect, an embodiment of this application provides a computer program product. When the computer program product runs on a computer, any method provided in the second aspect is enabled to be performed. For example, the computer may be at least one storage node.

According to a thirteenth aspect, an embodiment of this application provides a communications system. The communications system may include any one or more of the following: the communications apparatus in the third aspect, the communications apparatus in the fourth aspect, the communications apparatus in the fifth aspect, the communications apparatus in the sixth aspect, the system on a chip in the seventh aspect, the system on a chip in the eighth aspect, the computer storage medium in the ninth aspect, the computer storage medium in the tenth aspect, the computer program product in the eleventh aspect, or the computer program product in the twelfth aspect.

It may be understood that any communications apparatus, system on a chip, computer storage medium, computer program product, or communications system or the like that is provided above is configured to perform the corresponding method provided above. Therefore, for beneficial effects of the communications apparatus, the system on a chip, the computer storage medium, the computer program product, the communications system, or the like, refer to the beneficial effects in the corresponding method. Details are not described herein again.

According to a fourteenth aspect, an embodiment of this application provides a method for generating a reference signal sequence of a channel state information reference signal. The method includes: determining, by a second terminal device, a scrambling identity; sending, by the second terminal device, first information to a first terminal device, where the first information includes the scrambling identity; and obtaining, by the second terminal device, a reference signal sequence of a channel state information reference signal based on the scrambling identity.

According to the method provided in the fourteenth aspect, after determining the scrambling identity, the second terminal device may obtain the reference signal sequence of the channel state information reference signal based on the scrambling identity, to subsequently determine, based on the reference signal sequence of the channel state information reference signal, a mapping value on an RE in a resource that is on a data channel of the second terminal device and that is used to map the channel state information reference signal.

According to a fifteenth aspect, an embodiment of this application provides a method for generating a reference signal sequence of a channel state information reference signal. The method includes: receiving, by a first terminal device, first information from a second terminal device, where the first information includes a physical layer source identity or a physical layer destination identity; determining, by the first terminal device, the physical layer source identity or the physical layer destination identity as a scrambling identity; and obtaining, by the first terminal device, a reference signal sequence of a channel state information reference signal based on the scrambling identity.

According to the method provided in the fifteenth aspect, the first terminal device may receive the physical layer source identity or the physical layer destination identity from the second terminal device, determine the physical layer source identity or the physical layer destination identity as the scrambling identity, and obtain the reference signal sequence of the channel state information reference signal based on the scrambling identity, to subsequently determine, based on the reference signal sequence of the channel state information reference signal, a mapping value on an RE in a resource that is on a data channel of the second terminal device and that is used to map the channel state information reference signal.

According to a sixteenth aspect, an embodiment of this application provides a method for generating a reference signal sequence of a channel state information reference signal. The method includes: sending, by a second terminal device, first information to a first terminal device, where the first information includes a physical layer source identity or a physical layer destination identity; determining, by the second terminal device, the physical layer source identity or the physical layer destination identity as a scrambling identity; and obtaining, by the second terminal device, a reference signal sequence of a channel state information reference signal based on the scrambling identity.

According to the method provided in the sixteenth aspect, the second terminal device may send the physical layer source identity or the physical layer destination identity to the first terminal device, determine the physical layer source identity or the physical layer destination identity as the scrambling identity, and obtain the reference signal sequence of the channel state information reference signal based on the scrambling identity, to subsequently determine, based on the reference signal sequence of the channel state information reference signal, a mapping value on an RE in a resource that is on a data channel of the second terminal device and that is used to map the channel state information reference signal.

According to a seventeenth aspect, an embodiment of this application provides a method for generating a reference signal sequence of a channel state information reference signal. The method includes: receiving, by a first terminal device, first information from a second terminal device; obtaining, by the first terminal device, a cyclic redundancy check code based on the first information; using, by the first terminal device, L least significant bits or L most significant bits of the cyclic redundancy check code as a scrambling code identifier, where L is a positive integer, and L is greater than or equal to 1 and less than or equal to a length of the cyclic redundancy check code; and obtaining, by the first terminal device, a reference signal sequence of a channel state information reference signal based on the scrambling identity.

According to the method provided in the seventeenth aspect, the first terminal device may receive the first information from the second terminal device, obtain the cyclic redundancy check code based on the first information, obtain the scrambling identity based on the cyclic redundancy check code, and obtain the reference signal sequence of the channel state information reference signal based on the scrambling identity, to subsequently determine, based on the reference signal sequence of the channel state information reference signal, a mapping value on an RE in a resource that is on a data channel of the second terminal device and that is used to map the channel state information reference signal.

According to an eighteenth aspect, an embodiment of this application provides a method for generating a reference signal sequence of a channel state information reference signal. The method includes: sending, by a second terminal device, first information to a first terminal device; obtaining, by the second terminal device, a cyclic redundancy check code based on the first information; using, by the second terminal device, L least significant bits or L most significant bits of the cyclic redundancy check code as a scrambling code identifier, where L is a positive integer, and L is greater than or equal to 1 and less than or equal to a length of the cyclic redundancy check code; and obtaining, by the second terminal device, a reference signal sequence of a channel state information reference signal based on the scrambling identity.

According to the method provided in the eighteenth aspect, the second terminal device may send the first information to the first terminal device, obtain the cyclic redundancy check code based on the first information, obtain the scrambling identity based on the cyclic redundancy check code, and obtain the reference signal sequence of the channel state information reference signal based on the scrambling identity, to subsequently determine, based on the reference signal sequence of the channel state information reference signal, a mapping value on an RE in a resource that is on a data channel of the second terminal device and that is used to map the channel state information reference signal.

According to a nineteenth aspect, an embodiment of this application provides a communications apparatus. The communications apparatus has a function of implementing the method according to the fourteenth aspect. The function may be implemented by hardware, or may be implemented by hardware executing corresponding software. The hardware or the software includes one or more modules corresponding to the function.

According to a twentieth aspect, an embodiment of this application provides a communications apparatus. The communications apparatus has a function of implementing the method according to the fifteenth aspect. The function may be implemented by hardware, or may be implemented by hardware executing corresponding software. The hardware or the software includes one or more modules corresponding to the function.

According to a twenty-first aspect, an embodiment of this application provides a communications apparatus. The communications apparatus has a function of implementing the method according to the sixteenth aspect. The function may be implemented by hardware, or may be implemented by hardware executing corresponding software. The hardware or the software includes one or more modules corresponding to the function.

According to a twenty-second aspect, an embodiment of this application provides a communications apparatus. The communications apparatus has a function of implementing the method according to the seventeenth aspect. The function may be implemented by hardware, or may be implemented by hardware executing corresponding software. The hardware or the software includes one or more modules corresponding to the function.

According to a twenty-third aspect, an embodiment of this application provides a communications apparatus. The communications apparatus has a function of implementing the method according to the eighteenth aspect. The function may be implemented by hardware, or may be implemented by hardware executing corresponding software. The hardware or the software includes one or more modules corresponding to the function.

According to a twenty-fourth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for generating a reference signal sequence of a channel state information reference signal according to the fourteenth aspect and the possible implementations of the fourteenth aspect is implemented.

According to a twenty-fifth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for generating a reference signal sequence of a channel state information reference signal according to the fifteenth aspect and the possible implementations of the fifteenth aspect is implemented.

According to a twenty-sixth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for generating a reference signal sequence of a channel state information reference signal according to the sixteenth aspect and the possible implementations of the sixteenth aspect is implemented.

According to a twenty-seventh aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for generating a reference signal sequence of a channel state information reference signal according to the seventeenth aspect and the possible implementations of the seventeenth aspect is implemented.

According to a twenty-eighth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for generating a reference signal sequence of a channel state information reference signal according to the eighteenth aspect and the possible implementations of the eighteenth aspect is implemented.

According to a twenty-ninth aspect, this application provides a system on a chip. The system on a chip may be used in a communications apparatus. The system on a chip includes at least one processor. A related program instruction is executed in the at least one processor, to implement a function of the second terminal device in the method in the fourteenth aspect and any design of the method in the fourteenth aspect. Optionally, the system on a chip may further include at least one memory. The memory stores the related program instruction.

According to a thirtieth aspect, this application provides a system on a chip. The system on a chip may be used in a communications apparatus. The system on a chip includes at least one processor. A related program instruction is executed in the at least one processor, to implement a function of the first terminal device in the method in the fifteenth aspect and any design of the method in the fifteenth aspect. Optionally, the system on a chip may further include at least one memory. The memory stores the related program instruction.

According to a thirty-first aspect, this application provides a system on a chip. The system on a chip may be used in a communications apparatus. The system on a chip includes at least one processor. A related program instruction is executed in the at least one processor, to implement a function of the second terminal device in the method in the sixteenth aspect and any design of the method in the sixteenth aspect. Optionally, the system on a chip may further include at least one memory. The memory stores the related program instruction.

According to a thirty-second aspect, this application provides a system on a chip. The system on a chip may be used in a communications apparatus. The system on a chip includes at least one processor. A related program instruction is executed in the at least one processor, to implement a function of the first terminal device in the method in the seventeenth aspect and any design of the method in the seventeenth aspect. Optionally, the system on a chip may further include at least one memory. The memory stores the related program instruction.

According to a thirty-third aspect, this application provides a system on a chip. The system on a chip may be used in a communications apparatus. The system on a chip includes at least one processor. A related program instruction is executed in the at least one processor, to implement a function of the second terminal device in the method in the eighteenth aspect and any design of the method in the eighteenth aspect. Optionally, the system on a chip may further include at least one memory. The memory stores the related program instruction.

According to a thirty-fourth aspect, an embodiment of this application provides a computer-readable storage medium such as a non-transitory computer-readable storage medium. The computer-readable storage medium stores a computer program. When the computer program is run on a computer, the computer is enabled to perform any possible method in the fourteenth aspect. For example, the computer may be at least one storage node.

According to a thirty-fifth aspect, an embodiment of this application provides a computer-readable storage medium such as a non-transitory computer-readable storage medium. The computer-readable storage medium stores a computer program. When the computer program is run on a computer, the computer is enabled to perform any possible method in the fifteenth aspect. For example, the computer may be at least one storage node.

According to a thirty-sixth aspect, an embodiment of this application provides a computer-readable storage medium such as a non-transitory computer-readable storage medium. The computer-readable storage medium stores a computer program. When the computer program is run on a computer, the computer is enabled to perform any possible method in the sixteenth aspect. For example, the computer may be at least one storage node.

According to a thirty-seventh aspect, an embodiment of this application provides a computer-readable storage medium such as a non-transitory computer-readable storage medium. The computer-readable storage medium stores a computer program. When the computer program is run on a computer, the computer is enabled to perform any possible method in the seventeenth aspect. For example, the computer may be at least one storage node.

According to a thirty-eighth aspect, an embodiment of this application provides a computer-readable storage medium such as a non-transitory computer-readable storage medium. The computer-readable storage medium stores a computer program. When the computer program is run on a computer, the computer is enabled to perform any possible method in the eighteenth aspect. For example, the computer may be at least one storage node.

According to a thirty-ninth aspect, an embodiment of this application provides a computer program product. When the computer program product runs on a computer, any method provided in the fourteenth aspect is enabled to be performed. For example, the computer may be at least one storage node.

According to a fortieth aspect, an embodiment of this application provides a computer program product. When the computer program product runs on a computer, any method provided in the fifteenth aspect is enabled to be performed. For example, the computer may be at least one storage node.

According to a forty-first aspect, an embodiment of this application provides a computer program product. When the computer program product runs on a computer, any method provided in the sixteenth aspect is enabled to be performed. For example, the computer may be at least one storage node.

According to a forty-second aspect, an embodiment of this application provides a computer program product. When the computer program product runs on a computer, any method provided in the seventeenth aspect is enabled to be performed. For example, the computer may be at least one storage node.

According to a forty-third aspect, an embodiment of this application provides a computer program product. When the computer program product runs on a computer, any method provided in the eighteenth aspect is enabled to be performed. For example, the computer may be at least one storage node.

According to a forty-fourth aspect, an embodiment of this application provides a communications system. The communications system may include any one or more of the following: the communications apparatus in the nineteenth aspect, the communications apparatus in the twentieth aspect, the communications apparatus in the twenty-first aspect, the communications apparatus in the twenty-second aspect, the communications apparatus in the twenty-third aspect, the communications apparatus in the twenty-fourth aspect, the communications apparatus in the twenty-fifth aspect, the communications apparatus in the twenty-sixth aspect, the communications apparatus in the twenty-seventh aspect, the communications apparatus in the twenty-eighth aspect, the system on a chip in the twenty-ninth aspect, the system on a chip in the thirtieth aspect, the system on a chip in the thirty-first aspect, the system on a chip in the thirty-second aspect, the system on a chip in the thirty-third aspect, the computer storage medium in the thirty-fourth aspect, the computer storage medium in the thirty-fifth aspect, the computer storage medium in the thirty-sixth aspect, the computer storage medium in the thirty-seventh aspect, the computer storage medium in the thirty-eighth aspect, the computer program product in the thirty-ninth aspect, the computer program product in the fortieth aspect, the computer program product in the forty-first aspect, the computer program product in the forty-second aspect, or a computer program product in the forty-third aspect.

It may be understood that any communications apparatus, system on a chip, computer storage medium, computer program product, or communications system or the like that is provided above is configured to perform the corresponding method provided above. Therefore, for beneficial effects of the communications apparatus, the system on a chip, the computer storage medium, the computer program product, the communications system, or the like, refer to the beneficial effects in the corresponding method. Details are not described herein again.

According to a forty-fifth aspect, an embodiment of this application provides a method for determining channel state information reference signal resource mapping. The method includes: receiving, by a first terminal device, configuration information from a second terminal device or a network device, where the configuration information includes a port quantity corresponding to a channel state information reference signal; determining, by the first terminal device, a first parameter set based on the port quantity, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group; and determining, by the first terminal device based on the first parameter set, a resource that is on a data channel of the second terminal device and that is used to map the channel state information reference signal and a mapping value on a resource element RE in the resource that is on the data channel and that is used to map the channel state information reference signal.

According to the method provided in the forty-fifth aspect, the first terminal device may receive the configuration information from the second terminal device. The configuration information includes the port quantity corresponding to the channel state information reference signal.

After receiving the port quantity, the first terminal device may determine the first parameter set based on the port quantity, and determine, based on the first parameter set, the resource that is on the data channel of the second terminal device and that is used to map the channel state information reference signal and the mapping value on the RE in the resource that is on the data channel and that is used to map the channel state information reference signal. In this way, the configuration information does not need to include information such as a frequency-domain density corresponding to the channel state information reference signal, a CDM type corresponding to the channel state information reference signal, and a frequency domain bandwidth corresponding to the channel state information reference signal, but the first terminal device can also determine the resource that is on the data channel of the second terminal device and that is used to map the CSI-RS and the mapping value on the RE in the resource that is on the data channel and that is used to map the channel state information reference signal, so that signaling overheads are reduced.

In a possible implementation, the method further includes: receiving, by the first terminal device, the data channel from the second terminal device, and performing channel estimation based on the resource used to map the channel state information reference signal and the mapping value on the RE in the resource used to map the channel state information reference signal. Based on the foregoing method, the first terminal device may receive the data channel from the second terminal device, and perform channel estimation based on the resource used to map the channel state information reference signal and the mapping value on the RE in the resource used to map the channel state information reference signal. Subsequently, correct signal reception can be implemented based on a result of the channel estimation.

In a possible implementation, the determining, by the first terminal device based on the first parameter set, a mapping value on an RE in the resource that is on the data channel of the second terminal device and that is used to map the channel state information reference signal includes: the mapping value on the RE in the resource that is on the data channel of the second terminal device and that is used to map the channel state information reference signal satisfies: $a_{k,l}^{(p,\mu)} = \beta_{CSIRS} w_f(k') r(m')$, where $a_{k,l}^{(p,\mu)}$ represents a mapping value on an RE corresponding to a time domain resource number l, a frequency domain resource number k, a space domain resource number p, and a subcarrier spacing number $\mu$, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'^{th}$ element in a reference signal sequence of the channel state information reference signal, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of a resource block RB, α is an intermediate variable calculated based on the port quantity and the frequency-domain density that corresponds to the channel state information reference signal, $\lfloor\ \rfloor$ represents rounding down, $\lceil\ \rceil$ represents rounding up, ρ represents the frequency-domain density, $\bar{k}$ represents a frequency domain resource starting point of the code division multiplexing group, and $N_{sc}^{RB}$ represents a quantity of subcarriers in an RB. Based on the foregoing method, the first terminal device may determine, according to the foregoing formula, the mapping value on the RE in the resource used to map the channel state information reference signal. In addition, when the port quantity is greater than or equal to 2, and the frequency-domain density is greater than or equal to 2, the channel state information reference signal sequence may be properly used, to improve detection performance of the channel state information reference signal sequence.

In a possible implementation, the first terminal device maintains a second mapping table, and the second mapping table includes a mapping relationship between at least one port quantity and at least one first parameter set; and the determining, by the first terminal device, a first parameter set based on the port quantity includes: obtaining, by the first terminal device, the first parameter set through table lookup based on the port quantity. Based on the foregoing method, the first terminal device may obtain the first parameter set through table lookup based on the port quantity, and the configuration information does not need to include the first parameter set, so that signaling overheads are reduced.

In a possible implementation, the configuration information further includes first indication information, and the first indication information is used to indicate a frequency domain offset; and the determining, by the first terminal device, a first parameter set based on the port quantity includes: determining, by the first terminal device, the first parameter set based on the port quantity and the frequency domain offset. Based on the foregoing method, the first terminal device may determine the first parameter set based on the port quantity and the frequency domain offset that is indicated in the configuration information, so that a degree of freedom of a frequency domain resource used to map the channel state information reference signal can be improved.

In a possible implementation, the resource used to map the channel state information reference signal includes a frequency domain resource used to map the channel state information reference signal, a time domain resource used to map the channel state information reference signal, and a space domain resource used to map the channel state information reference signal. Based on the foregoing method, the first terminal device may determine, based on the first parameter set, the mapping value on the RE in the resource corresponding to the frequency domain resource used to map the channel state information reference signal, the time domain resource used to map the channel state information reference signal, and the space domain resource used to map the channel state information reference signal.

In a possible implementation, the time domain resource used to map the channel state information reference signal is the last symbol on the data channel; or the configuration information further includes second indication information, and the second indication information is used to indicate the time domain resource used to map the channel state information reference signal. Based on the foregoing method, the first terminal device may determine that the time domain resource used to map the channel state information reference signal is the last symbol on the data channel, or the first terminal device may determine, based on the second indication information, the time domain resource used to map the channel state information reference signal, thereby determining the mapping value on the RE in the resource that is on the data channel and that is used to map the channel state information reference signal.

In a possible implementation, the method further includes: obtaining, by the first terminal device, the reference signal sequence of the channel state information reference signal based on a scrambling identity. Based on the foregoing method, the first terminal device may obtain the reference signal sequence of the channel state information reference signal based on the scrambling identity. Subsequently, the first terminal device may determine, based on the reference signal sequence of the channel state information reference signal and the first parameter set, the mapping value on the RE in the resource that is on the data channel and that is used to map the channel state information reference signal.

In a possible implementation, the configuration information further includes third indication information, and the third indication information is used to indicate the scrambling identity. Based on the foregoing method, the first terminal device may obtain the scrambling identity based on the third indication information in the configuration information, thereby determining, based on the reference signal sequence of the channel state information reference signal and the first parameter set, the mapping value on the RE in the resource that is on the data channel and that is used to map the channel state information reference signal.

In a possible implementation, the method further includes: receiving, by the first terminal device, control information from the second terminal device, where the control information includes a physical layer source identity and/or a physical layer destination identity; and determining, by the first terminal device, the physical layer source identity or the physical layer destination identity as the scrambling identity. Based on the foregoing method, the first terminal device may determine the scrambling identity based on the physical layer source identity and/or the physical layer destination identity that are/is in the control information, thereby determining, based on the reference signal sequence of the channel state information reference signal and the first parameter set, the mapping value on the RE in the resource that is on the data channel and that is used to map the channel state information reference signal.

In a possible implementation, the method further includes: receiving, by the first terminal device, control information from the second terminal device; obtaining, by the first terminal device, a cyclic redundancy check code based on the control information; and using, by the first terminal device, L least significant bits or L most significant bits of the cyclic redundancy check code as the scrambling code identifier, where L is a positive integer, and L is greater than or equal to 1 and less than or equal to a length of the cyclic redundancy check code. Based on the foregoing method, the first terminal device may obtain the cyclic redundancy check code based on the control information, and obtain the scrambling identity based on the cyclic redundancy check code, thereby determining, based on the reference signal sequence of the channel state information reference signal and the first parameter set, the mapping value on the RE in the resource that is on the data channel and that is used to map the channel state information reference signal.

According to a forty-sixth aspect, an embodiment of this application provides a method for determining channel state information reference signal resource mapping. The method includes: determining, by a second terminal device, a first parameter set based on a port quantity corresponding to a channel state information reference signal, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group; and determining, by the second terminal device based on the first parameter set, a resource that is on a data channel of the second terminal device and that is used to map the channel state information reference signal and a mapping value on an RE in the resource that is on the data channel and that is used to map the channel state information reference signal.

According to the method provided in the forty-sixth aspect, the second terminal device may determine the first parameter set based on the port quantity corresponding to the channel state information reference signal, and determine, based on the first parameter set, the resource that is on the data channel of the second terminal device and that is used to map the channel state information reference signal and the mapping value on the RE in the resource that is on the data channel and that is used to map the channel state information reference signal. In this way, configuration information does not need to include information such as a frequency-domain density corresponding to the channel state information reference signal, a CDM type corresponding to the channel state information reference signal, and a frequency domain bandwidth corresponding to the channel state information reference signal, so that signaling overheads are reduced.

In a possible implementation, the method further includes: sending, by the second terminal device, the data channel to a first terminal device. Based on the foregoing method, the second terminal device may send the data channel to the first terminal device, so that the first terminal device performs channel estimation based on the resource used to map the channel state information reference signal and the mapping value on the RE in the resource used to map the channel state information reference signal.

In a possible implementation, the method further includes: sending, by the second terminal device, configuration information to a first terminal device, where the configuration information includes the port quantity. Based on the foregoing method, the second terminal device may send the configuration information to the first terminal device, so that the first terminal device determines the first parameter set based on the port quantity, and determines, based on the first parameter set, the resource that is on the data channel of the second terminal device and that is used to map the channel state information reference signal and the mapping value on the RE in the resource used to map the channel state information reference signal.

In a possible implementation, the determining, by the second terminal device based on the first parameter set, a mapping value on a resource element RE in the resource that is on the data channel of the second terminal device and that is used to map the channel state information reference signal includes: the mapping value on the RE in the resource that is on the data channel of the second terminal device and that is used to map the channel state information reference signal satisfies: where $a_{k,l}^{(p,\mu)}$ represents a mapping value on an RE corresponding to a time domain resource number l, a frequency domain resource number k, a space domain resource number p, and a subcarrier spacing number μ, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an m'$_{th}$ element in a reference signal sequence of the channel state information reference signal, and m' satisfies:

$$m' = \lfloor n\alpha \rfloor + k'\lceil \rho \rceil + \left\lfloor \frac{\overline{k}\rho}{N_{sc}^{RB}} \right\rfloor,$$

where n represents a number of a resource block RB, α is an intermediate variable calculated based on the port quantity and a frequency-domain density that corresponds to the channel state information reference signal, $\lfloor \ \rfloor$ represents rounding down, $\lceil \ \rceil$ represents rounding up, ρ represents the frequency-domain density, $\overline{k}$ represents a frequency domain resource starting point of the code division multiplexing group, and $N_{sc}^{RB}$ represents a quantity of subcarriers in an RB. Based on the foregoing method, the second terminal device may determine, according to the foregoing formula, the mapping value on the RE in the resource used to map the channel state information reference signal. In addition, when the port quantity is greater than or equal to 2, and the frequency-domain density is greater than or equal to 2, the channel state information reference signal sequence may be properly used, to improve detection performance of the channel state information reference signal sequence.

In a possible implementation, the second terminal device maintains a second mapping table, and the second mapping table includes a mapping relationship between at least one port quantity and at least one first parameter set; and the determining, by a second terminal device, a first parameter set based on a port quantity includes: obtaining, by the second terminal device, the first parameter set through table lookup based on the port quantity. Based on the foregoing method, the second terminal device may obtain the first parameter set through table lookup based on the port quantity, and the configuration information does not need to include the first parameter set, so that signaling overheads are reduced.

In a possible implementation, the configuration information further includes first indication information, and the first indication information is used to indicate a frequency domain offset; and the determining, by a second terminal device, a first parameter set based on a port quantity includes: determining, by the second terminal device, the first parameter set based on the port quantity and the frequency domain offset. Based on the foregoing method, the second terminal device may determine the first parameter set based on the port quantity and the frequency domain offset that is indicated in the configuration information, so that a degree of freedom of a frequency domain resource used to map the channel state information reference signal can be improved.

In a possible implementation, the resource used to map the channel state information reference signal includes a frequency domain resource used to map the channel state information reference signal, a time domain resource used to map the channel state information reference signal, and a space domain resource used to map the channel state information reference signal. Based on the foregoing method, the second terminal device may determine, based on the first parameter set, the mapping value on the RE in the resource corresponding to the frequency domain resource used to map the channel state information reference signal, the time domain resource used to map the channel state information reference signal, and the space domain resource used to map the channel state information reference signal.

In a possible implementation, the time domain resource used to map the channel state information reference signal is the last symbol on the data channel; or the configuration information further includes second indication information, and the second indication information is used to indicate the time domain resource used to map the channel state information reference signal. Based on the foregoing method, the second terminal device may determine that the time domain resource used to map the channel state information reference signal is the last symbol on the data channel, or the second terminal device may determine, based on the second indication information, the time domain resource used to map the channel state information reference signal, thereby determining the mapping value on the RE in the resource that is on the data channel and that is used to map the channel state information reference signal.

In a possible implementation, the method further includes: obtaining, by the second terminal device, the reference signal sequence of the channel state information reference signal based on a scrambling identity. Based on the foregoing method, the second terminal device may obtain the reference signal sequence of the channel state information reference signal based on the scrambling identity. Subsequently, the second terminal device may determine, based on the reference signal sequence of the channel state information reference signal and the first parameter set, the mapping value on the RE in the resource that is on the data channel and that is used to map the channel state information reference signal.

In a possible implementation, the configuration information further includes third indication information, and the third indication information is used to indicate the scrambling identity. Based on the foregoing method, the second terminal device may obtain the scrambling identity based on the third indication information in the configuration information, thereby determining, based on the reference signal sequence of the channel state information reference signal and the first parameter set, the mapping value on the RE in the resource that is on the data channel and that is used to map the channel state information reference signal.

In a possible implementation, the method further includes: sending, by the second terminal device, control information to the first terminal device, where the control information includes a physical layer source identity and/or a physical layer destination identity; and determining, by the second terminal device, the physical layer source identity or the physical layer destination identity as the scrambling identity. Based on the foregoing method, the second terminal device may determine the scrambling identity based on the physical layer source identity and/or the physical layer destination identity that are/is in the control information, thereby determining, based on the reference signal sequence of the channel state information reference signal and the first parameter set, the mapping value on the RE in the resource that is on the data channel and that is used to map the channel state information reference signal.

In a possible implementation, the method further includes: sending, by the second terminal device, control information to the first terminal device; obtaining, by the second terminal device, a cyclic redundancy check code based on the control information; and using, by the second terminal device, L least significant bits or L most significant bits of the cyclic redundancy check code as the scrambling code identifier, where L is a positive integer, and L is greater than or equal to 1 and less than or equal to a length of the cyclic redundancy check code. Based on the foregoing method, the second terminal device may obtain the cyclic redundancy check code based on the control information, and obtain the scrambling identity based on the cyclic redundancy check code, thereby determining, based on the reference signal sequence of the channel state information reference signal and the first parameter set, the mapping value on the RE in the resource that is on the data channel and that is used to map the channel state information reference signal.

According to a forty-seventh aspect, an embodiment of this application provides a communications apparatus. The communications apparatus includes a receiving module and a processing module. The receiving module is configured to receive configuration information from a second terminal device or a network device, where the configuration information includes a port quantity corresponding to a channel state information reference signal. The processing module is configured to determine a first parameter set based on the port quantity, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group. The processing module is further configured to determine, based on the first parameter set, a resource that is on a data channel of the second terminal device and that is used to map the channel state information reference signal and a mapping value on a resource element RE in the resource that is on the data channel and that is used to map the channel state information reference signal.

The communications apparatus according to the forty-seventh aspect may receive the configuration information from the second terminal device. The configuration information includes the port quantity corresponding to the channel state information reference signal. After receiving the port quantity, the communications apparatus may determine the first parameter set based on the port quantity, and determine, based on the first parameter set, the resource that is on the data channel of the second terminal device and that is used to map the channel state information reference signal and the mapping value on the RE in the resource that is on the data channel and that is used to map the channel state information reference signal. In this way, the configuration information does not need to include information such as a frequency-domain density corresponding to the channel state information reference signal, a CDM type corresponding to the channel state information reference signal, and a frequency domain bandwidth corresponding to the channel state information reference signal, but the communications apparatus can also determine the resource that is on the data channel of the second terminal device and that is used to map the CSI-RS and the mapping value on the RE in the resource that is on the data channel and that is used to map the channel state information reference signal, so that signaling overheads are reduced.

In a possible implementation, the receiving module is further configured to: receive the data channel from the second terminal device, and perform channel estimation based on the resource used to map the channel state information reference signal and the mapping value on the RE in the resource used to map the channel state information reference signal. Based on the foregoing method, the communications apparatus may receive the data channel from the second terminal device, and perform channel estimation based on the resource used to map the channel state information reference signal and the mapping value on the RE in the resource used to map the channel state information reference signal. Subsequently, correct signal reception can be implemented based on a result of the channel estimation.

In a possible implementation, the processing module is specifically configured to: the mapping value on the RE in the resource that is on the data channel of the second terminal device and that is used to map the channel state information reference signal satisfies: $a_{k,l}^{(p,\mu)}=\beta_{CSIRS}w_f(k')r(m')$, where $a_{k,l}^{(p,\mu)}$ represents a mapping value on an RE corresponding to a time domain resource number l, a frequency domain resource number k, a space domain resource number p, and a subcarrier spacing number $\mu$, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'^{th}$ element in a reference signal sequence of the channel state information reference signal, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of a resource block RB, $\alpha$ is an intermediate variable calculated based on the port quantity and a frequency-domain density that corresponds to the channel state information reference signal, $\lfloor\ \rfloor$ represents rounding down, $\lceil\ \rceil$ represents rounding up, $\rho$ represents the frequency-domain density, $\bar{k}$ represents a frequency domain resource starting point of the code division multiplexing group, and $N_{sc}^{RB}$ represents a quantity of subcarriers in an RB. Based on the foregoing method, the communications apparatus may determine, according to the foregoing formula, the mapping value on the RE in the resource used to map the channel state information reference signal. In addition, when the port quantity is greater than or equal to 2, and the frequency-domain density is greater than or equal to 2, the channel state information reference signal sequence may be properly used, to improve detection performance of the channel state information reference signal sequence.

In a possible implementation, the processing module is further configured to maintain a second mapping table, where the second mapping table includes a mapping relationship between at least one port quantity and at least one first parameter set. The processing module is further specifically configured to obtain the first parameter set through table lookup based on the port quantity. Based on the foregoing method, the communications apparatus may obtain the first parameter set through table lookup based on the port quantity, and the configuration information does not need to include the first parameter set, so that signaling overheads are reduced.

In a possible implementation, the configuration information further includes first indication information, and the first indication information is used to indicate a frequency domain offset. The processing module is further specifically configured to determine the first parameter set based on the port quantity and the frequency domain offset. Based on the foregoing method, the communications apparatus may determine the first parameter set based on the port quantity and the frequency domain offset that is indicated in the configuration information, so that a degree of freedom of a frequency domain resource used to map the channel state information reference signal can be improved.

In a possible implementation, the resource used to map the channel state information reference signal includes a frequency domain resource used to map the channel state information reference signal, a time domain resource used to map the channel state information reference signal, and a space domain resource used to map the channel state information reference signal. Based on the foregoing method, the communications apparatus may determine, based on the first parameter set, the mapping value on the RE in the resource corresponding to the frequency domain resource used to map the channel state information reference signal, the time domain resource used to map the channel state information reference signal, and the space domain resource used to map the channel state information reference signal.

In a possible implementation, the time domain resource used to map the channel state information reference signal is the last symbol on the data channel; or the configuration information further includes second indication information, and the second indication information is used to indicate the time domain resource used to map the channel state information reference signal. Based on the foregoing method, the communications apparatus may determine that the time domain resource used to map the channel state information reference signal is the last symbol on the data channel, or the communications apparatus may determine, based on the second indication information, the time domain resource used to map the channel state information reference signal, thereby determining the mapping value on the RE in the resource that is on the data channel and that is used to map the channel state information reference signal.

In a possible implementation, the processing module is further configured to obtain the reference signal sequence of the channel state information reference signal based on a scrambling identity. Based on the foregoing method, the communications apparatus may obtain the reference signal sequence of the channel state information reference signal based on the scrambling identity. Subsequently, the communications apparatus may determine, based on the reference signal sequence of the channel state information reference signal and the first parameter set, the mapping value on the RE in the resource that is on the data channel and that is used to map the channel state information reference signal.

In a possible implementation, the configuration information further includes third indication information, and the third indication information is used to indicate the scrambling identity. Based on the foregoing method, the communications apparatus may obtain the scrambling identity based on the third indication information in the configuration information, thereby determining, based on the reference signal sequence of the channel state information reference signal and the first parameter set, the mapping value on the RE in the resource that is on the data channel and that is used to map the channel state information reference signal.

In a possible implementation, the receiving module is further configured to receive control information from the second terminal device, where the control information includes a physical layer source identity and/or a physical layer destination identity. The processing module is further configured to determine the physical layer source identity or the physical layer destination identity as the scrambling identity. Based on the foregoing method, the communications device may determine the scrambling identity based on the physical layer source identity and/or the physical layer destination identity that are/is in the control information, thereby determining, based on the reference signal sequence of the channel state information reference signal and the first parameter set, the mapping value on the RE in the resource that is on the data channel and that is used to map the channel state information reference signal.

In a possible implementation, the receiving module is further configured to receive control information from the second terminal device. The processing module is further configured to obtain a cyclic redundancy check code based on the control information. The processing module is further configured to use L least significant bits or L most significant bits of the cyclic redundancy check code as the scrambling code identifier, where L is a positive integer, and L is greater than or equal to 1 and less than or equal to a length of the cyclic redundancy check code. Based on the foregoing method, the communications apparatus may obtain the cyclic redundancy check code based on the control information, and obtain the scrambling identity based on the cyclic redundancy check code, thereby determining, based on the reference signal sequence of the channel state information reference signal and the first parameter set, the mapping value on the RE in the resource that is on the data channel and that is used to map the channel state information reference signal.

According to a forty-eighth aspect, an embodiment of this application provides a communications apparatus. The communications apparatus includes a processing module. The processing module is configured to determine a first parameter set based on a port quantity corresponding to a channel state information reference signal, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group. The processing module is further configured to determine, based on the first parameter set, a resource that is on a data channel of the communications apparatus and that is used to map the channel state information reference signal and a mapping value on an RE in the resource that is on the data channel and that is used to map the channel state information reference signal.

The communications apparatus provided in the forty-eighth aspect may determine the first parameter set based on the port quantity corresponding to the channel state information reference signal, and determine, based on the first parameter set, the resource that is on the data channel of the communications apparatus and that is used to map the channel state information reference signal and the mapping value on the RE in the resource that is on the data channel and that is used to map the channel state information reference signal. In this way, configuration information does not need to include information such as a frequency-domain density corresponding to the channel state information reference signal, a CDM type corresponding to the channel state information reference signal, and a frequency domain bandwidth corresponding to the channel state information reference signal, so that signaling overheads are reduced.

In a possible implementation, the communications apparatus further includes a sending module. The sending module is configured to send the data channel to a first terminal device. Based on the foregoing method, the communications module may send the data channel to the first terminal device, so that the first terminal device performs channel estimation based on the resource used to map the channel state information reference signal and the mapping value on the RE in the resource used to map the channel state information reference signal.

In a possible implementation, the sending module is further configured to send configuration information to a first terminal device, where the configuration information includes the port quantity. Based on the foregoing method, the communications apparatus may send the configuration information to the first terminal device, so that the first terminal device determines the first parameter set based on the port quantity, and determines, based on the first parameter set, the resource that is on the data channel of the communications apparatus and that is used to map the channel state information reference signal and the mapping value on the RE in the resource used to map the channel state information reference signal.

In a possible implementation, the processing module is specifically configured to: the mapping value on the RE in the resource that is on the data channel of the communications apparatus and that is used to map the channel state information reference signal satisfies: where $a_{k,l}^{(p,\mu)}$ represents a mapping value on an RE corresponding to a time domain resource number l, a frequency domain resource number k, a space domain resource number p, and a subcarrier spacing number $\mu$, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'_{th}$ element in a reference signal sequence of the channel state information reference signal, and m' satisfies:

$$m' = \lfloor n\alpha \rfloor + k'\lceil\rho\rceil + \left\lfloor \frac{\bar{k}\rho}{N_{sc}^{RB}} \right\rfloor,$$

where n represents a number of a resource block RB, $\alpha$ is an intermediate variable calculated based on the port quantity and a frequency-domain density that corresponds to the channel state information reference signal, $\lfloor\ \rfloor$ represents rounding down, $\lceil\ \rceil$ represents rounding up, $\rho$ represents the frequency-domain density, $\bar{k}$ represents a frequency domain resource starting point of the code division multiplexing group, and $N_{sc}^{RB}$ represents a quantity of subcarriers in an RB. Based on the foregoing method, the communications apparatus may determine, according to the foregoing formula, the mapping value on the RE in the resource used to map the channel state information reference signal. In addition, when the port quantity is greater than or equal to 2, and the frequency-domain density is greater than or equal to 2, the channel state information reference signal sequence may be properly used, to improve detection performance of the channel state information reference signal sequence.

In a possible implementation, the processing module is further configured to maintain a second mapping table, where the second mapping table includes a mapping relationship between at least one port quantity and at least one first parameter set. The processing module is further specifically configured to obtain the first parameter set through table lookup based on the port quantity. Based on the foregoing method, the communications apparatus may obtain the first parameter set through table lookup based on the port quantity, and the configuration information does not need to include the first parameter set, so that signaling overheads are reduced.

In a possible implementation, the configuration information further includes first indication information, and the first indication information is used to indicate a frequency domain offset. The processing module is further specifically configured to determine the first parameter set based on the port quantity and the frequency domain offset. Based on the foregoing method, the communications apparatus may determine the first parameter set based on the port quantity and the frequency domain offset that is indicated in the configuration information, so that a degree of freedom of a frequency domain resource used to map the channel state information reference signal can be improved.

In a possible implementation, the resource used to map the channel state information reference signal includes a frequency domain resource used to map the channel state information reference signal, a time domain resource used to map the channel state information reference signal, and a space domain resource used to map the channel state information reference signal. Based on the foregoing method, the communications apparatus may determine, based on the first parameter set, the mapping value on the RE in the resource corresponding to the frequency domain resource used to map the channel state information reference signal, the time domain resource used to map the channel state information reference signal, and the space domain resource used to map the channel state information reference signal.

In a possible implementation, the time domain resource used to map the channel state information reference signal is the last symbol on the data channel; or the configuration information further includes second indication information, and the second indication information is used to indicate the time domain resource used to map the channel state information reference signal. Based on the foregoing method, the communications apparatus may determine that the time domain resource used to map the channel state information reference signal is the last symbol on the data channel, or the communications apparatus may determine, based on the second indication information, the time domain resource used to map the channel state information reference signal, thereby determining the mapping value on the RE in the resource that is on the data channel and that is used to map the channel state information reference signal.

In a possible implementation, the processing module is further configured to obtain the reference signal sequence of the channel state information reference signal based on a scrambling identity. Based on the foregoing method, the communications apparatus may obtain the reference signal sequence of the channel state information reference signal based on the scrambling identity. Subsequently, the communications apparatus may determine, based on the reference signal sequence of the channel state information reference signal and the first parameter set, the mapping value on the RE in the resource that is on the data channel and that is used to map the channel state information reference signal.

In a possible implementation, the configuration information further includes third indication information, and the third indication information is used to indicate the scrambling identity. Based on the foregoing method, the communications apparatus may obtain the scrambling identity based on the third indication information in the configuration information, thereby determining, based on the reference signal sequence of the channel state information reference signal and the first parameter set, the mapping value on the RE in the resource that is on the data channel and that is used to map the channel state information reference signal.

In a possible implementation, the sending module is further configured to send control information to the first terminal device, where the control information includes a physical layer source identity and/or a physical layer destination identity. The processing module is further configured to determine the physical layer source identity or the physical layer destination identity as the scrambling identity. Based on the foregoing method, the communications apparatus may determine the scrambling identity based on the physical layer source identity and/or the physical layer destination identity that are/is in the control information, thereby determining, based on the reference signal sequence of the channel state information reference signal and the first parameter set, the mapping value on the RE in the resource that is on the data channel and that is used to map the channel state information reference signal.

In a possible implementation, the sending module is further configured to send control information to the first terminal device. The processing module is further configured to obtain a cyclic redundancy check code based on the control information. The processing module is further configured to use L least significant bits or L most significant bits of the cyclic redundancy check code as the scrambling code identifier, where L is a positive integer, and L is greater than or equal to 1 and less than or equal to a length of the cyclic redundancy check code. Based on the foregoing method, the communications apparatus may obtain the cyclic redundancy check code based on the control information, and obtain the scrambling identity based on the cyclic redundancy check code, thereby determining, based on the reference signal sequence of the channel state information reference signal and the first parameter set, the mapping value on the RE in the resource that is on the data channel and that is used to map the channel state information reference signal.

According to a forty-ninth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for determining channel state information reference signal resource mapping according to the forty-fifth aspect and the possible implementations of the forty-fifth aspect is implemented.

According to a fiftieth aspect, an embodiment of this application provides a communications apparatus, including at least one processor, at least one memory, and a communications interface. The communications interface, the at least one memory, and the at least one processor are coupled. The communications apparatus communicates with another apparatus through the communications interface. The at least one memory is configured to store a computer program, so that when the computer program is executed by the at least one processor, the method for determining channel state information reference signal resource mapping according to the forty-sixth aspect and the possible implementations of the forty-sixth aspect is implemented.

According to a fifty-first aspect, this application provides a chip or a system on a chip. The chip or the system on a chip may be used in a communications apparatus. The chip or the system on a chip includes at least one processor. A related program instruction is executed in the at least one processor, to implement a function of the first terminal device in the method in the forty-fifth aspect and any design of the method in the forty-fifth aspect. Optionally, the system on a chip may further include at least one memory. The memory stores the related program instruction.

According to a fifty-second aspect, this application provides a chip or a system on a chip. The chip or the system on a chip may be used in a communications apparatus. The chip or the system on a chip includes at least one processor. A related program instruction is executed in the at least one processor, to implement a function of the second terminal device in the method in the forty-sixth aspect and any design of the method in the forty-sixth aspect. Optionally, the chip or the system on a chip may further include at least one memory. The memory stores the related program instruction.

According to a fifty-third aspect, an embodiment of this application provides a computer-readable storage medium such as a non-transitory computer-readable storage medium. The computer-readable storage medium stores a computer program. When the computer program is run on a computer, the computer is enabled to perform any possible method in the forty-fifth aspect. For example, the computer may be at least one storage node.

According to a fifty-fourth aspect, an embodiment of this application provides a computer-readable storage medium such as a non-transitory computer-readable storage medium. The computer-readable storage medium stores a computer program. When the computer program is run on a computer, the computer is enabled to perform any possible method in the forty-sixth aspect. For example, the computer may be at least one storage node.

According to a fifty-fifth aspect, an embodiment of this application provides a computer program product. When the computer program product runs on a computer, any method provided in the forty-fifth aspect is enabled to be performed. For example, the computer may be at least one storage node.

According to a fifty-sixth aspect, an embodiment of this application provides a computer program product. When the computer program product runs on a computer, any method provided in the forty-sixth aspect is enabled to be performed. For example, the computer may be at least one storage node.

According to a fifty-seventh aspect, an embodiment of this application provides a communications system. The communications system may include any one or more of the following: the communications apparatus in the forty-seventh aspect, the communications apparatus in the forty-eighth aspect, the communications apparatus in the forty-ninth aspect, the communications apparatus in the fiftieth aspect, the chip or the system on a chip in the fifty-first aspect, the chip or the system on a chip in the fifty-second aspect, the computer storage medium in the fifty-third aspect, the computer storage medium in the fifty-fourth aspect, the computer program product in the fifty-fifth aspect, or the computer program product in the fifty-sixth aspect.

It may be understood that any communications apparatus, chip or system on a chip, computer storage medium, computer program product, or communications system or the like that is provided above is configured to perform the corresponding method provided above. Therefore, for beneficial effects of the communications apparatus, the chip or the system on a chip, the computer storage medium, the computer program product, the communications system, or the like, refer to the beneficial effects in the corresponding method. Details are not described herein again.

DETAILED DESCRIPTION OF ILLUSTRATIVE EMBODIMENTS

The following describes implementations of embodiments of this application in detail with reference to accompanying drawings.

A method provided in the embodiments of this application may be used in various communications systems. The method may be used in a 3rd generation partnership project (3GPP) communications system such as an LTE system, may be used in a 5th generation (5G) mobile communications system, an NR system, and another next-generation communications system, or may be used in a non-3GPP communications system. This is not limited. Communication scenarios of the method provided in the embodiments of this application may include communication scenarios in which an antenna port (briefly referred to as a port below) quantity corresponding to a CSI-RS is limited and/or a CDM type corresponding to a CSI-RS is limited. The communication scenarios include but are not limited to a scenario of communication between terminal devices, a scenario of communication between network devices, a scenario of communication between a network device and user equipment, and the like. The following provides descriptions by using an example in which the method is used in the scenario in which the terminal devices communicate with each other.

Figure 1:
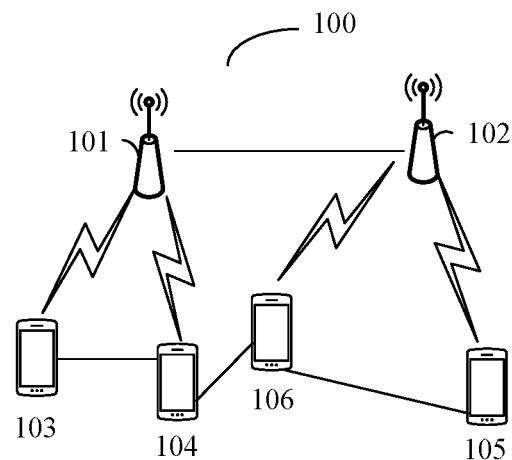
FIG. 1 is a schematic architectural diagram of a communications system according to an embodiment of this application.

The following uses only a communications system 100 shown in FIG. 1 as an example to describe the method provided in the embodiments of this application.

FIG. 1 is a schematic architectural diagram of a communications system 100 according to an embodiment of this application. In FIG. 1, the communications system 100 may include a plurality of network devices and a plurality of terminal devices. For example, the communications system 100 may include a network device 101, a network device 102, and terminal devices 103 to 106.

In FIG. 1, a network device may provide a wireless access service for a terminal device. Specifically, each network device corresponds to a service coverage area. A terminal device entering the area may communicate with the network device through a Uu interface, to receive a wireless access service provided by the network device. The terminal device and the network device may communicate with each other through a Uu interface link. The Uu interface link may be classified into an uplink (UL) and a downlink (DL) based on a direction of data transmission on the Uu interface link. Data sent by the terminal device to the network device may be transmitted on the UL, and data sent by the network device to the terminal device may be transmitted on the DL. For example, in FIG. 1, the terminal device 103 is located in a coverage area of the network device 101. The network device 101 may send data to the terminal device 103 through the DL, and the terminal device 103 may send data to the network device 101 through the UL.

A terminal device and another terminal device may communicate with each other through a direct communication link. The direct communication link may be referred to as a sidelink or a sidelink (SL). For example, the direct communication link is the sidelink. The terminal device 103 and the terminal device 104 in FIG. 1 may communicate with each other through a sidelink, and the terminal device 104 and the terminal device 106 in FIG. 1 may communicate with each other through a sidelink.

A network device in FIG. 1, for example, the network device 101 or the network device 102, may be a transmission reception point (TRP), a base station, a relay station, an access point, or the like. The network device 101 or the network device 102 may be a network device in a 5G communications system or a network device in a future evolved network, may be a base transceiver station (BTS) in a global system for mobile communications (global system for mobile communication, GSM) or code division multiple access (code division multiple access, CDMA) network, may be an NB (NodeB) in wideband code division multiple access (wideband code division multiple access, WCDMA), or may be an eNB or an eNodeB (evolutional NodeB) in long term evolution (long term evolution, LTE). Alternatively, the network device 101 or the network device 102 may be a radio controller in a cloud radio access network (CRAN) scenario.

A terminal device in FIG. 1, for example, the terminal device 103, the terminal device 104, the terminal device 105, or the terminal device 106, may be a device that has a wireless transceiver function and can provide a communication service for a user. Specifically, the terminal device 103, the terminal device 104, the terminal device 105, or the terminal device 106 may be a device in a V2X system, a device in a D2D system, a device in a machine type communication (MTC) system, or the like. For example, the terminal device 103, the terminal device 104, the terminal device 105, or the terminal device 106 may refer to an industry robot, industry automatic equipment, user equipment (UE), an access terminal, a subscriber unit, a subscriber station, a mobile station, a mobile station, a remote station, a remote terminal, a mobile device, a user terminal, a terminal, a wireless terminal device, a user agent, or a user apparatus. For example, the terminal device 103, the terminal device 104, the terminal device 105, or the terminal device 106 may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network or a network after 5G, or a terminal device in a future evolved network. This is not limited in this application. The terminal device in this application may alternatively be a vehicle-mounted module, a vehicle-mounted module, a vehicle-mounted component, a vehicle-mounted chip, or a vehicle-mounted unit that is embedded in a vehicle as one or more components or units. The vehicle may implement the method in this application by using the vehicle-mounted module, the vehicle-mounted module, the vehicle-mounted component, the vehicle-mounted chip, or the vehicle-mounted unit that is embedded in the vehicle.

It should be noted that the communications system 100 shown in FIG. 1 is merely used as an example and is not intended to limit technical solutions in this application. A person skilled in the art should understand that in a specific implementation process, the communications system 100 may further include another device, and a quantity of network devices and a quantity of terminal devices may alternatively be determined based on a specific requirement. In addition, the network elements in FIG. 1 may alternatively be connected through another interface. This is not limited.

Optionally, each network element in FIG. 1 in this embodiment of this application, for example, the network device 102 or the terminal device 106, may be a function module in an apparatus. It may be understood that the function module may be an element in a hardware device, for example, a communications chip or a communications component in a terminal device or a network device, may be a software function module running on hardware, or may be an instantiated virtualization function on a platform (for example, a cloud platform).

Figure 2:
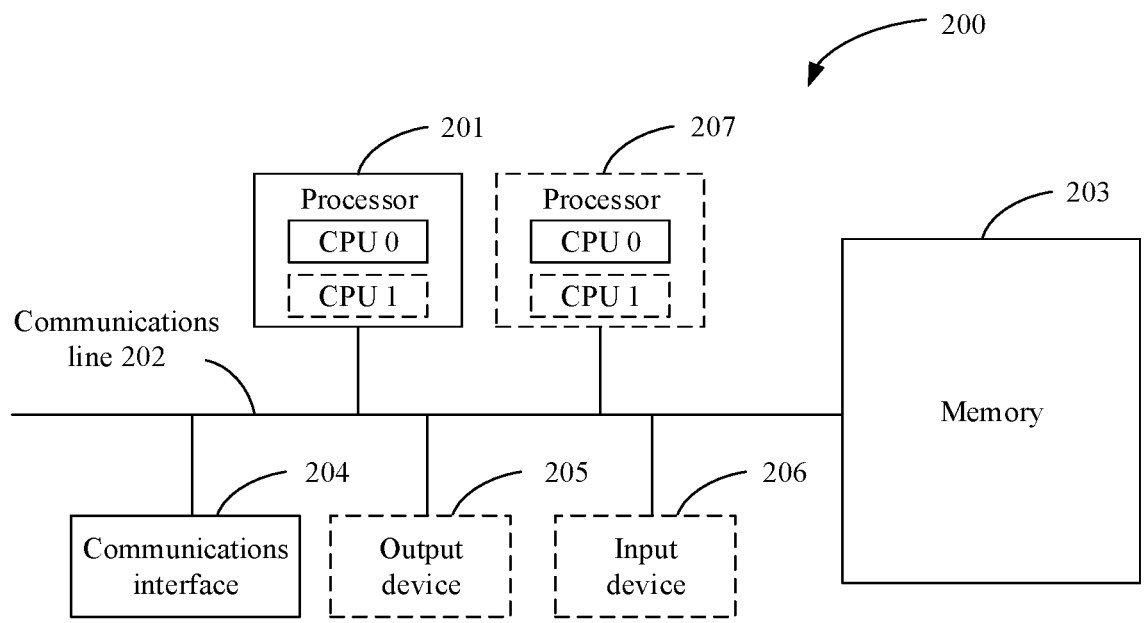
FIG. 2 is a schematic diagram of a hardware structure of a communications apparatus according to an embodiment of this application.

For example, each network element in FIG. 1 may be implemented by using a communications apparatus 200 in FIG. 2. FIG. 2 is a schematic diagram of a hardware structure of a communications apparatus applicable to an embodiment of this application. The communications apparatus 200 may include at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits configured to control program execution of the solutions in this application.

The communications line 202 may include a path on which information is transferred between the foregoing components, for example, a bus.

The communications interface 204 is configured to communicate with another device or a communications network by using any apparatus such as a transceiver, for example, an ethernet interface, a radio access network interface (RAN), or a wireless local area network interface (WLAN).

The memory 203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the communications line 202. The memory may alternatively be integrated with the processor. The memory provided in this embodiment of this application may usually be non-volatile. The memory 203 is configured to store a computer-executable instruction for executing the solutions in this application, and the execution is controlled by the processor 201. The processor 201 is configured to execute the computer-executable instruction stored in the memory 203, to implement the method provided in the embodiments of this application.

Optionally, the computer-executable instruction in this embodiment of this application may also be referred to as application program code. This is not specifically limited in this embodiment of this application.

During specific implementation, in an embodiment, the processor 201 may include one or more CPUs such as a CPU 0 and a CPU 1 shown in FIG. 2.

During specific implementation, in an embodiment, the communications apparatus 200 may include a plurality of processors such as the processor 201 and a processor 207 in FIG. 2. Each of the processors may be a single-core (single-CPU) processor or a multi-core (multi-CPU) processor. The processor herein may refer to one or more devices, circuits, and/or processing cores configured to process data (for example, a computer program instruction).

During specific implementation, in an embodiment, the communications apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector (projector), or the like. The input device 206 communicates with the processor 201, and may receive an input from a user in a plurality of manners. For example, the input device 206 may be a mouse, a keyboard, a touchscreen device, or a sensing device.

During specific implementation, the communications apparatus 200 may be a desktop computer, a portable computer, a network server, a personal digital assistant (PDA), a mobile phone, a tablet computer, a wireless terminal device, an embedded device, or a device having a structure similar to that in FIG. 2. A type of the communications apparatus 200 is not limited in this embodiment of this application.

A method for determining CSI-RS resource mapping provided in the embodiments of this application is specifically described below with reference to FIG. 1 and FIG. 2. Network elements in the following embodiments may have the components shown in FIG. 2.

It should be noted that names of messages between the network elements, names of parameters in the messages, or the like in the following embodiments of this application are merely an example, and there may be other names during specific implementation. This is not specifically limited in the embodiments of this application.

It may be understood that, in the embodiments of this application, a terminal device may perform some or all of steps in the embodiments of this application. The steps are merely examples. In the embodiments of this application, other steps or variations of various steps may be further performed. In addition, the steps may be performed in different sequences presented in the embodiments of this application, and not all steps in the embodiments of this application may need to be performed.

Figure 3:
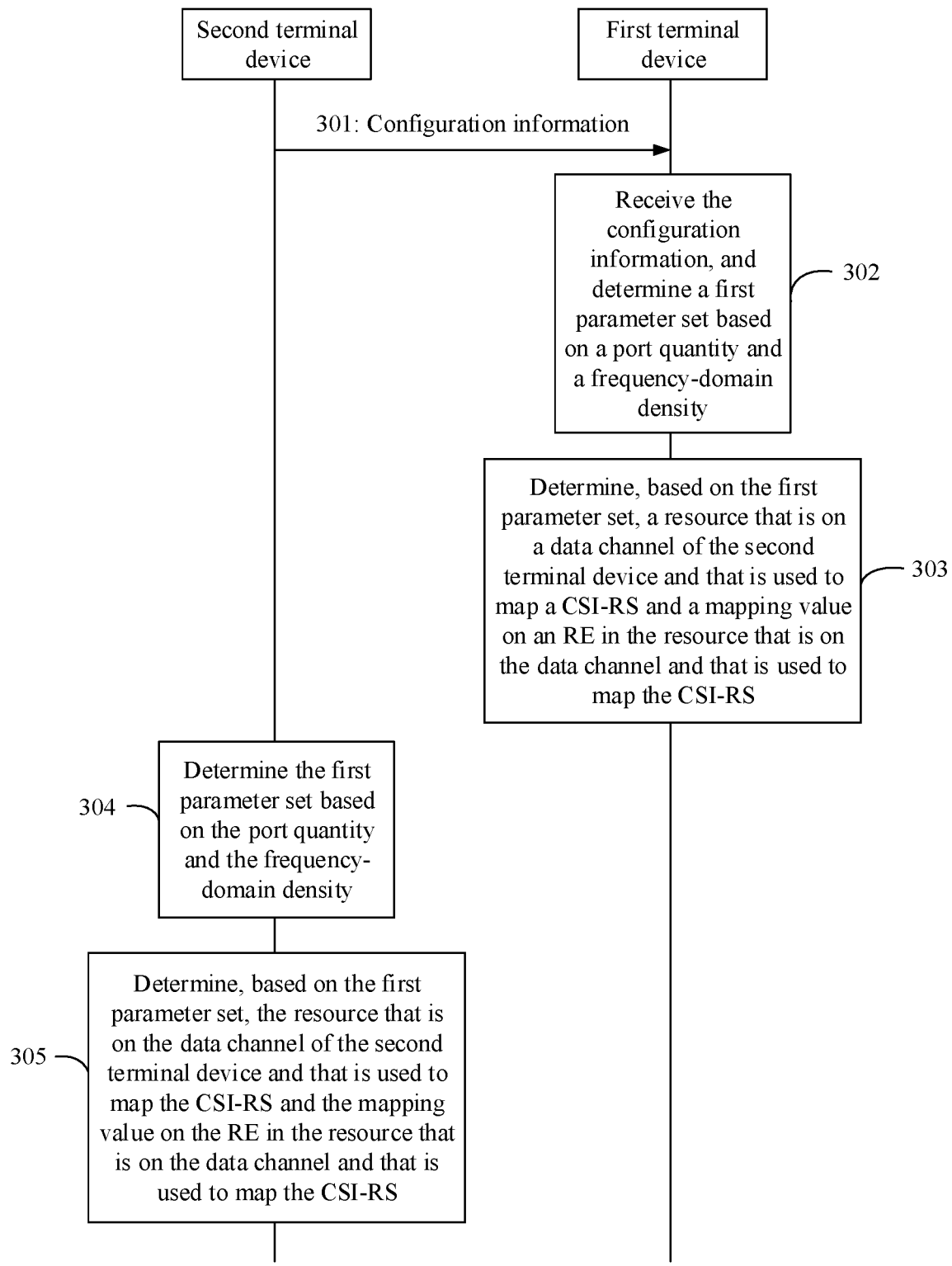
FIG. 3 is a schematic flowchart 1 of a method for determining CSI-RS resource mapping according to an embodiment of this application.

FIG. 3 shows a method for determining CSI-RS resource mapping according to an embodiment of this application. The method for determining CSI-RS resource mapping is described by using an SL as an example. The method for determining CSI-RS resource mapping includes step 301 to step 305.

Step 301: A second terminal device or a network device sends configuration information to a first terminal device.

The first terminal device and the second terminal device may be terminal devices in the communications system shown in FIG. 1. For example, the first terminal device may be the terminal device 103 in the communications system shown in FIG. 1, and the second terminal device may be the terminal device 104 in the communications system shown in FIG. 1. For another example, the first terminal device may be the terminal device 106 in the communications system shown in FIG. 1, and the second terminal device may be the terminal device 104 in the communications system shown in FIG. 1.

The network device may be a network device in the communications system shown in FIG. 1. For example, if the first terminal device is the terminal device 103 in the communications system shown in FIG. 1, the network device may be the network device 101 in the communications system shown in FIG. 1; or if the first terminal device is the terminal device 106 in the communications system shown in FIG. 1, the network device may be the network device 102 in the communications system shown in FIG. 1.

The configuration information may include a port quantity corresponding to a CSI-RS and a frequency-domain density corresponding to the CSI-RS.

The frequency-domain density corresponding to the CSI-RS may be an average quantity of resource elements (RE) occupied on a resource block (RB) by each port corresponding to the CSI-RS.

Optionally, the CSI-RS may alternatively be expressed as an SL CSI-RS.

Optionally, the frequency-domain density is 0.5 REs/port/RB, or the frequency-domain density is a positive integer, and the frequency-domain density is greater than or equal to 1 RE/port/RB.

Optionally, before the first terminal device performs SL channel estimation, the second terminal device or the network device sends the configuration information to the first terminal device.

In a case, if the first terminal device and the second terminal device are in a service coverage area of a same network device (for example, the first terminal device is the terminal device 103 in the communications system shown in FIG. 1, and the second terminal device is the terminal device 104 in the communications system shown in FIG. 1), the second terminal device or the network device may send the configuration information to the first terminal device.

For example, the second terminal device sends the configuration information to the first terminal device, and subsequently, the second terminal device and the first terminal device may perform resource mapping based on the configuration information. Alternatively, the network device sends the configuration information to the first terminal device, after receiving the configuration information, the first terminal device forwards the configuration information to the second terminal device, and subsequently, the second terminal device and the first terminal device may perform resource mapping based on the configuration information. Alternatively, the network device sends the configuration information to the first terminal device and the second terminal device, and subsequently, the second terminal device and the first terminal device may perform resource mapping based on the configuration information. Alternatively, the network device sends the configuration information to the second terminal device, after receiving the configuration information, the second terminal device forwards the configuration information to the first terminal device, and subsequently, the second terminal device and the first terminal device may perform resource mapping based on the configuration information.

In another case, if the first terminal device and the second terminal device are not in a service coverage area of a same network device (for example, the first terminal device is the terminal device 106 in the communications system shown in FIG. 1, and the second terminal device is the terminal device 104 in the communications system shown in FIG. 1), or the first terminal device and the second terminal device are not in a service coverage area of a network device, the second terminal device sends the configuration information to the first terminal device, and subsequently, the second terminal device and the first terminal device may perform resource mapping based on the configuration information.

Optionally, if the network device sends the configuration information to the first terminal device, the configuration information is carried in radio resource control (RRC) signaling.

For example, the network device sends the RRC signaling to the first terminal device, and the RRC signaling may carry the configuration information. In the RRC signaling, a CSI-RS resource mapping information element (IE) may be used to indicate CSI-RS resource mapping. A design of the CSI-RS-ResourceMapping IE may be shown as follows:

```
CSI-RS-ResourceMapping ::= SEQUENCE {
    nrofPorts                    ENUMERATED {p1, p2, p4},
    density                      CHOICE {
        dot5                         ENUMERATED {evenPRBs, oddPRBs},
        one                          NULL,
        two                          NULL,
        three                        NULL
    },
    ...
}
``` nrofPorts may be used to indicate the port quantity, the port quantity may be 1, 2, or 4, density may be used to indicate the frequency-domain density, and the frequency-domain density may be 0.5 REs/port/RB, 1 RE/port/RB, 2 REs/port/RB, or 3 REs/port/RB.

A design of the CSI-RS-ResourceMapping IE may alternatively be shown as follows:

```
CSI-RS-ResourceMapping ::= SEQUENCE {
    nrofPorts       ENUMERATED {p1, p2, p4},
    density         ENUMERATED {one, two, three},
    ...
}
``` nrofPorts may be used to indicate the port quantity, the port quantity may be 1, 2, or 4, density may be used to indicate the frequency-domain density, and the frequency-domain density may be 1 RE/port/RB, 2 REs/port/RB, or 3 REs/port/RB.

Optionally, if the second terminal device sends the configuration information to the first terminal device, the configuration information is carried in PC5 RRC signaling.

For example, the second terminal device sends the PC5 RRC signaling to the first terminal device, where the PC5 RRC signaling may include the configuration information. In the PC5 RRC signaling, an SL CSI-RS resource mapping (SL-CSI-RS-ResourceMapping) IE may be used to indicate CSI-RS resource mapping. A design of the SL-CSI-RS-ResourceMapping IE may be shown as follows:

```
SL-CSI-RS-ResourceMapping ::= SEQUENCE {
    nrofPorts                       ENUMERATED {p1, p2, p4},
    density                         CHOICE {
        dot5                        ENUMERATED {evenPRBs, oddPRBs},
        one                                    NULL,
        two                                    NULL,
        three                                  NULL
    },
    ...
}
``` nrofPorts may be used to indicate the port quantity, the port quantity may be 1, 2, or 4, density may be used to indicate the frequency-domain density, and the frequency-domain density may be 0.5 REs/port/RB, 1 RE/port/RB, 2 REs/port/RB, or 3 REs/port/RB.

A design of the SL-CSI-RS-ResourceMapping IE may alternatively be shown as follows:

```
SL-CSI-RS-ResourceMapping ::=SEQUENCE {
    nrofPorts                       ENUMERATED {p1, p2, p4},
    density                         ENUMERATED {one, two, three},
    ...
}
``` nrofPorts may be used to indicate the port quantity, the port quantity may be 1, 2, or 4, density may be used to indicate the frequency-domain density, and the frequency-domain density may be 1 RE/port/RB, 2 REs/port/RB, or 3 REs/port/RB.

Step 302: The first terminal device receives the configuration information, and determines a first parameter set based on the port quantity and the frequency-domain density.

The first parameter set may include at least one of the following parameters: a CDM type corresponding to the CSI-RS, at least one CDM group number, a frequency domain resource starting point of at least one CDM group, or a frequency domain resource number in a CDM group.

The CDM type corresponding to the CSI-RS may include: not using CDM (no CDM) and performing CSI-RS CDM on two ports in frequency domain (FD-CDM2).

The CDM group number may include a number of each CDM group corresponding to the CSI-RS in all CDM groups corresponding to the CSI-RS.

The frequency domain resource starting point of the CDM group may include a frequency domain resource starting point of each CDM group corresponding to the CSI-RS.

The frequency domain resource number in the CDM group may include a number of each RE in the CDM group in frequency domain resources corresponding to the CDM group.

Optionally, the first terminal device maintains a first mapping table.

The first mapping table includes a mapping relationship between both at least one port quantity and at least one frequency-domain density and at least one first parameter set.

Optionally, that the first terminal device determines a first parameter set based on the port quantity and the frequency-domain density includes: obtaining, by the first terminal device, the first parameter set through table lookup based on the port quantity and the frequency-domain density.

For example, the first mapping table may be shown in Table 1. The first terminal device may determine the first parameter set by looking up in Table 1. In Table 1, when the port quantity is 1 and the frequency-domain density is 1 RE/port/RB or 0.5 REs/port/RB, it may be determined that the first parameter set includes: no CDM, a frequency domain resource starting point 0 of a CDM group, a CDM group number 0, and a frequency domain resource number 0 in the CDM group. When the port quantity is 1 and the frequency-domain density is 2 REs/port/RB, it may be determined that the first parameter set includes: no CDM, frequency domain resource starting points 0 and 6 of the CDM group, CDM group numbers 0 and 0, and the frequency domain resource number 0 in the CDM group. When the port quantity is 1 and the frequency-domain density is 3 REs/port/RB, it may be determined that the first parameter set includes: no CDM, frequency domain resource starting points 0, 4, and 8 of the CDM group, CDM group numbers 0, 0, and 0, and frequency domain resource numbers 0 and 1 in the CDM group. When the port quantity is 2 and the frequency-domain density is 1 RE/port/RB or 0.5 REs/port/RB, it may be determined that the first parameter set includes: FD-CDM2, the frequency domain resource starting point 0 of the CDM group, the CDM group number 0, and the frequency domain resource numbers 0 and 1 in the CDM group. When the port quantity is 2 and the frequency-domain density is 2 REs/port/RB, it may be determined that the first parameter set includes: FD-CDM2, the frequency domain resource starting points 0 and 6 of the CDM group, the CDM group numbers 0 and 0, and the frequency domain resource numbers 0 and 1 in the CDM group. When the port quantity is 2 and the frequency-domain density is 3 REs/port/RB, it may be determined that the first parameter set includes: FD-CDM2, the frequency domain resource starting points 0, 4, and 8 of the CDM group, the CDM group numbers 0, 0, and 0, and the frequency domain resource number 0 in the CDM group. When the port quantity is 4 and the frequency-domain density is 1 RE/port/RB or 0.5 REs/port/RB, it may be determined that the first parameter set includes: FD-CDM2, frequency domain resource starting points 0 and 2 of the CDM group, CDM group numbers 0 and 1, and the frequency domain resource numbers 0 and 1 in the CDM group. When the port quantity is 4 and the frequency-domain density is 2 REs/port/RB, it may be determined that the first parameter set includes: FD-CDM2, frequency domain resource starting points 0, 2, 6, and 8 of the CDM group, CDM group numbers 0, 1, 0, and 1, and the frequency domain resource numbers 0 and 1 in the CDM group. When the port quantity is 4 and the frequency-domain density is 3 REs/port/RB, it may be determined that the first parameter set includes: an FD-CDM2, frequency domain resource starting points 0, 4, 6, 8, and 10 of the CDM group, CDM group numbers 0, 1, 0, 1, 0, and 1, and the frequency domain resource numbers 0 and 1 in the CDM group.

It should be noted that Table 1 to Table 3 are merely examples of the first mapping table. During actual application, the first mapping table may alternatively include a row or several rows in the tables, all in the tables, more rows than those shown in the tables, several columns in the tables, or more columns than those shown in the tables. This is not limited.

TABLE 1

| Row number | Port quantity | Frequency-domain density (RE/port/RB) | CDM type | Frequency domain resource starting point of a CDM group | CDM group number | Frequency domain resource number in the CDM group |
|---|---|---|---|---|---|---|
| 1 | 1 | 1 or 0.5 | No CDM | 0 | 0 | 0 |
| 2 | 1 | 2 | No CDM | 0 and 6 | 0 and 0 | 0 |
| 3 | 1 | 3 | No CDM | 0, 4, and 8 | 0, 0, and 0 | 0 |
| 4 | 2 | 1 or 0.5 | FD-CDM2 | 0 | 0 | 0 and 1 |
| 5 | 2 | 2 | FD-CDM2 | 0 and 6 | 0 and 0 | 0 and 1 |
| 6 | 2 | 3 | FD-CDM2 | 0, 4, and 8 | 0, 0, and 0 | 0 and 1 |
| 7 | 4 | 1 or 0.5 | FD-CDM2 | 0 and 2 | 0 and 1 | 0 and 1 |
| 8 | 4 | 2 | FD-CDM2 | 0, 2, 6, and 8 | 0, 1, 0, and 1 | 0 and 1 |
| 9 | 4 | 3 | FD-CDM2 | 0, 2, 4, 6, 8, and 10 | 0, 1, 0, 1, 0, and 1 | 0 and 1 |

In some embodiments, if the frequency-domain density does not include 0.5 REs/port/RB, the first mapping table may be shown in Table 2.

TABLE 2

| Row number | Port quantity | Frequency-domain density (RE/port/RB) | CDM type | Frequency domain resource starting point of a CDM group | CDM group number | Frequency domain resource number in the CDM group |
|---|---|---|---|---|---|---|
| 1 | 1 | 1 | No CDM | 0 | 0 | 0 |
| 2 | 1 | 2 | No CDM | 0 and 6 | 0 and 0 | 0 |
| 3 | 1 | 3 | No CDM | 0, 4, and 8 | 0, 0, and 0 | 0 |
| 4 | 2 | 1 | FD-CDM2 | 0 | 0 | 0 and 1 |
| 5 | 2 | 2 | FD-CDM2 | 0 and 6 | 0 and 0 | 0 and 1 |
| 6 | 2 | 3 | FD-CDM2 | 0, 4, and 8 | 0, 0, and 0 | 0 and 1 |
| 7 | 4 | 1 | FD-CDM2 | 0 and 2 | 0 and 1 | 0 and 1 |
| 8 | 4 | 2 | FD-CDM2 | 0, 2, 6, and 8 | 0, 1, 0, and 1 | 0 and 1 |
| 9 | 4 | 3 | FD-CDM2 | 0, 2, 4, 6, 8, and 10 | 0, 1, 0, 1, 0, and 1 | 0 and 1 |

In some embodiments, if the frequency-domain density is 0.5 REs/port/RB, the first mapping table may be shown in Table 3.

The following describes the first parameter set by using an example in which the port quantity is 4 and the frequency-domain density is 1 RE/port/RB.

If the port quantity is 4 and the frequency-domain density is 1 RE/port/RB, the first parameter set may be obtained through table lookup. The first parameter set includes:

TABLE 3

| Row number | Port quantity | Frequency-domain density (RE/port/RB) | CDM type | Frequency domain resource starting point of a CDM group | CDM group number | Frequency domain resource number in the CDM group |
|---|---|---|---|---|---|---|
| 1 | 1 | 0.5 | No CDM | 0 | 0 | 0 |
| 2 | 2 | 0.5 | FD-CDM2 | 0 | 0 | 0 and 1 |
| 3 | 4 | 0.5 | FD-CDM2 | 0 and 2 | 0 and 1 | 0 and 1 |

FD-CDM2, the frequency domain resource starting points 0 and 2 of the CDM group, the CDM group numbers 0 and 1, and the frequency domain resource numbers 0 and 1 in the CDM group.

Figure 4:
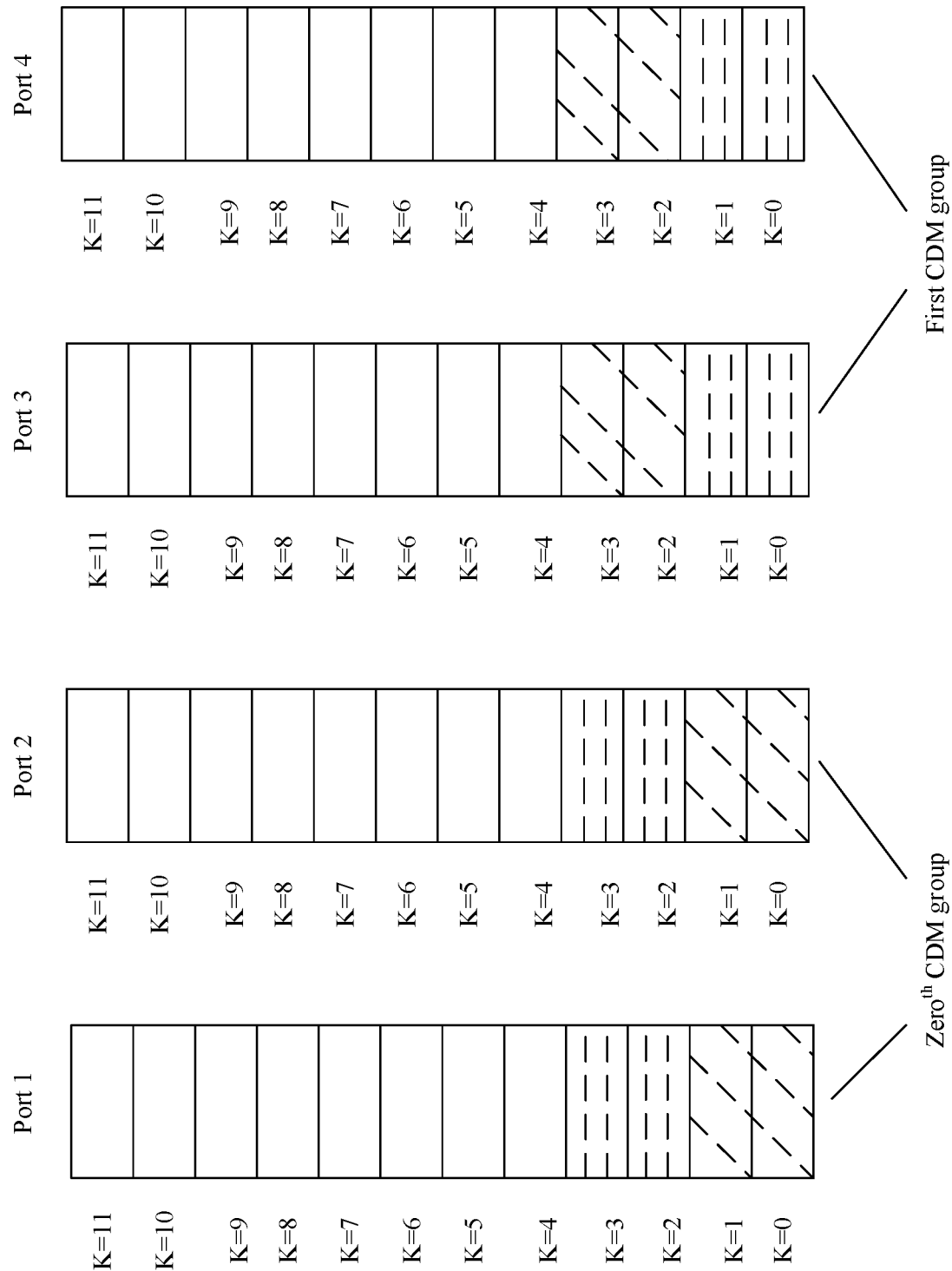
FIG. 4 is a schematic diagram of frequency domain resources used to map a CSI-RS according to an embodiment of this application.

FIG. 4 is a schematic diagram of frequency domain resources used to map a CSI-RS when the port quantity is 4 and the frequency-domain density is 1 RE/port/RB. In FIG. 4, in RBs corresponding to a port 1 and a port 2, frequency domain resources (dashed oblique line parts in the port 1 and the port 2 in FIG. 4) used to map the CSI-RS are numbered 0 and 1 in the RBs, and a corresponding CDM group number is 0. In RBs corresponding to a port 3 and a port 4, frequency domain resources (dashed oblique line parts in the port 3 and the port 4 in FIG. 4) used to map the CSI-RS are numbered 2 and 3 in the RBs, and a corresponding CDM group number is 1.

During actual application, to ensure accuracy of channel estimation, no reference signal or data symbol is transmitted on frequency domain resources numbered 2 and 3 (dashed straight line parts in the port 1 and the port 2 in FIG. 4) in the RBs corresponding to the port 1 and the port 2 and frequency domain resources numbered 0 and 1 (dashed straight line parts in the port 3 and the port 4 in FIG. 4) in the RBs corresponding to the port 3 and the port 4.

It should be noted that the port 1, the port 2, the port 3, or the port 4 is merely an example of a port identifier. During specific application, the port identifier may alternatively be in another form. This is not limited.

Step 303: The first terminal device determines, based on the first parameter set, a resource that is on a data channel of the second terminal device and that is used to map the CSI-RS and a mapping value on an RE in the resource that is on the data channel and that is used to map the CSI-RS.

The data channel may be a physical sidelink shared channel (PSSCH).

The resource used to map the CSI-RS may include a frequency domain resource used to map the CSI-RS, a time domain resource used to map the CSI-RS, and a space domain resource used to map the CSI-RS.

The frequency domain resource used to map the CSI-RS may be used to indicate a frequency domain position at which the second terminal device sends the CSI-RS. The time-domain resource used to map the CSI-RS may be used to indicate a time domain position at which the second terminal device sends the CSI-RS. The space domain resource used to map the CSI-RS may be used to indicate a port on which the second terminal device sends the CSI-RS.

Optionally, the frequency domain resource used to map the CSI-RS is determined based on the first parameter set.

Further, optionally, the frequency domain resource used to map the CSI-RS satisfies: $k = n N_{sc}^{RB} + \bar{k} + k'$.

n represents a number of an RB, $N_{sc}^{RB}$ represents a quantity of subcarriers in an RB, $\bar{k}$ represents a frequency domain resource starting point of a CDM group, and k' represents a frequency domain resource number in the code division multiplexing group.

Optionally, $N_{sc}^{RB}$ is 12.

Optionally, the time domain resource used to map the CSI-RS is the last symbol on the data channel.

Optionally, an identifier of the last symbol on the data channel is less than or equal to 12.

Figure 5:
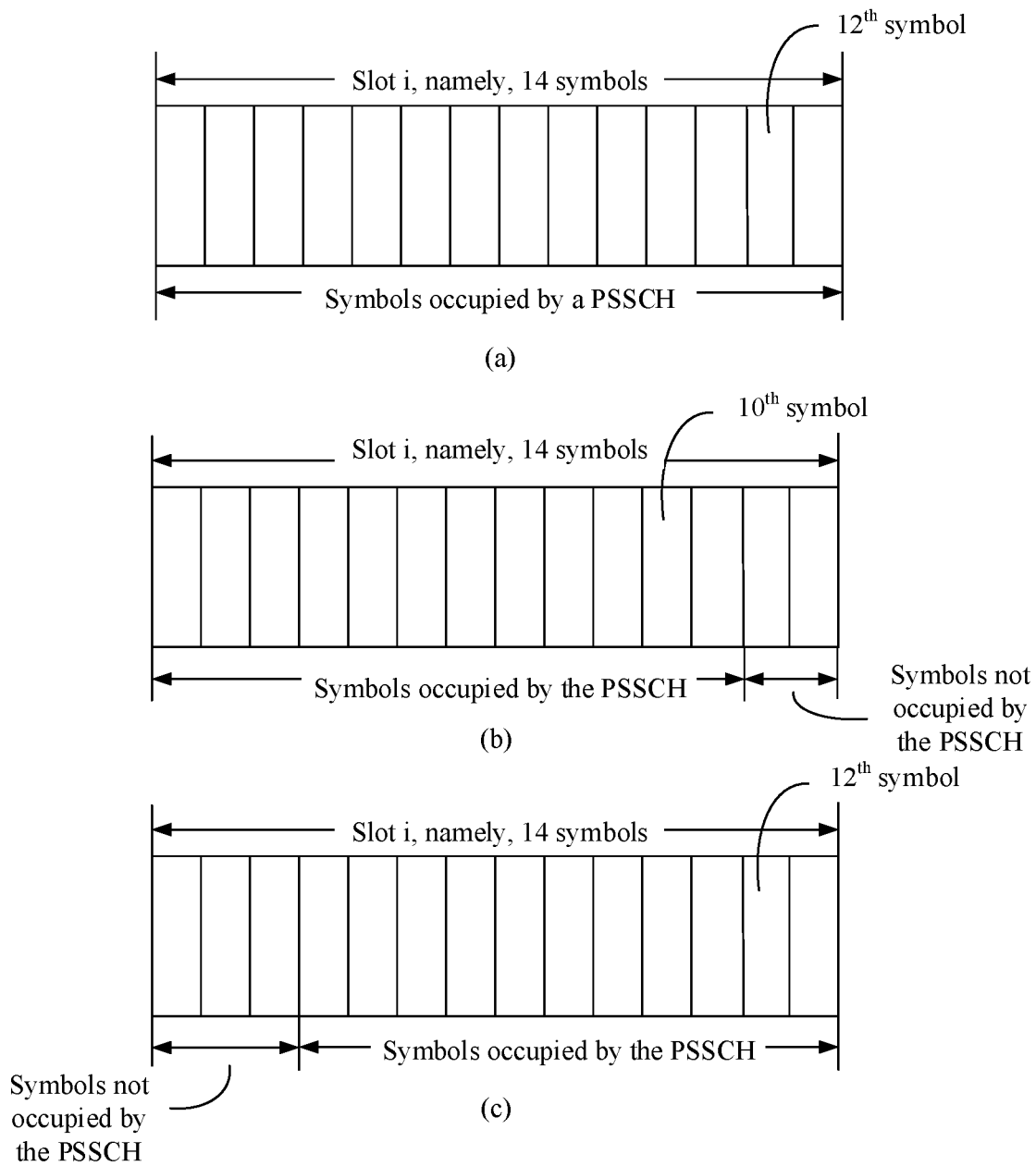
FIG. 5 is a schematic diagram of a time domain resource used to map a CSI-RS according to an embodiment of this application.

FIG. 5 is a schematic diagram of the time domain resource used to map the CSI-RS. In FIG. 5, an example in which the data channel is a PSSCH is used. In (a) in FIG. 5, in a slot i, the PSSCH occupies one slot, namely, 14 symbols. In the symbols occupied by the PSSCH, the first and last symbols are respectively used as an automatic gain control (auto-matic gain control, AGC) symbol and a time interval required for slot switching. Therefore, a number l of the time domain resource used to map the CSI-RS may be a $12^{th}$ symbol in the slot i.

In (b) in FIG. 5, in a slot i, the PSSCH occupies a $zero^{th}$ symbol to an $11^{th}$ symbol. In the symbols occupied by the PSSCH, the first and last symbols are respectively used as an AGC symbol and a time interval required for slot switching. Therefore, a number l of the time domain resource used to map the CSI-RS may be a $10^{th}$ symbol in the slot i.

In (c) in FIG. 5, in a slot i, the PSSCH occupies a third symbol to a $13^{th}$ symbol. In the symbols occupied by the PSSCH, the first and last symbols are respectively used as an AGC symbol and a time interval required for slot switching. Therefore, a number l of the time domain resource used to map the CSI-RS may be a $12^{th}$ symbol in the slot i.

Optionally, the space domain resource used to map the CSI-RS is determined based on the first parameter set.

Further, optionally, the space domain resource used to map the CSI-RS satisfies:

$$p = p_{CSIRS} + s + jL.$$

p represents a space domain resource number, $p_{CSIRS}$ represents a start port number of the CSI-RS, s represents a sequence number of a CDM sequence, j represents a CDM group number, and L represents a CDM group size.

Optionally, $p_{CSIRS}$ is 5000.

Optionally, if the CDM type is no CDM, s=0. If the CDM type is FD-CDM2, there are two possible CDM sequences. One is $[w_f(0), w_f(1)] = [+1, +1]$, and the other is $[w_f(0), w_f(1)] = [+1, -1]$. In a possible implementation, s corresponding to a CSI-RS mapped on the first port in the CDM group is 0, and the CDM sequence is $[w_f(0), w_f(1)] = [+1, +1]$; and s corresponding to the CSI-RS mapped on the second port in the CDM group is 1, and the CDM sequence is $[w_f(0), w_f(1)] = [+1, -1]$.

Optionally, if the CDM type is no CDM, L=1. If the CDM type is FD-CDM2, L is 2.

Optionally, the mapping value on the RE in the resource that is on the data channel of the second terminal device and that is used to map the CSI-RS satisfies:

$$a_{k,l}^{(p,\mu)} = \beta_{CSIRS} w_f(k') r(m')$$

$a_{k,l}^{(p,\mu)}$ represents a mapping value on an RE corresponding to the time domain resource number l, a frequency domain resource number k, a space domain resource number p, and a subcarrier spacing number μ, $\beta_{CSIRS}$ represents a power control factor of the CSI-RS, where $\beta_{CSIRS}$ can enable a transmit power of the CSI-RS to be the same as a transmit power of a data symbol on the data channel, $w_f(k')$ represents a value of a $k'_{th}$ element in a CDM sequence corresponding to a CDM group on a frequency domain resource, k' represents a frequency domain resource number in the CDM group, and r(m') represents a value of an $m'_{th}$ element in a reference signal sequence of the CSI-RS.

Optionally, if the CDM type is no CDM, a value of $w_f(k')$ is always 1. When the CDM type is FD-CDM2, a value of $w_f(k')$ is determined based on the CDM sequence and k'.

For example, when the CDM type is FD-CDM2 and the CDM sequence is $[w_f(0), w_f(1)] = [+1, +1]$, if k' is 0, $w_f(k')$ is 1; or if k' is 1, $w_f(k')$ is also 1. Similarly, when the CDM type is FD-CDM2 and the CDM sequence is $[w_f(0), w_f(1)] = [+1, -1]$, if k is 0, $w_f(k')$ is 1; or if k' is 1, $w_f(k')$ is −1.

Optionally, m' satisfies:

$$m' = \lfloor n\alpha \rfloor + k'\lceil \rho \rceil + \left\lfloor \frac{\bar{k}\rho}{N_{sc}^{RB}} \right\rfloor,$$

n represents a number of an RB, α is an intermediate variable calculated based on the port quantity and the frequency-domain density, ⌊ ⌋ represents rounding down, ⌈ ⌉ represents rounding up, ρ represents the frequency-domain density, $\bar{k}$ represents a frequency domain resource starting point of a CDM group, and $N_{sc}^{RB}$ represents a quantity of subcarriers in an RB.

Optionally, if the port quantity is 1, α=ρ; or if the port quantity is greater than 1, α=2ρ.

Optionally, the CSI-RS and the PSSCH have a same bandwidth.

It should be noted that, compared with a formula $$m' = \lfloor n\alpha \rfloor + k'\lceil \rho \rceil + \left\lfloor \frac{\bar{k}\rho}{N_{sc}^{RB}} \right\rfloor,$$

of m' in the current technology, a formula of m' provided in this embodiment of this application has one more item ⌈ρ⌉. Therefore, when the port quantity is greater than or equal to 2 and the frequency-domain density is greater than or equal to 2, the CSI-RS sequence can be properly used, and detection performance of the CSI-RS sequence can be improved.

For example, Table 4 shows specific cases of m' provided in this embodiment of this application and m' in the current technology when the port quantity is greater than or equal to 2 and the frequency-domain density is greater than or equal to 2.

In Table 4, when the port quantity is 2 and the frequency-domain density is 2, m' in the current technology is ⌊4n⌋+m, where m∈{0,1,2}, and m' provided in this embodiment of this application is ⌊4n⌋+m, where m∈{0,1,2,3}. When the port quantity is 2 and the frequency-domain density is 3, m' in the current technology is ⌊6n⌋+m, where m∈{0,1,2,3}, an m' provided in this embodiment of this application is ⌊6n⌋+m, where m∈{0,1,2,3,4,5}. When the port quantity is 4 and the frequency-domain density is 2, m' in the current technology is ⌊4n⌋+m, where m∈{0,1,2}, and m' provided in this embodiment of this application is ⌊4n⌋+m, where m∈{0,1,2,3}. When the port quantity is 4 and the frequency-domain density is 3, m' in the current technology is ⌊6n⌋+m, where m∈{0,1,2,3}, an m' provided in this embodiment of this application is ⌊6n⌋+m, where m∈{0,1,2,3,4,5}. It can be learned that when the port quantity is greater than or equal to 2, and the frequency-domain density is greater than or equal to 2, m' provided in this embodiment of this application has more values than m' provided in the current technology. Therefore, the CSI-RS sequence can be properly used, and detection performance of the CSI-RS sequence can be improved.

TABLE 4

| Port quantity | Frequency-domain density (RE/port/RB) | Frequency domain resource starting point of a CDM group | Frequency domain resource number in the CDM group | m' in the current technology | m' provided in this embodiment of this application |
|---|---|---|---|---|---|
| 2 | 2 | 0 and 6 | 0 and 1 | ⌊4n⌋ + m  m ∈ {0,1,2} | ⌊4n⌋ + m  m ∈ {0,1,2,3} |
| 2 | 3 | 0, 4, and 8 | 0 and 1 | ⌊6n⌋ + m  m ∈ {0,1,2,3} | ⌊6n⌋ + m  m ∈ {0,1,2,3,4,5} |
| 4 | 2 | 0, 2, 6, and 8 | 0 and 1 | ⌊4n⌋ + m  m ∈ {0,1,2} | ⌊4n⌋ + m  m ∈ {0,1,2,3} |
| 4 | 3 | 0, 2, 4, 6, 8, and 10 | 0 and 1 | ⌊6n⌋ + m  m ∈ {0,1,2,3} | ⌊6n⌋ + m  m ∈ {0,1,2,3,4,5} |

Step 304: The second terminal device determines the first parameter set based on the port quantity and the frequency-domain density.

For a specific process of step 304, refer to the process of determining, by the first terminal device, the first parameter set based on the port quantity and the frequency-domain density in step 302. Details are not described again.

Step 305: The second terminal device determines, based on the first parameter set, the resource that is on the data channel of the second terminal device and that is used to map the CSI-RS and the mapping value on the RE in the resource that is on the data channel and that is used to map the CSI-RS.

For a specific process of step 305, refer to the specific process of determining, by the first terminal device based on the first parameter set, the resource that is on the data channel of the second terminal device and that is used to map the CSI-RS and the mapping value on the RE in the resource that is on the data channel and that is used to map the CSI-RS in step 303. Details are not described again.

Subsequently, the second terminal device may send the data channel to the first terminal device, and the first terminal device may receive the data channel from the second terminal device, and perform channel estimation based on the resource used to map the CSI-RS and the mapping value on the RE in the resource used to map the CSI-RS.

It should be noted that the first terminal device may first receive the data channel from the second terminal device, and then determine, based on the first parameter set, the resource that is the data channel of the second terminal device and that is used to map the CSI-RS and the mapping value on the RE in the resource that is on the data channel and that is used to map the CSI-RS. Alternatively, the first terminal device may first determine, based on the first parameter set, the resource that is on the data channel of the second terminal device and that is used to map the CSI-RS and the mapping value on the RE in the resource that is on the data channel and that is used to map the CSI-RS, and then receive the data channel from the second terminal device. Alternatively, the first terminal device may determine, based on the first parameter set when receiving the data channel from the second terminal device, the resource that is on the data channel of the second terminal device and that is used to map the CSI-RS and the mapping value on the RE in the resource that is on the data channel and that is used to map the CSI-RS. This is not limited.

It should be noted that an execution sequence between both step 302 and step 303 and both step 304 and step 305 is not limited in this embodiment of this application. For example, step 302 and step 303 may be performed before step 304 and step 305; step 304 and step 305 may be performed before step 302 and step 303; or both step 302 and step 303 and both step 304 and step 305 may be simultaneously performed.

Based on the method shown in FIG. 3, the second terminal device may send the configuration information to the first terminal device. The configuration information includes the port quantity corresponding to the CSI-RS and the frequency-domain density corresponding to the CSI-RS. After receiving the port quantity corresponding to the CSI-RS and the frequency-domain density corresponding to the CSI-RS, the first terminal device may determine the first parameter set based on the port quantity corresponding to the CSI-RS and the frequency-domain density corresponding to the CSI-RS, and determine, based on the first parameter set, the resource that is on the data channel of the second terminal device and that is used to map the CSI-RS and the mapping value on the RE in the resource that is on the data channel and that is used to map the CSI-RS. In this way, the configuration information does not need to include information such as the CDM type corresponding to the CSI-RS and a frequency-domain bandwidth corresponding to the CSI-RS, but the first terminal device can also determine the resource that is on the data channel of the second terminal device and that is used to map the CSI-RS and the mapping value on the RE in the resource that is on the data channel and that is used to map the CSI-RS.

Further, optionally, in a first implementation scenario of the method shown in FIG. 3, the configuration information further includes first indication information and/or second indication information. The first indication information may be used to indicate a frequency domain offset $k_0$. The first terminal device or the second terminal device may determine the first parameter set based on the port quantity, the frequency-domain density, and the frequency domain offset. The second indication information may be used to indicate the time domain resource used to map the CSI-RS.

Optionally, if the configuration information further includes the first indication information, the first mapping table may be shown in Table 5.

determined that the first parameter set includes: no CDM, a frequency domain resource starting point $k_0$ of a CDM group, a CDM group number 0, and a frequency domain resource number 0 in the CDM group. When the port quantity is 1 and the frequency-domain density is 2 REs/port/RB, it may be determined that the first parameter set includes: no CDM, frequency domain resource starting points $k_0$ and $k_0+6$ of a CDM group, CDM group numbers 0 and 0, and a frequency domain resource number 0 in the CDM group. When the port quantity is 1 and the frequency-domain density is 3 REs/port/RB, it may be determined that the first parameter set includes: no CDM, frequency domain resource starting points $k_0$, $k_0+4$, and $k_0+8$ of a CDM group, CDM group numbers 0, 0, and 0, and a frequency domain resource number 0 in the CDM group. When the port quantity is 2 and the frequency-domain density is 1 RE/port/RB or 0.5 REs/port/RB, it may be determined that the first parameter set includes: FD-CDM2, a frequency domain resource starting point $k_0$ of a CDM group, a CDM group number 0, and frequency domain resource numbers 0 and 1 in the CDM group. When the port quantity is 2 and the frequency-domain density is 2 REs/port/RB, it may be determined that the first parameter set includes: FD-CDM2, frequency domain resource starting points $k_0$ and $k_0+6$ of a CDM group, CDM group numbers 0 and 0, and frequency domain resource numbers 0 and 1 in the CDM group. When the port quantity is 2 and the frequency-domain density is 3 REs/port/RB, it may be determined that the first parameter set includes: FD-CDM2, frequency domain resource starting points $k_0$, $k_0+4$, and $k_0+8$ of a CDM group, CDM group numbers 0, 0, and 0, and frequency domain resource numbers 0 and 1 in the CDM group. When the port quantity is 4 and the frequency-domain density is 1 RE/port/RB or 0.5 REs/port/RB, it may be determined that the first parameter set includes: FD-CDM2, frequency domain resource starting points $k_0$ and $k_0+2$ of a CDM group, CDM group numbers 0 and 1, and frequency domain resource numbers 0 and 1 in the CDM group.

TABLE 5

| Row number | Port quantity | Frequency-domain density (RE/port/RB) | CDM type | Frequency domain resource starting point of a CDM group | CDM group number | Frequency domain resource number in the CDM group |
|---|---|---|---|---|---|---|
| 1 | 1 | 1 or 0.5 | No CDM | $k_0$ | 0 | 0 |
| 2 | 1 | 2 | No CDM | $k_0$ and $k_0+6$ | 0 and 0 | 0 |
| 3 | 1 | 3 | No CDM | $k_0$, $k_0+4$, and $k_0+8$ | 0, 0, and 0 | 0 |
| 4 | 2 | 1 or 0.5 | FD-CDM2 | $k_0$ | 0 | 0 and 1 |
| 5 | 2 | 2 | FD-CDM2 | $k_0$, and $k_0+6$ | 0 and 0 | 0 and 1 |
| 6 | 2 | 3 | FD-CDM2 | $k_0$, $k_0+4$, and $k_0+8$ | 0, 0, and 0 | 0 and 1 |
| 7 | 4 | 1 or 0.5 | FD-CDM2 | $k_0$, and $k_0+2$ | 0 and 1 | 0 and 1 |

In Table 5, $k_0$ represents the frequency domain offset. When the port quantity is 1 and the frequency-domain density is 1 RE/port/RB or 0.5 REs/port/RB, it may be In some embodiments, if the frequency-domain density does not include 0.5 REs/port/RB, the first mapping table may be shown in Table 6.

TABLE 6

| Row number | Port quantity | Frequency-domain density (RE/port/RB) | CDM type | $\bar{k}$ | CDM group number | Frequency domain resource number in a CDM group |
|---|---|---|---|---|---|---|
| 1 | 1 | 1 | No CDM | $k_0$ | 0 | 0 |
| 2 | 1 | 2 | No CDM | $k_0$ and $k_0 + 6$ | 0 and 0 | 0 |
| 3 | 1 | 3 | No CDM | $k_0$, $k_0 + 4$, and $k_0 + 8$ | 0, 0, and 0 | 0 |
| 4 | 2 | 1 | FD-CDM2 | $k_0$ | 0 | 0 and 1 |
| 5 | 2 | 2 | FD-CDM2 | $k_0$, and $k_0 + 6$ | 0 and 0 | 0 and 1 |
| 6 | 2 | 3 | FD-CDM2 | $k_0$, $k_0 + 4$, and $k_0 + 8$ | 0, 0, and 0 | 0 and 1 |
| 7 | 4 | 1 | FD-CDM2 | $k_0$, and $k_0 + 2$ | 0 and 1 | 0 and 1 |

In some embodiments, if the frequency-domain density is 0.5 REs/port/RB, the first mapping table may be shown in Table 7.

TABLE 7

| Row number | Port quantity | Frequency-domain density (RE/port/RB) | CDM type | $\bar{k}$ | CDM group number | Frequency domain resource number in a CDM group |
|---|---|---|---|---|---|---|
| 1 | 1 | 0.5 | No CDM | $k_0$ | 0 | 0 |
| 4 | 2 | 0.5 | FD-CDM2 | $k_0$ | 0 | 0 and 1 |
| 7 | 4 | 0.5 | FD-CDM2 | $k_0$, and $k_0 + 2$ | 0 and 1 | 0 and 1 |

It should be noted that Table 5 and Table 6 are merely examples of the first mapping table. During actual application, the first mapping table may alternatively include a row or several rows in the tables, all in the tables, more rows than those shown in the tables, several columns in the tables, or more columns than those shown in the tables. This is not limited.

Optionally, the first indication information includes a bitmap, and the bitmap is used to indicate the frequency domain offset.

For example, the first mapping table shown in Table 5 is used as an example. When the port quantity is 1 and the frequency-domain density is 1 RE/port/RB or 0.5 REs/port/RB (namely, the first row in Table 5), the bitmap may include 12 bits (for example, the bitmap may be [$b_{11}$, $b_{10}$, ..., $b_0$]). When the port quantity is 1 and the frequency-domain density is 2 REs/port/RB (namely, the second row in Table 5), the bitmap may include six bits (for example, the bitmap may be [$b_5$, $b_4$, ..., $b_0$]). When the port quantity is 1 and the frequency-domain density is 3 REs/port/RB (namely, the third row in Table 5), the bitmap may include four bits (for example, the bitmap may be [$b_3$, $b_2$, $b_1$, $b_0$]). When the port quantity is 2 and the frequency-domain density is 1 RE/port/RB or 0.5 REs/port/RB (namely, the fourth row in Table 5), the bitmap may include six bits (for example, the bitmap may be [$b_5$, $b_4$, ..., $b_0$]). When the port quantity is 2 and the frequency-domain density is 2 REs/port/RB (namely, the fifth row in Table 5), the bitmap may include three bits (for example, the bitmap may be [$b_2$, $b_1$, $b_0$]). When the port quantity is 2 and the frequency-domain density is 3 REs/port/RB (namely, the sixth row in Table 5), the bitmap may include two bits (for example, the bitmap may be [$b_1$, $b_0$]). When the port quantity is 4 and the frequency-domain density is 1 RE/port/RB or 0.5 REs/port/RB (namely, the seventh row in Table 5), the bitmap may include three bits (for example, the bitmap may be [$b_2$, $b_1$, $b_0$]).

In a possible implementation, the frequency domain offset $k_0$ is a product of the port quantity and a location identifier of the first element whose value is 1 in the bitmap.

For example, the port quantity is 2, the frequency-domain density is 2 REs/port/RB, and the bitmap is [$b_2$, $b_1$, $b_0$]=[0, 1, 0]. The first terminal device or the second terminal device may determine that the location identifier of the first element whose value is 1 in the bitmap is 1, thereby determining that the frequency domain offset $k_0$ is 2. The first terminal device or the second terminal device may learn, through table lookup based on the port quantity 2 and the frequency-domain density 2 REs/port/RB, that the first parameter set includes: FD-CDM2, the frequency domain resource starting points 2 and 8 of the CDM group, the CDM group numbers 0 and 0, and the frequency domain resource numbers 0 and 1 in the CDM group.

In a possible implementation, the second indication information includes the number of the time domain resource used to map the CSI-RS.

Optionally, the number of the time domain resource used to map the CSI-RS is greater than or equal to 0 and less than or equal to 12.

Optionally, if the network device sends the configuration information to the first terminal device, the configuration information is carried in RRC signaling.

For example, the network device sends the RRC signaling to the first terminal device, and the RRC signaling may include the configuration information. In the RRC signaling, a CSI-RS-ResourceMapping IE may be used to indicate CSI-RS resource mapping. A design of the CSI-RS-ResourceMapping IE may be shown as follows:

```
CSI-RS-ResourceMapping ::= SEQUENCE {
    frequencyDomainAllocation       CHOICE {
        row1                            BIT STRING (SIZE (12)),
        row2                            BIT STRING (SIZE (6)),
        row3                            BIT STRING (SIZE (4)),
        row4                            BIT STRING (SIZE (6)),
        row5                            BIT STRING (SIZE (3)),
        row6                            BIT STRING (SIZE (2)),
        row7                            BIT STRING (SIZE (3)),
    },
    nrofPorts                       ENUMERATED {p1, p2, p4},
    firstOFDMSymbolInTimeDomain     INTEGER (0..12),
    density                         CHOICE {
        dot5                            ENUMERATED {evenPRBs, oddPRBs},
        one                             NULL,
        two                             NULL,
        three                           NULL
    },
    ...
}
``` frequencyDomainAllocation may be used to indicate the bitmap, and a size of the bitmap may be 12 bits, six bits, four bits, three bits, or two bits. nrofPorts may be used to indicate the port quantity. The port quantity may be 1, 2, or 4. firstOFDMSymbolInTimeDomain may be used to indicate the time domain resource used to map the CSI-RS. density may be used to indicate the frequency-domain density. The frequency-domain density may be 0.5 REs/port/RB, 1 RE/port/RB, 2 REs/port/RB, or 3 REs/port/RB.

A design of the CSI-RS-ResourceMapping IE may alternatively be shown as follows:

```
CSI-RS-ResourceMapping ::= SEQUENCE{
    frequencyDomainAllocation       CHOICE{
        row1                            BIT STRING (SIZE (12)),
        row2                            BIT STRING (SIZE (6)),
        row3                            BIT STRING (SIZE (4)),
        row4                            BIT STRING (SIZE (6)),
        row5                            BIT STRING (SIZE (3)),
        row6                            BIT STRING (SIZE (2)),
        row7                            BIT STRING (SIZE (3)),
    },
    nrofPorts                       ENUMERATED {p1, p2, p4},
    firstOFDMSymbolInTimeDomain     INTEGER (0..12),
    density                         ENUMERATED {one, two, three},
    ...
}
``` frequencyDomainAllocation may be used to indicate the bitmap, and a size of the bitmap may be 12 bits, six bits, four bits, three bits, or two bits. nrofPorts may be used to indicate the port quantity. The port quantity may be 1, 2, or 4. firstOFDMSymbolInTimeDomain may be used to indicate the time domain resource used to map the CSI-RS. density may be used to indicate the frequency-domain density. The frequency-domain density may be 1 RE/port/RB, 2 REs/port/RB, or 3 REs/port/RB.

Optionally, if the second terminal device sends the configuration information to the first terminal device, the configuration information is carried in PC5 RRC signaling.

For example, the second terminal device sends the PC5 RRC signaling to the first terminal device, where the PC5 RRC signaling may include the configuration information. In the PC5 RRC signaling, an SL-CSI-RS-ResourceMapping IE may be used to indicate CSI-RS resource mapping. A design of the SL-CSI-RS-ResourceMapping IE may be shown as follows:

```
SL-CSI-RS-ResourceMapping ::= SEQUENCE{
    frequencyDomainAllocation       CHOICE{
        row1                            BIT STRING (SIZE (12)),
        row2                            BIT STRING (SIZE (6)),
        row3                            BIT STRING (SIZE (4)),
        row4                            BIT STRING (SIZE (6)),
        row5                            BIT STRING (SIZE (3)),
        row6                            BIT STRING (SIZE (2)),
        row7                            BIT STRING (SIZE (3)),
    },
    nrofPorts                       ENUMERATED {p1, p2, p4},
    firstOFDMSymbolInTimeDomain     INTEGER (0..12),
    density                         CHOICE {
        dot5                            ENUMERATED
                                        {evenPRBs, oddPRBs},
        one                             NULL,
        two                             NULL,
        three                           NULL
    },
    ...
}
``` frequencyDomainAllocation may be used to indicate the bitmap, and a size of the bitmap may be 12 bits, six bits, four bits, three bits, or two bits. nrofPorts may be used to indicate the port quantity. The port quantity may be 1, 2, or 4. firstOFDMSymbolInTimeDomain may be used to indicate the time domain resource used to map the CSI-RS. density may be used to indicate the frequency-domain density. The frequency-domain density may be 0.5 REs/port/RB, 1 RE/port/RB, 2 REs/port/RB, or 3 REs/port/RB.

A design of the SL-CSI-RS-ResourceMapping IE may alternatively be shown as follows:

```
SL-CSI-RS-ResourceMapping ::= SEQUENCE{
    frequencyDomainAllocation       CHOICE{
        row1                            BIT STRING (SIZE (12)),
        row2                            BIT STRING (SIZE (6)),
        row3                            BIT STRING (SIZE (4)),
        row4                            BIT STRING (SIZE (6)),
        row5                            BIT STRING (SIZE (3)),
        row6                            BIT STRING (SIZE (2)),
        row7                            BIT STRING (SIZE (3)),
    },
    nrofPorts                       ENUMERATED {p1, p2, p4},
    firstOFDMSymbolInTimeDomain     INTEGER (0..12),
    density                         ENUMERATED {one, two, three},
    ...
}
``` frequencyDomainAllocation may be used to indicate the bitmap, and a size of the bitmap may be 12 bits, six bits, four bits, three bits, or two bits. nrofPorts may be used to indicate the port quantity. The port quantity may be 1, 2, or 4. firstOFDMSymbolInTimeDomain may be used to indicate the time domain resource used to map the CSI-RS. density may be used to indicate the frequency-domain density. The frequency-domain density may be 1 RE/port/RB, 2 REs/port/RB, or 3 REs/port/RB.

Based on the first implementation scenario of the method shown in FIG. 3, the configuration information further includes the first indication information and the second indication information. The first indication information is used to indicate the frequency domain offset, and the second indication information is used to indicate the time domain resource used to map the CSI-RS. The first terminal device or the second terminal device may determine the first parameter set based on the port quantity, the frequency-domain density, and the frequency domain offset, so that the first terminal device or the second terminal device determines, based on the first parameter set, the resource that is on the data channel of the second terminal device and that is used to map the CSI-RS and the mapping value on the RE in the resource that is on the data channel and that is used to map the CSI-RS.

Figure 6:
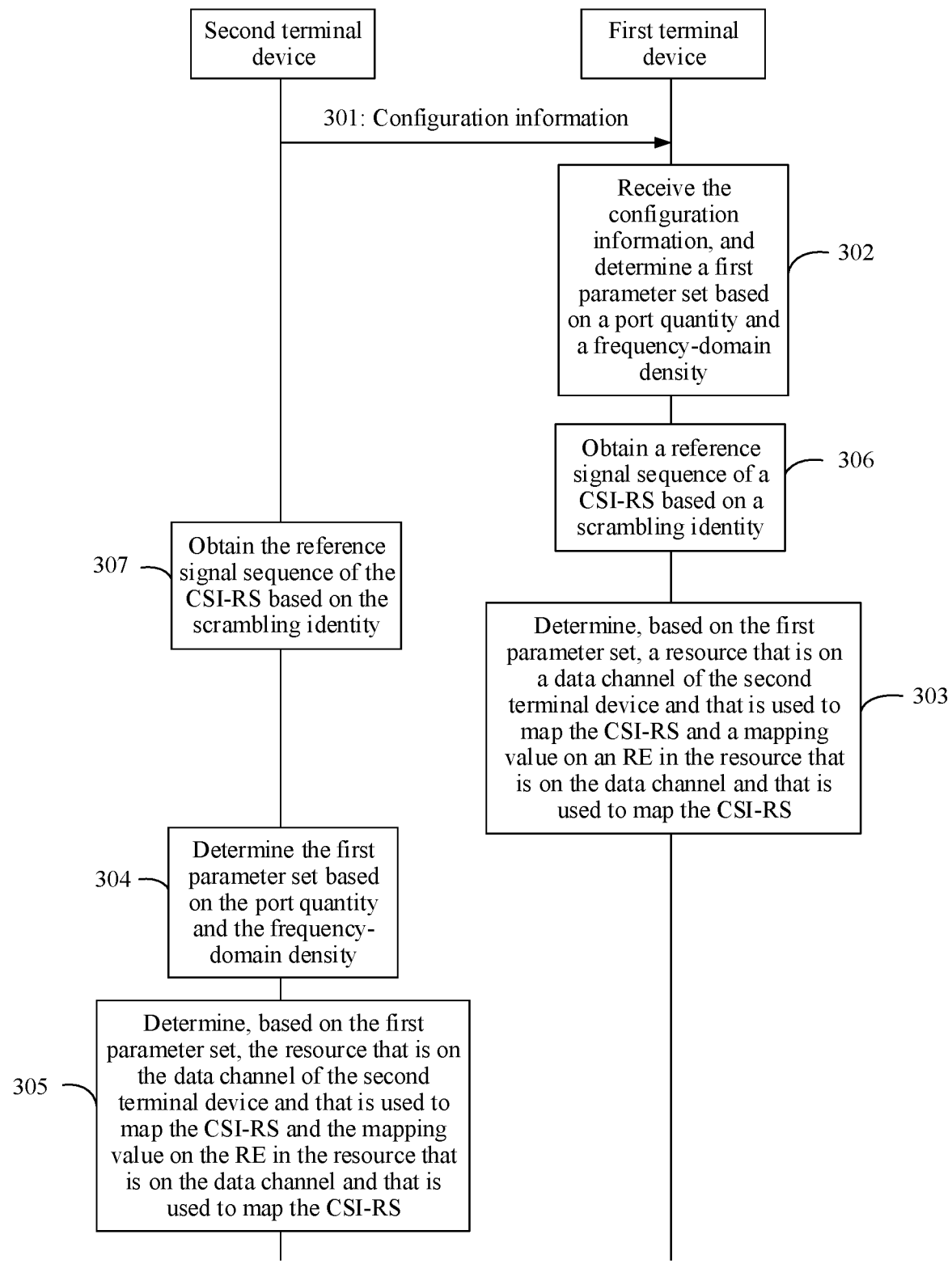
FIG. 6 is a schematic flowchart 2 of a method for determining CSI-RS resource mapping according to an embodiment of this application.

Further, optionally, in a second implementation scenario of the method shown in FIG. 3, as shown in FIG. 6, the method shown in FIG. 3 further includes step 306 and step 307.

Step 306: The first terminal device obtains a reference signal sequence of the CSI-RS based on a scrambling identity.

The scrambling identity may be used to identify an attribute of the reference signal sequence of the CSI-RS. For a CSI-RS mapped to a given orthogonal frequency division multiplexing (orthogonal frequency division multiplexing, OFDM) symbol in a radio frame, the scrambling identity may be used to determine a reference signal sequence of the CSI-RS.

Optionally, that the first terminal device obtains a reference signal sequence of the CSI-RS based on a scrambling identity includes: obtaining, by the first terminal device, an initial value of a pseudo-random sequence based on the scrambling identity, and obtaining, by the first terminal device, the reference signal sequence of the CSI-RS based on the initial value of the pseudo-random sequence.

Optionally, the obtaining, by the first terminal device, an initial value of a pseudo-random sequence based on the scrambling identity includes: The initial value of the pseudo-random sequence satisfies: $c_{init}=(2^L(N_{symb}^{slot}n_{s,f}^{\mu}+l+1)(2n_{ID}+1)+n_{ID})\mod 2^{31}$.

L represents a length of the scrambling identity, and a unit is bit. $N_{symb}^{slot}$ represents a quantity of symbols of a slot in which the data channel is located. $n_{s,f}^{\mu}$ represents an index, in a radio frame, of the slot in which the data channel is located when a subcarrier spacing number is μ. $n_{ID}$ represents the scrambling identity. mod represents a modulo operation.

The first terminal device may obtain the scrambling identity according to the following three methods.

Method 1: The scrambling identity is indicated in the configuration information.

Optionally, the configuration information further includes third indication information, and the third indication information is used to indicate the scrambling identity.

Optionally, the scrambling identity $n_{ID} \in \{0,1,\ldots,1023\}$.

For example, the scrambling identity is randomly selected by the second terminal device from a set $\{0, 1, \ldots, 1023\}$, and is sent to the first terminal device by using the configuration information, so that the first terminal device obtains the reference signal sequence of the CSI-RS based on the scrambling identity.

Method 2: The first terminal device determines a physical layer source identity (Layer-1 source ID) or a physical layer destination identity (Layer-1 destination ID) as the scrambling identity.

In a possible implementation, the first terminal device receives control information from the second terminal device. The control information includes the physical layer source identity or the physical layer destination identity. The first terminal device determines the physical layer source identity or the physical layer destination identity as the scrambling identity.

The control information may be carried in sidelink control information (SCI).

Optionally, a length of the scrambling identity is eight bits.

Method 3: The first terminal device determines the scrambling identity based on a cyclic redundancy check (CRC) code.

In a possible implementation, the first terminal device receives control information from the second terminal device. The first terminal device obtains the CRC code based on the control information. The first terminal device uses L least significant bits or L most significant bits of the CRC code as the scrambling identity.

L is a positive integer, and L is greater than or equal to 1 and less than or equal to a length of the CRC code. For example, L=10 bits.

Optionally, the control information may be carried in SCI.

Step 307: The second terminal device obtains the reference signal sequence of the CSI-RS based on the scrambling identity.

For a specific process of step 307, refer to the process of obtaining, by the first terminal device, the reference signal sequence of the CSI-RS based on the scrambling identity in step 306. Details are not described again.

It should be noted that step 306 is performed before step 303, and step 307 is performed before step 305. An execution sequence of step 306 and step 307 in the method shown in FIG. 6 is not limited in this embodiment of this application. For example, step 306 may be performed before step 302 and after step 301, and step 307 may be performed before step 301.

Based on the second implementation scenario of the method shown in FIG. 3, the first terminal device or the second terminal device may obtain the reference signal sequence of the CSI-RS based on the scrambling identity. Subsequently, the first terminal device or the second terminal device may determine, based on the reference signal sequence of the CSI-RS, the mapping value on the RE in the resource that is on the data channel of the second terminal device and that is used to map the CSI-RS.

Figure 7:
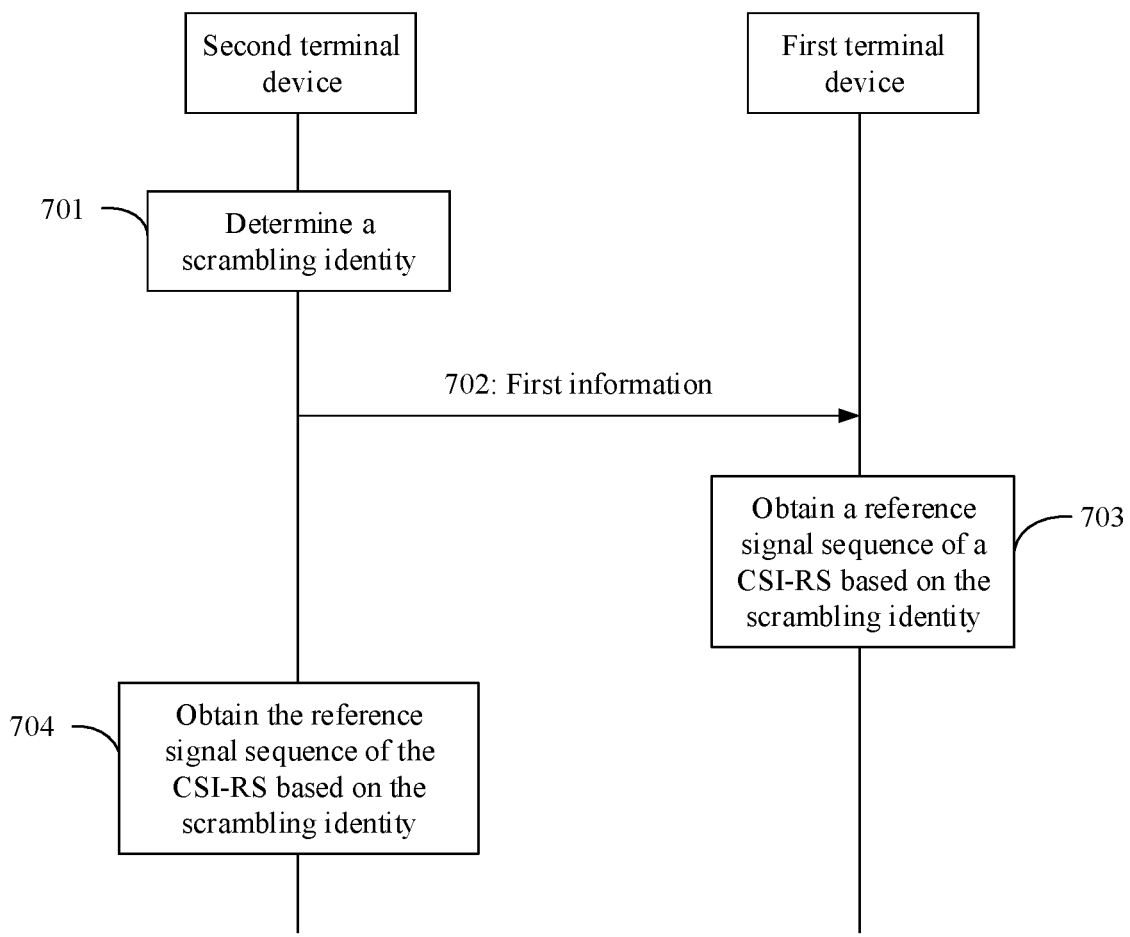
FIG. 7 is a schematic flowchart 1 of a method for generating a reference signal sequence of a CSI-RS according to an embodiment of this application.

FIG. 7 shows a method for generating a reference signal sequence of a CSI-RS according to an embodiment of this application. The method may include step 701 to step 704.

Step 701: A second terminal device determines a scrambling identity.

The second terminal device may be a terminal device in the communications system shown in FIG. 1. For example, the second terminal device may be the terminal device 103 in the communications system shown in FIG. 1.

The scrambling identity may be used to identify an attribute of a reference signal sequence of a CSI-RS. For a CSI-RS mapped to a given OFDM symbol in a radio frame, the scrambling identity may be used to determine a reference signal sequence of the CSI-RS.

Optionally, the scrambling identity $n_{ID} \in \{0, 1, \ldots, 1023\}$.

For example, the scrambling identity is randomly selected by the second terminal device from a set $\{0, 1, \ldots, 1023\}$, and is sent to a first terminal device by using configuration information, so that the first terminal device obtains the reference signal sequence of the CSI-RS based on the scrambling identity.

Step 702: The second terminal device sends first information to the first terminal device.

The first terminal device may be the terminal device in the communications system shown in FIG. 1. For example, the first terminal device may be the terminal device 104 in the communications system shown in FIG. 1. The first information may include the scrambling identity.

In a possible implementation, the second terminal device sends PC5 RRC signaling to the first terminal device, where the PC5 RRC signaling carries the first information.

Step 703: The first terminal device receives the first information from the second terminal device, and obtains the reference signal sequence of the CSI-RS based on the scrambling identity.

Optionally, that the first terminal device obtains the reference signal sequence of the CSI-RS based on the scrambling identity includes: obtaining, by the first terminal device, an initial value of a pseudo-random sequence based on the scrambling identity, and obtaining, by the first terminal device, the reference signal sequence of the CSI-RS based on the initial value of the pseudo-random sequence.

Optionally, the obtaining, by the first terminal device, an initial value of a pseudo-random sequence based on the scrambling identity includes: The initial value of the pseudo-random sequence satisfies: $c_{init} = (2^L(N_{symb}^{slot} n_{s,f}^{\mu} + l + 1)(2n_{ID} + 1) + n_{ID}) \bmod 2^{31}$.

L represents a length of the scrambling identity, and a unit is bit. $N_{symb}^{slot}$ represents a quantity of symbols of a slot in which the data channel is located. $n_{s,f}^{\mu}$ represents an index, in a radio frame, of the slot in which the data channel is located when a subcarrier spacing number is μ. $n_{ID}$ represents the scrambling identity. mod represents a modulo operation.

Step 704: The second terminal device obtains the reference signal sequence of the CSI-RS based on the scrambling identity.

For a specific process of step 704, refer to the process of obtaining, by the first terminal device, the reference signal sequence of the CSI-RS based on the scrambling identity in step 703. Details are not described again.

It should be noted that step 704 is performed after step 701. An execution sequence of step 704 in the method shown in FIG. 7 is not limited in this embodiment of this application. For example, step 704 may be performed before step 702 and after step 701, or step 704 may be performed after step 702 and before step 703.

Based on the method shown in FIG. 7, the second terminal device may determine the scrambling identity, and send the scrambling identity to the first terminal device. Subsequently, the first terminal device or the second terminal device may obtain the reference signal sequence of the CSI-RS based on the scrambling identity, so that the first terminal device performs channel estimation based on the reference signal sequence of the CSI-RS.

In addition to obtaining the reference signal sequence of the CSI-RS based on the scrambling identity determined by the second terminal device in the method shown in FIG. 7, the first terminal device or the second terminal device may further obtain the reference signal sequence of the CSI-RS based on a physical layer source identity or a physical layer destination identity.

Figure 8:
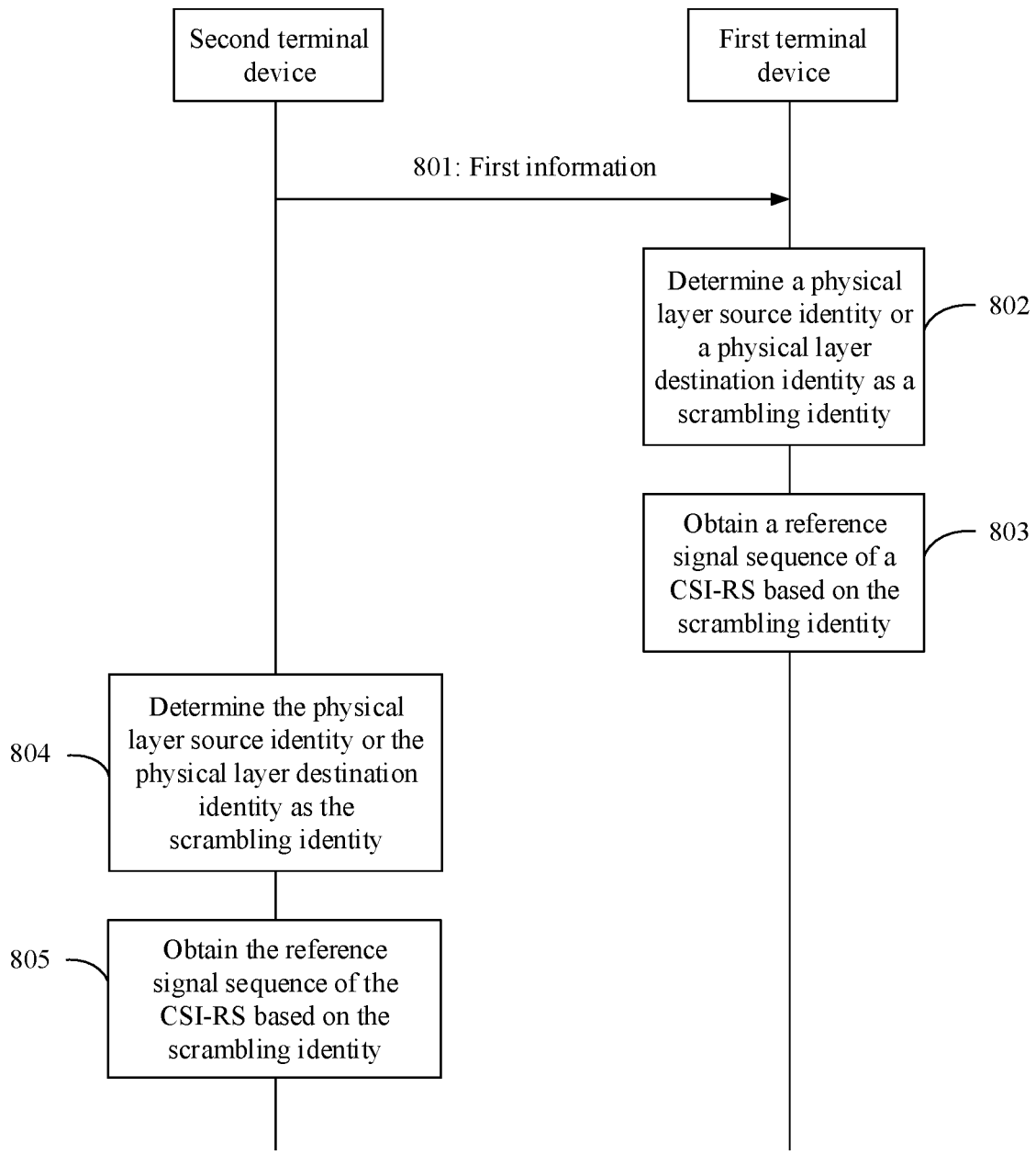
FIG. 8 is a schematic flowchart 2 of a method for generating a reference signal sequence of a CSI-RS according to an embodiment of this application.

FIG. 8 shows another method for generating a reference signal sequence of a CSI-RS according to an embodiment of this application. The method may include step 801 to step 805.

Step 801: A second terminal device sends first information to a first terminal device.

The first terminal device and the second terminal device may be terminal devices in the communications system shown in FIG. 1. For example, the first terminal device may be the terminal device 103 in the communications system shown in FIG. 1, and the second terminal device may be the terminal device 104 in the communications system shown in FIG. 1. For another example, the first terminal device may be the terminal device 106 in the communications system shown in FIG. 1, and the second terminal device may be the terminal device 104 in the communications system shown in FIG. 1.

The first information may include a physical layer source identity or a physical layer destination identity.

Optionally, the first information is carried in SCI.

Step 802: The first terminal device receives the first information from the second terminal device, and determines the physical layer source identity or the physical layer destination identity as a scrambling identity.

The scrambling identity may be used to identify an attribute of a reference signal sequence of a CSI-RS. For a CSI-RS mapped to a given OFDM symbol in a radio frame, the scrambling identity may be used to determine a reference signal sequence of the CSI-RS.

Optionally, a length of the scrambling identity is eight bits.

Step 803: The first terminal device obtains the reference signal sequence of the CSI-RS based on the scrambling identity.

Optionally, that the first terminal device obtains the reference signal sequence of the CSI-RS based on the scrambling identity includes: obtaining, by the first terminal device, an initial value of a pseudo-random sequence based on the scrambling identity, and obtaining, by the first terminal device, the reference signal sequence of the CSI-RS based on the initial value of the pseudo-random sequence.

Optionally, the obtaining, by the first terminal device, an initial value of a pseudo-random sequence based on the scrambling identity includes: The initial value of the pseudo-random sequence satisfies: $c_{init} = (2^L(N_{symb}^{slot} n_{s,f}^{\mu} + l + 1)(2n_{ID} + 1) + n_{ID}) \bmod 2^{31}$.

L represents a length of the scrambling identity, and a unit is bit. $N_{symb}^{slot}$ represents a quantity of symbols of a slot in which the data channel is located. $n_{s,f}^{\mu}$ represents an index, in a radio frame, of the slot in which the data channel is located when a subcarrier spacing number is μ. $n_{ID}$ represents the scrambling identity. mod represents a modulo operation.

Step 804: The second terminal device determines the physical layer source identity or the physical layer destination identity as the scrambling identity.

Step 805: The second terminal device obtains the reference signal sequence of the CSI-RS based on the scrambling identity.

For a specific process of step 805, refer to the process of obtaining, by the first terminal device, the reference signal sequence of the CSI-RS based on the scrambling identity in step 803. Details are not described again.

It should be noted that step 804 and step 805 are performed after step 801. An execution sequence of step 804 and step 805 in the method shown in FIG. 8 is not limited in this embodiment of this application. For example, step 804 and step 805 may be performed before step 802 and after step 801, or step 804 and step 805 may be performed after step 802 and before step 803.

Based on the method shown in FIG. 8, the second terminal device may send the first information to the first terminal device. The first information includes the physical layer source identity or the physical layer destination identity. The first terminal device or the second terminal device may determine the physical layer source identity or the physical layer destination identity as the scrambling identity, and obtain the reference signal sequence of the CSI-RS based on the scrambling identity, so that the first terminal device performs channel estimation based on the reference signal sequence of the CSI-RS.

In addition to obtaining the reference signal sequence of the CSI-RS based on the scrambling identity determined by the second terminal device in the method shown in FIG. 7, and determining the physical layer source identity or the physical layer destination identity as the scrambling identity and obtaining the reference signal sequence of the CSI-RS based on the scrambling identity in the method shown in FIG. 8, the first terminal device or the second terminal device may further obtain the reference signal sequence of the CSI-RS based on a CRC code.

Figure 9:
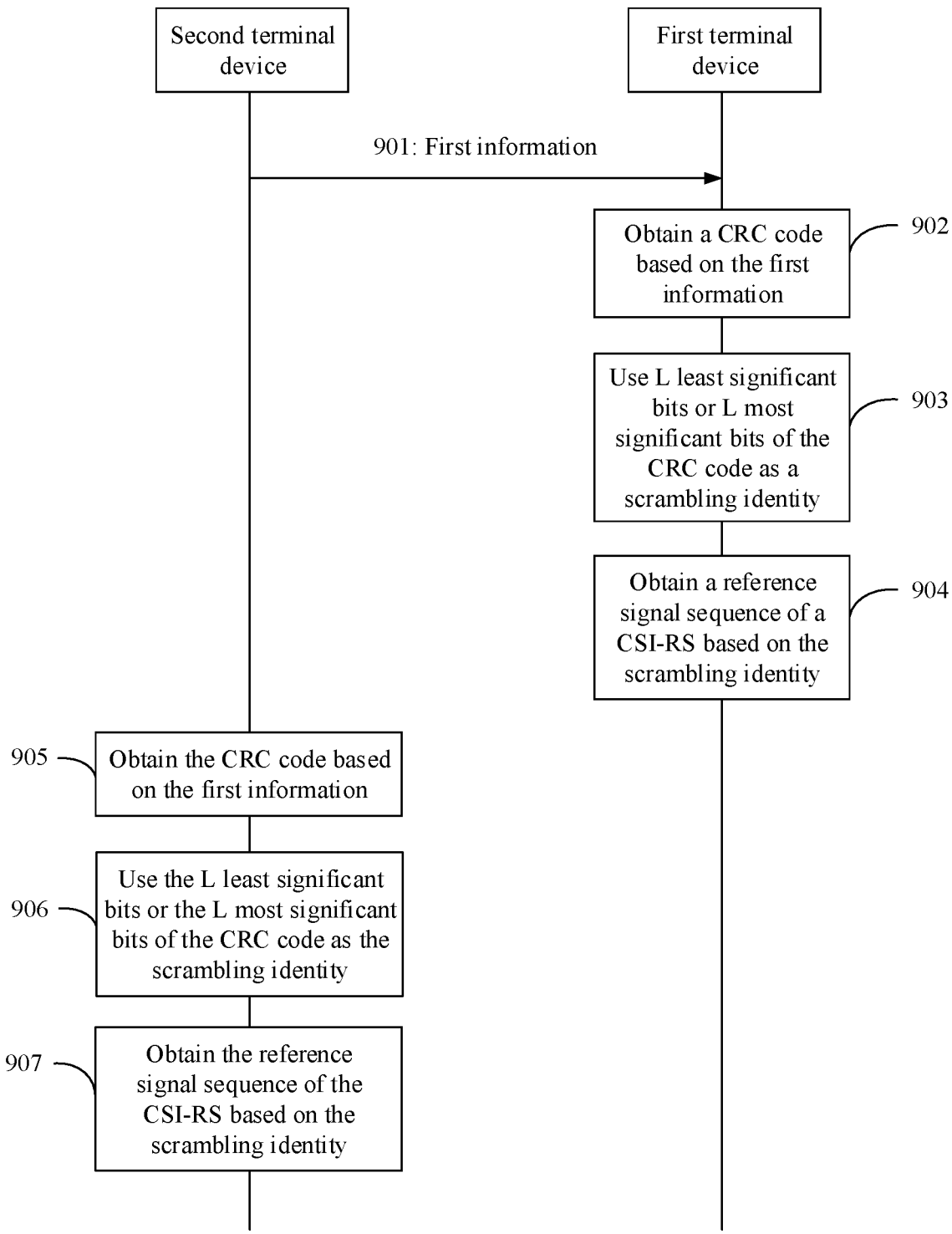
FIG. 9 is a schematic flowchart 3 of a method for generating a reference signal sequence of a CSI-RS according to an embodiment of this application.

FIG. 9 shows another method for generating a reference signal sequence of a CSI-RS according to an embodiment of this application. The method may include step 901 to step 907.

Step 901: A second terminal device sends first information to a first terminal device.

The first terminal device and the second terminal device may be terminal devices in the communications system shown in FIG. 1. For example, the first terminal device may be the terminal device 103 in the communications system shown in FIG. 1, and the second terminal device may be the terminal device 104 in the communications system shown in FIG. 1. For another example, the first terminal device may be the terminal device 106 in the communications system shown in FIG. 1, and the second terminal device may be the terminal device 104 in the communications system shown in FIG. 1.

Optionally, the first information is carried in SCI.

Step 902: The first terminal device receives the first information from the second terminal device, and obtains a CRC code based on the first information.

In a possible implementation, the first terminal device descrambles the first information to obtain the CRC code.

Step 903: The first terminal device uses L least significant bits or L most significant bits of the CRC code as a scrambling identity.

L is a positive integer, and L is greater than or equal to 1 and less than or equal to a length of the CRC code. For example, L=10 bits.

The scrambling identity may be used to identify an attribute of a reference signal sequence of a CSI-RS. For a CSI-RS mapped to a given OFDM symbol in a radio frame, the scrambling identity may be used to determine a reference signal sequence of the CSI-RS.

Step 904: The first terminal device obtains the reference signal sequence of the CSI-RS based on the scrambling identity.

Optionally, that the first terminal device obtains the reference signal sequence of the CSI-RS based on the scrambling identity includes: obtaining, by the first terminal device, an initial value of a pseudo-random sequence based on the scrambling identity, and obtaining, by the first terminal device, the reference signal sequence of the CSI-RS based on the initial value of the pseudo-random sequence.

Optionally, the obtaining, by the first terminal device, an initial value of a pseudo-random sequence based on the scrambling identity includes: The initial value of the pseudo-random sequence satisfies: $c_{init}=(2^L(N_{symb}^{slot}n_{s,f}^{\mu}+l+1)(2n_{ID}+1)+n_{ID})\bmod 2^{31}$.

L represents a length of the scrambling identity, and a unit is bit. $N_{symb}^{slot}$ represents a quantity of symbols of a slot in which the data channel is located. $n_{s,f}^{\mu}$ represents an index, in a radio frame, of the slot in which the data channel is located when a subcarrier spacing number is $\mu$. $n_{ID}$ represents the scrambling identity. mod represents a modulo operation.

Step 905: The second terminal device obtains the CRC code based on the first information.

Step 906: The second terminal device uses the L least significant bits or the L most significant bits of the CRC code as the scrambling identity.

L is a positive integer, and L is greater than or equal to 1 and less than or equal to the length of the CRC code. For example, L=10.

Step 907: The second terminal device obtains the reference signal sequence of the CSI-RS based on the scrambling identity.

For a specific process of step 907, refer to the process of obtaining, by the first terminal device, the reference signal sequence of the CSI-RS based on the scrambling identity in step 904. Details are not described again.

It should be noted that step 905 to step 907 are performed after step 901. An execution sequence of step 905 to step 907 in the method shown in FIG. 9 is not limited in this embodiment of this application. For example, step 905 to step 907 may be performed before step 902 and after step 901, or step 905 to step 907 may be performed after step 902 and before step 903.

Based on the method shown in FIG. 9, the second terminal device may send the first information to the first terminal device. The first terminal device or the second terminal device may obtain the CRC code based on the first information, use the L least significant bits or the L most significant bits of the CRC code as the scrambling identity, and obtain the reference signal sequence of the CSI-RS based on the scrambling identity, so that the first terminal device performs channel estimation based on the reference signal sequence of the CSI-RS.

The foregoing mainly describes the solutions provided in the embodiments of this application from a perspective of interaction between the network elements. It may be understood that, to implement the foregoing functions, the first terminal device or the second terminal device includes corresponding hardware structures and/or software modules for performing the functions. A person skilled in the art should be easily aware that, in combination with units and algorithm operations of the examples described in the embodiments disclosed in this specification, this application can be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the first terminal device or the second terminal device based on the foregoing method examples. For example, each function module may be obtained through division corresponding to each function, or two or more functions may be integrated in one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 10:
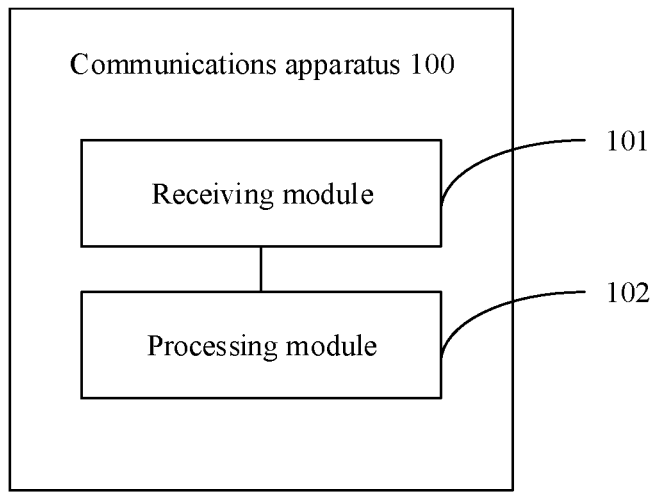
FIG. 10 is a schematic structural diagram 1 of a communications apparatus according to an embodiment of this application.

For example, when the function modules are obtained through division in an integrated manner, FIG. 10 is a schematic structural diagram of a communications apparatus 100. The communications apparatus 100 may be a first terminal device, a chip or a system on a chip in a first terminal device, another combined component or part that can implement functions of the foregoing terminal device, or the like. The communications apparatus 100 may be configured to perform functions of the first terminal device in the foregoing embodiments.

In a possible implementation, the communications apparatus 100 shown in FIG. 10 includes a receiving module 101 and a processing module 102.

The receiving module 101 is configured to receive configuration information from a second terminal device or a network device, where the configuration information includes a port quantity corresponding to a CSI-RS and a frequency-domain density corresponding to the CSI-RS, and the frequency-domain density is an average quantity of resource elements REs occupied on a resource block RB by each port corresponding to the CSI-RS.

The processing module 102 is configured to determine a first parameter set based on the port quantity and the frequency-domain density, where the first parameter set includes at least one of the following parameters: a code division multiplexing type corresponding to the CSI-RS, at least one code division multiplexing group number, a frequency domain resource starting point of at least one code division multiplexing group, or a frequency domain resource number in a code division multiplexing group.

The processing module 102 is further configured to determine, based on the first parameter set, a resource that is on a data channel of the second terminal device and that is used to map the CSI-RS and a mapping value on an RE in the resource that is on the data channel and that is used to map the CSI-RS.

Optionally, the mapping value on the RE in the resource that is on the data channel of the second terminal device and that is used to map the CSI-RS satisfies: $a_{k,l}^{(p,\mu)}=\beta_{CSIRS}w_f(k')r(m')$, where $a_{k,l}^{(p,\mu)}$ represents a mapping value on an RE corresponding to a time domain resource number l, a frequency domain resource number k, a space domain resource number p, and a subcarrier spacing number μ, $\beta_{CSIRS}$ represents a power control factor of the CSI-RS, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'_{th}$ element in a reference signal sequence of the CSI-RS, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of an RB, α is an intermediate variable calculated based on the port quantity and the frequency-domain density, $\lfloor \ \rfloor$ represents rounding down, $\lceil \ \rceil$ represents rounding up, ρ represents the frequency-domain density, $\bar{k}$ represents a frequency domain resource starting point of the code division multiplexing group, and $N_{sc}^{RB}$ represents a quantity of subcarriers in an RB.

Optionally, the communications apparatus maintains a first mapping table, and the first mapping table includes a mapping relationship between both at least one port quantity and at least one frequency-domain density and at least one first parameter set; and the processing module 102 is specifically configured to obtain the first parameter set through table lookup based on the port quantity and the frequency-domain density.

Optionally, the configuration information further includes first indication information, and the first indication information is used to indicate a frequency domain offset; and the processing module 102 is specifically configured to determine the first parameter set based on the port quantity, the frequency-domain density, and the frequency domain offset.

Optionally, the resource used to map the CSI-RS includes a frequency domain resource used to map the CSI-RS, a time domain resource used to map the CSI-RS, and a space domain resource used to map the CSI-RS.

Optionally, the time domain resource used to map the CSI-RS is the last symbol on the data channel; or the configuration information further includes second indication information, and the second indication information is used to indicate the time domain resource used to map the CSI-RS.

Optionally, the processing module 102 is further configured to obtain the reference signal sequence of the CSI-RS based on a scrambling identity.

Optionally, the configuration information further includes third indication information, and the third indication information is used to indicate the scrambling identity.

Optionally, the receiving module 101 is further configured to receive control information from the second terminal device, where the control information includes a physical layer source identity and/or a physical layer destination identity; and the processing module 102 is further configured to determine the physical layer source identity or the physical layer destination identity as the scrambling identity.

Optionally, the receiving module 101 is further configured to receive control information from the second terminal device; the processing module 102 is further configured to obtain a cyclic redundancy check code based on the control information; and the processing module 102 is further configured to use L least significant bits or L most significant bits of the cyclic redundancy check code as the scrambling identity, where L is a positive integer, and L is greater than or equal to 1 and less than or equal to a length of the cyclic redundancy check code.

All related content of the operations in the foregoing method embodiments may be cited in function descriptions of the corresponding function modules. Details are not described herein again.

In this embodiment, the communications apparatus 100 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 100 may be in the form shown in FIG. 2.

For example, the processor 201 in FIG. 2 may invoke the computer-executable instruction stored in the memory 203, so that the communications apparatus 100 performs the method for determining channel state information reference signal resource mapping in the foregoing method embodiments.

For example, functions/implementation processes of the receiving module 101 and the processing module 102 in FIG. 10 may be implemented by the processor 201 in FIG. 2 by invoking the computer-executable instruction stored in the memory 203. Alternatively, functions/implementation processes of the processing module 102 in FIG. 10 may be implemented by the processor 201 in FIG. 2 by invoking the computer-executable instruction stored in the memory 203, and functions/implementation processes of the receiving module 101 in FIG. 10 may be implemented by the communications interface 204 in FIG. 2.

Because the communications apparatus 100 provided in this embodiment may perform the foregoing method for determining channel state information reference signal resource mapping, for a technical effect that can be achieved by the communications apparatus 100, refer to the foregoing method embodiments. Details are not described herein again.

Figure 11:
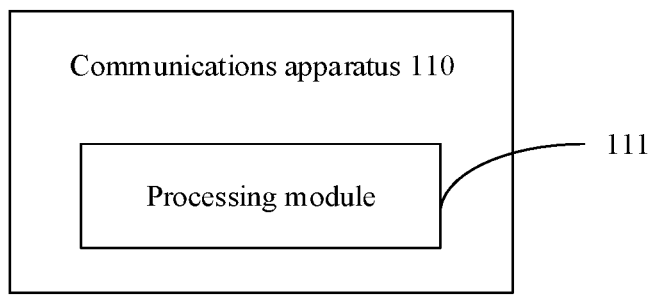
FIG. 11 is a schematic structural diagram 2 of a communications apparatus according to an embodiment of this application.

For example, when the function modules are obtained through division in an integrated manner, FIG. 11 is a schematic structural diagram of a communications apparatus 110. The communications apparatus 110 may be a second terminal device, or a chip or a system on a chip in a second terminal device. The communications apparatus 110 may be configured to perform functions of the second terminal device in the foregoing embodiments.

In a possible implementation, the communications apparatus 110 shown in FIG. 11 includes a processing module 111.

The processing module 111 is configured to determine a first parameter set based on a port quantity corresponding to a CSI-RS and a frequency-domain density corresponding to the CSI-RS, where the frequency-domain density is an average quantity of resource elements REs occupied on a resource block RB by each port corresponding to the CSI-RS, and the first parameter set includes at least one of the following parameters: a code division multiplexing type corresponding to the CSI-RS, at least one code division multiplexing group number, a frequency domain resource starting point of at least one code division multiplexing group, or a frequency domain resource number in a code division multiplexing group.

The processing module 111 is further configured to determine, based on the first parameter set, a resource that is on a data channel of the communications apparatus and that is used to map the CSI-RS and a mapping value on an RE in the resource that is on the data channel and that is used to map the CSI-RS.

Figure 12:
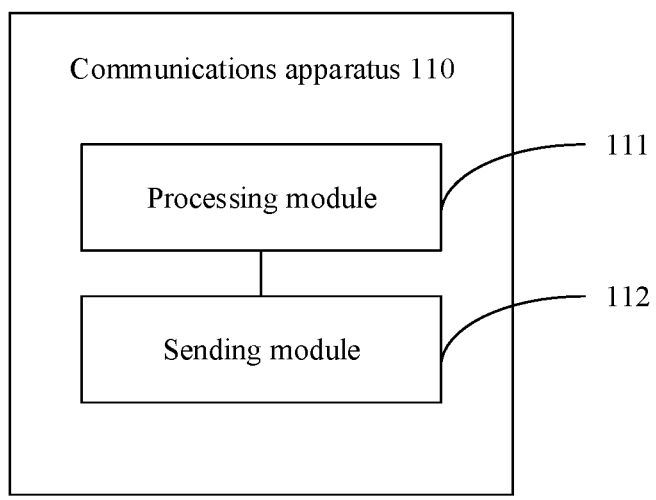
FIG. 12 is a schematic structural diagram 3 of a communications apparatus according to an embodiment of this application.

Optionally, as shown in FIG. 12, the communications apparatus 110 further includes a sending module 112. The sending module 112 is configured to send configuration information to a first terminal device.

Optionally, the mapping value on the RE in the resource that is on the data channel of the communications apparatus and that is used to map the CSI-RS satisfies: where $a_{k,l}^{(p,\mu)}$ represents a mapping value on an RE corresponding to a time domain resource number l, a frequency domain resource number k, a space domain resource number p, and a subcarrier spacing number μ, $\beta_{CSIRS}$ represents a power control factor of the CSI-RS, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'_{th}$ element in a reference signal sequence of the CSI-RS, and m' satisfies:

$$m' = \lfloor n\alpha \rfloor + k'\lceil\rho\rceil + \left\lfloor \frac{\bar{k}\rho}{N_{sc}^{RB}} \right\rfloor,$$

where n represents a number of an RB, α is an intermediate variable calculated based on the port quantity and the frequency-domain density, ⌊ ⌋ represents rounding down, ⌈ ⌉ represents rounding up, ρ represents the frequency-domain density, $\bar{k}$ represents a frequency domain resource starting point of the code division multiplexing group, and $N_{sc}^{RB}$ represents a quantity of subcarriers in an RB.

Optionally, the communications apparatus maintains a first mapping table, and the first mapping table includes a mapping relationship between both at least one port quantity and at least one frequency-domain density and at least one first parameter set; and the processing module 111 is specifically configured to obtain the first parameter set through table lookup based on the port quantity and the frequency-domain density.

Optionally, the configuration information further includes first indication information, and the first indication information is used to indicate a frequency domain offset; and the processing module 111 is specifically configured to determine the first parameter set based on the port quantity, the frequency-domain density, and the frequency domain offset.

Optionally, the resource used to map the CSI-RS includes a frequency domain resource used to map the CSI-RS, a time domain resource used to map the CSI-RS, and a space domain resource used to map the CSI-RS.

Optionally, the time domain resource used to map the CSI-RS is the last symbol on the data channel; or the configuration information further includes second indication information, and the second indication information is used to indicate the time domain resource used to map the CSI-RS.

Optionally, the processing module 111 is further configured to obtain the reference signal sequence of the CSI-RS based on a scrambling identity.

Optionally, the configuration information further includes third indication information, and the third indication information is used to indicate the scrambling identity.

Optionally, the sending module 112 is further configured to send control information to the first terminal device, where the control information includes a physical layer source identity and/or a physical layer destination identity; and the processing module 111 is further configured to determine the physical layer source identity or the physical layer destination identity as the scrambling identity.

Optionally, the sending module 112 is further configured to send control information to the first terminal device; the processing module 111 is further configured to obtain a cyclic redundancy check code based on the control information; and the processing module 111 is further configured to use L least significant bits or L most significant bits of the cyclic redundancy check code as the scrambling identity, where L is a positive integer, and L is greater than or equal to 1 and less than or equal to a length of the cyclic redundancy check code.

All related content of the operations in the foregoing method embodiments may be cited in function descriptions of the corresponding function modules. Details are not described herein again.

In this embodiment, the communications apparatus 110 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 110 may be in the form shown in FIG. 2.

For example, the processor 201 in FIG. 2 may invoke the computer-executable instruction stored in the memory 203, so that the communications apparatus 110 performs the method for determining channel state information reference signal resource mapping in the foregoing method embodiments.

For example, functions/implementation processes of the processing module 111 and the sending module 112 in FIG. 12 may be implemented by the processor 201 in FIG. 2 by invoking the computer-executable instruction stored in the memory 203. Alternatively, functions/implementation processes of the processing module 111 in FIG. 12 may be implemented by the processor 201 in FIG. 2 by invoking the computer-executable instruction stored in the memory 203, and functions/implementation processes of the sending module 112 in FIG. 12 may be implemented by the communications interface 204 in FIG. 2.

Because the communications apparatus 110 provided in this embodiment may perform the foregoing method for determining channel state information reference signal resource mapping, for a technical effect that can be achieved by the communications apparatus 110, refer to the foregoing method embodiments. Details are not described herein again.

Figure 13:
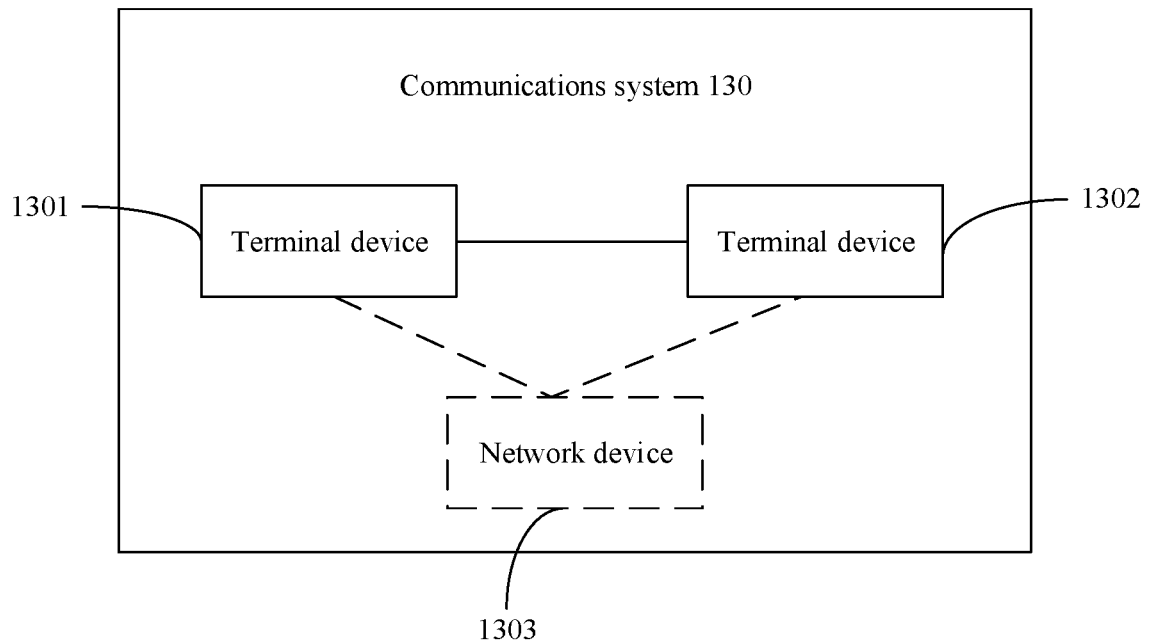
FIG. 13 is a schematic diagram 1 of a communications system according to an embodiment of this application.

FIG. 13 is a schematic composition diagram of a communications system. As shown in FIG. 13, the communications system 130 may include a terminal device 1301 and a terminal device 1302. It should be noted that FIG. 13 is merely an example of an accompanying drawing. Network elements included in the communications system 130 shown in FIG. 13 and a quantity of the network elements are not limited in this embodiment of this application.

The terminal device 1301 has a function of the communications apparatus 100 shown in FIG. 10, and may be configured to: receive a port quantity corresponding to a CSI-RS and a frequency-domain density corresponding to the CSI-RS that are sent by the terminal device 1302; determine a first parameter based on the port number and the frequency-domain density; and determine, based on the first parameter set, a resource that is on a data channel of the terminal device 1302 and that is used to map the CSI-RS and a mapping value on an RE in the resource that is on the data channel and that is used to map the CSI-RS.

The terminal device 1302 has a function of the communications apparatus 110 shown in FIG. 11 or FIG. 12, and may be configured to send, to the terminal device 1301, the port quantity corresponding to the CSI-RS and the frequency-domain density corresponding to the CSI-RS; determine the first parameter based on the port number and the frequency-domain density; and determine, based on the first parameter set, the resource that is on the data channel of the terminal device 1302 and that is used to map the CSI-RS and the mapping value on the RE in the resource that is on the data channel and that is used to map the CSI-RS.

Optionally, the communications system 130 further includes a network device 1303.

The network device 1303 may be configured to send, to the terminal device 1301 and/or the terminal device 1302, the port quantity corresponding to the CSI-RS and the frequency-domain density corresponding to the CSI-RS.

It should be noted that all related content of the steps in the foregoing method embodiments may be cited in function descriptions of the corresponding network elements in the communications system 130. Details are not described herein again.

Figure 14:
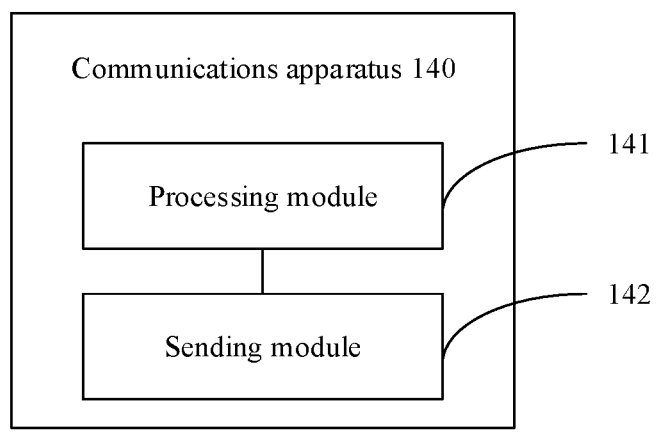
FIG. 14 is a schematic structural diagram 4 of a communications apparatus according to an embodiment of this application.

For example, when the function modules are obtained through division in an integrated manner, FIG. 14 is a schematic structural diagram of a communications apparatus 140. The communications apparatus 140 may be a second terminal device, a chip or a system on a chip in a second terminal device, another combined component or part that can implement functions of the foregoing terminal device, or the like. The communications apparatus 140 may be configured to perform functions of the second terminal device in the foregoing embodiments.

In a possible implementation, the communications apparatus 140 shown in FIG. 14 includes a processing module 141 and a sending module 142. When the communications apparatus is a terminal device, the sending module may be a transmitter that may include an antenna, a radio frequency circuit, and the like, and the processing module may be a processor such as a baseband chip. When the apparatus is a component having functions of the foregoing terminal device, the sending module may be a radio frequency unit, and the processing module may be a processor. When the apparatus is a system on a chip, the sending module may be an output interface of the system on a chip, and the processing module may be a processor of the system on a chip, for example, a central processing unit (CPU).

The processing module 141 is configured to determine a scrambling identity.

The sending module 142 is configured to send first information to a first terminal device, where the first information includes the scrambling identity.

The processing module 141 is further configured to obtain a reference signal sequence of a CSI-RS based on the scrambling identity.

All related content of the operations in the foregoing method embodiments may be cited in function descriptions of the corresponding function modules. Details are not described herein again.

In this embodiment, the communications apparatus 140 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 140 may be in the form shown in FIG. 2.

For example, the processor 201 in FIG. 2 may invoke the computer-executable instruction stored in the memory 203, so that the communications apparatus 140 performs the method for generating a reference signal sequence of a channel state information reference signal in the foregoing method embodiments.

For example, functions/implementation processes of the processing module 141 and the sending module 142 in FIG.

14 may be implemented by the processor 201 in FIG. 2 by invoking the computer-executable instruction stored in the memory 203. Alternatively, functions/implementation processes of the processing module 141 in FIG. 14 may be implemented by the processor 201 in FIG. 2 by invoking the computer-executable instruction stored in the memory 203, and functions/implementation processes of the sending module 142 in FIG. 14 may be implemented by the communications interface 204 in FIG. 2.

Because the communications apparatus 140 provided in this embodiment may perform the foregoing method for generating a reference signal sequence of a channel state information reference signal, for a technical effect that can be achieved by the communications apparatus 140, refer to the foregoing method embodiments. Details are not described herein again.

Figure 15:
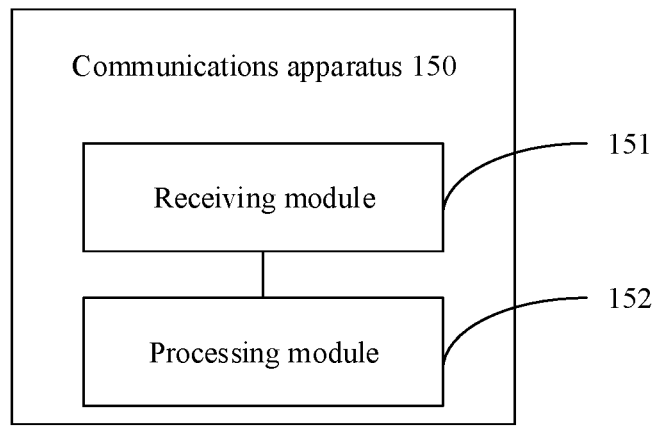
FIG. 15 is a schematic structural diagram 5 of a communications apparatus according to an embodiment of this application.

For example, when the function modules are obtained through division in an integrated manner, FIG. 15 is a schematic structural diagram of a communications apparatus 150. The communications apparatus 150 may be a first terminal device, a chip or a system on a chip in a first terminal device, another combined component or part that can implement functions of the foregoing terminal device, or the like. The communications apparatus 150 may be configured to perform functions of the first terminal device in the foregoing embodiments.

In a possible implementation, the communications apparatus 150 shown in FIG. 15 includes a receiving module 151 and a processing module 152.

The receiving module 151 is configured to receive first information from a second terminal device, where the first information includes a physical layer source identity or a physical layer destination identity.

The processing module 152, configured to determine the physical layer source identity or the physical layer destination identity as a scrambling identity.

The processing module 152 is further configured to obtain a reference signal sequence of a CSI-RS based on the scrambling identity.

All related content of the operations in the foregoing method embodiments may be cited in function descriptions of the corresponding function modules. Details are not described herein again.

In this embodiment, the communications apparatus 150 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 150 may be in the form shown in FIG. 2.

For example, the processor 201 in FIG. 2 may invoke the computer-executable instruction stored in the memory 203, so that the communications apparatus 150 performs the method for generating a reference signal sequence of a channel state information reference signal in the foregoing method embodiments.

For example, functions/implementation processes of the receiving module 151 and the processing module 152 in FIG. 15 may be implemented by the processor 201 in FIG. 2 by invoking the computer-executable instruction stored in the memory 203. Alternatively, functions/implementation processes of the processing module 152 in FIG. 15 may be implemented by the processor 201 in FIG. 2 by invoking the computer-executable instruction stored in the memory 203, and functions/implementation processes of the receiving module 151 in FIG. 15 may be implemented by the communications interface 204 in FIG. 2.

Because the communications apparatus 150 provided in this embodiment may perform the foregoing method for generating a reference signal sequence of a channel state information reference signal, for a technical effect that can be achieved by the communications apparatus 150, refer to the foregoing method embodiments. Details are not described herein again.

Figure 16:
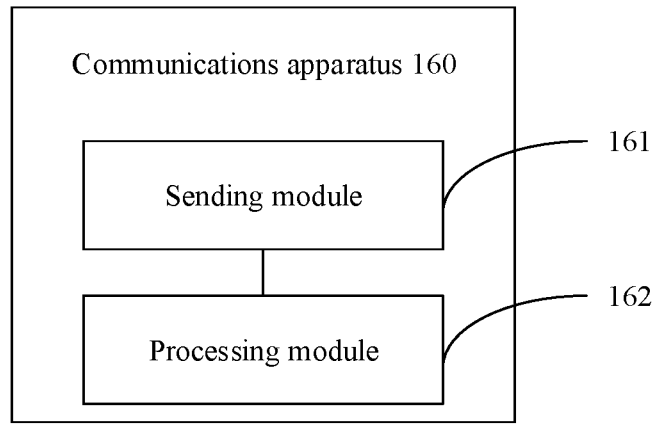
FIG. 16 is a schematic structural diagram 6 of a communications apparatus according to an embodiment of this application.

For example, when the function modules are obtained through division in an integrated manner, FIG. 16 is a schematic structural diagram of a communications apparatus 160. The communications apparatus 160 may be a second terminal device, a chip or a system on a chip in a second terminal device, another combined component or part that can implement functions of the foregoing terminal device, or the like. The communications apparatus 160 may be configured to perform functions of the second terminal device in the foregoing embodiments.

In a possible implementation, the communications apparatus 160 shown in FIG. 16 includes a sending module 161 and a processing module 162.

The sending module 161 is configured to send first information to a first terminal device, where the first information includes a physical layer source identity or a physical layer destination identity.

The processing module 162 is configured to determine the physical layer source identity or the physical layer destination identity as a scrambling identity.

The processing module 162 is further configured to obtain a reference signal sequence of a CSI-RS based on the scrambling identity.

All related content of the operations in the foregoing method embodiments may be cited in function descriptions of the corresponding function modules. Details are not described herein again.

In this embodiment, the communications apparatus 160 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 160 may be in the form shown in FIG. 2.

For example, the processor 201 in FIG. 2 may invoke the computer-executable instruction stored in the memory 203, so that the communications apparatus 160 performs the method for generating a reference signal sequence of a channel state information reference signal in the foregoing method embodiments.

For example, functions/implementation processes of the sending module 161 and the processing module 162 in FIG. 16 may be implemented by the processor 201 in FIG. 2 by invoking the computer-executable instruction stored in the memory 203. Alternatively, functions/implementation processes of the processing module 162 in FIG. 16 may be implemented by the processor 201 in FIG. 2 by invoking the computer-executable instruction stored in the memory 203, and functions/implementation processes of the sending module 161 in FIG. 16 may be implemented by the communications interface 204 in FIG. 2.

Because the communications apparatus 160 provided in this embodiment may perform the foregoing method for generating a reference signal sequence of a channel state information reference signal, for a technical effect that can be achieved by the communications apparatus 160, refer to the foregoing method embodiments. Details are not described herein again.

Figure 17:
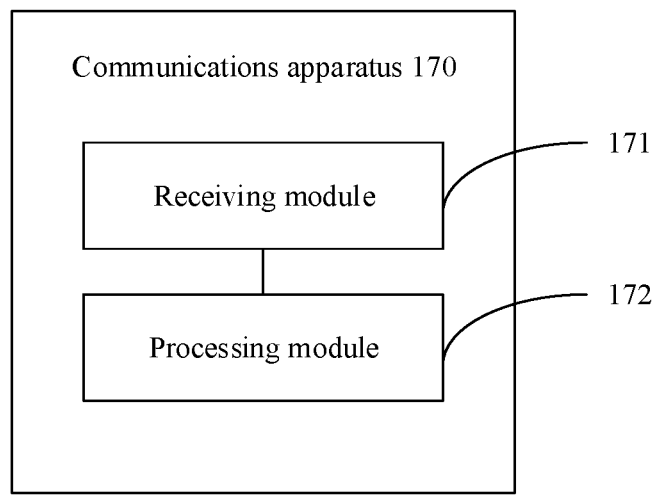
FIG. 17 is a schematic structural diagram 7 of a communications device according to an embodiment of this application.

For example, when the function modules are obtained through division in an integrated manner, FIG. 17 is a schematic structural diagram of a communications apparatus 170. The communications apparatus 170 may be a first terminal device, a chip or a system on a chip in a first terminal device, another combined component or part that can implement functions of the foregoing terminal device, or the like. The communications apparatus 170 may be configured to perform functions of the first terminal device in the foregoing embodiments.

In a possible implementation, the communications apparatus 170 shown in FIG. 17 includes a receiving module 171 and a processing module 172.

The receiving module 171 is configured to receive first information from a second terminal device.

The processing module 172 is configured to obtain a cyclic redundancy check code based on the first information.

The processing module 172 is further configured to use L least significant bits or L most significant bits of the cyclic redundancy check code as the scrambling identity, where L is a positive integer, and L is greater than or equal to 1 and less than or equal to a length of the cyclic redundancy check code. The first terminal device obtains a reference signal sequence of a CSI-RS based on the scrambling identity.

All related content of the operations in the foregoing method embodiments may be cited in function descriptions of the corresponding function modules. Details are not described herein again.

In this embodiment, the communications apparatus 170 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 170 may be in the form shown in FIG. 2.

For example, the processor 201 in FIG. 2 may invoke the computer-executable instruction stored in the memory 203, so that the communications apparatus 170 performs the method for generating a reference signal sequence of a channel state information reference signal in the foregoing method embodiments.

For example, functions/implementation processes of the receiving module 171 and the processing module 172 in FIG. 17 may be implemented by the processor 201 in FIG. 2 by invoking the computer-executable instruction stored in the memory 203. Alternatively, functions/implementation processes of the processing module 172 in FIG. 17 may be implemented by the processor 201 in FIG. 2 by invoking the computer-executable instruction stored in the memory 203, and functions/implementation processes of the receiving module 171 in FIG. 17 may be implemented by the communications interface 204 in FIG. 2.

Because the communications apparatus 170 provided in this embodiment may perform the foregoing method for generating a reference signal sequence of a channel state information reference signal, for a technical effect that can be achieved by the communications apparatus 170, refer to the foregoing method embodiments. Details are not described herein again.

Figure 18:
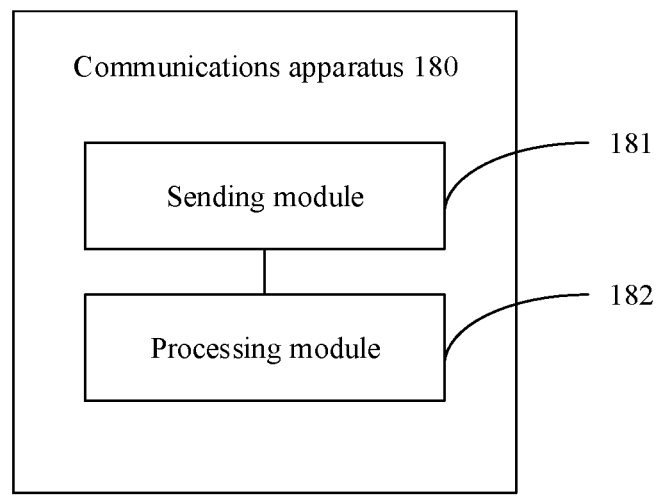
FIG. 18 is a schematic structural diagram 8 of a communications device according to an embodiment of this application.

For example, when the function modules are obtained through division in an integrated manner, FIG. 18 is a schematic structural diagram of a communications apparatus 180. The communications apparatus 180 may be a second terminal device, a chip or a system on a chip in a second terminal device, another combined component or part that can implement functions of the foregoing terminal device, or the like. The communications apparatus 180 may be configured to perform functions of the second terminal device in the foregoing embodiments.

In a possible implementation, the communications apparatus 180 shown in FIG. 18 includes a sending module 181 and a processing module 182.

The sending module 181 sends first information to a first terminal device.

The processing module 182 is configured to obtain a cyclic redundancy check code based on the first information.

The processing module 182 is further configured to use L least significant bits or L most significant bits of the cyclic redundancy check code as the scrambling identity, where L is a positive integer, and L is greater than or equal to 1 and less than or equal to a length of the cyclic redundancy check code. The second terminal device obtains a reference signal sequence of a CSI-RS based on the scrambling identity.

All related content of the operations in the foregoing method embodiments may be cited in function descriptions of the corresponding function modules. Details are not described herein again.

In this embodiment, the communications apparatus 180 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 180 may be in the form shown in FIG. 2.

For example, the processor 201 in FIG. 2 may invoke the computer-executable instruction stored in the memory 203, so that the communications apparatus 180 performs the method for generating a reference signal sequence of a channel state information reference signal in the foregoing method embodiments.

For example, functions/implementation processes of the sending module 181 and the processing module 182 in FIG. 18 may be implemented by the processor 201 in FIG. 2 by invoking the computer-executable instruction stored in the memory 203. Alternatively, functions/implementation processes of the processing module 182 in FIG. 18 may be implemented by the processor 201 in FIG. 2 by invoking the computer-executable instruction stored in the memory 203, and functions/implementation processes of the sending module 181 in FIG. 18 may be implemented by the communications interface 204 in FIG. 2.

Because the communications apparatus 180 provided in this embodiment may perform the foregoing method for generating a reference signal sequence of a channel state information reference signal, for a technical effect that can be achieved by the communications apparatus 180, refer to the foregoing method embodiments. Details are not described herein again.

Figure 19:
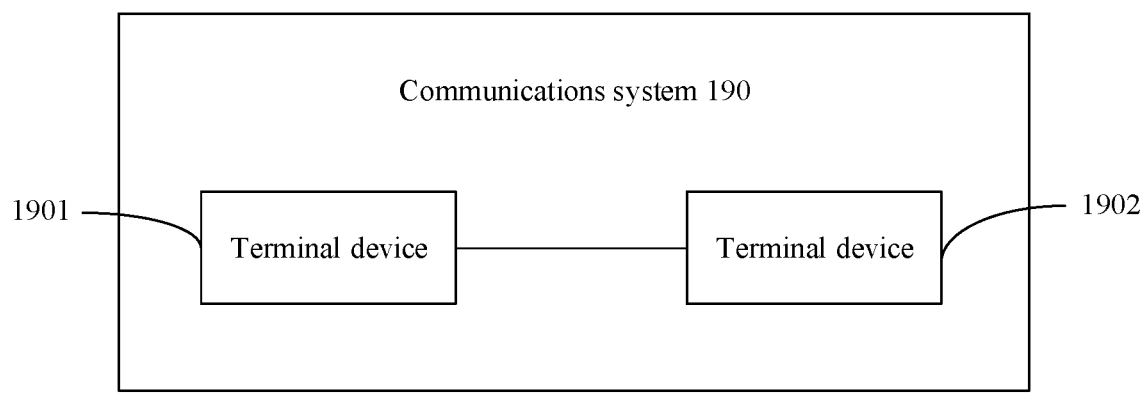
FIG. 19 is a schematic diagram 2 of a communications system according to an embodiment of this application.

FIG. 19 is a schematic composition diagram of a communications system. As shown in FIG. 19, the communications system 190 may include a terminal device 1901 and a terminal device 1902. It should be noted that FIG. 19 is merely an example of an accompanying drawing. Network elements included in the communications system 190 shown in FIG. 19 and a quantity of the network elements are not limited in this embodiment of this application.

The terminal device 1901 may be configured to: receive first information from the terminal device 1902, and obtain a reference signal sequence of a CSI-RS based on the first information. Alternatively, the terminal device 1901 has functions of the communications apparatus 150 shown in FIG. 15 or the communications apparatus 170 shown in FIG. 17.

The terminal device 1902 has functions of the communications apparatus 140 shown in FIG. 14, the communications apparatus 160 shown in FIG. 16, or the communications apparatus 180 shown in FIG. 18.

It should be noted that all related content of the steps in the foregoing method embodiments may be cited in function descriptions of the corresponding network elements in the communications system 190. Details are not described herein again.

In the foregoing embodiments, the configuration information sent by the second terminal device or the network device to the first terminal device includes the port quantity corresponding to the CSI-RS and the frequency-domain density corresponding to the CSI-RS. When the frequency-domain density is a frequency-domain density known to both the first terminal device and the second terminal device, for example, when the frequency-domain density is a predefined frequency-domain density, a frequency-domain density defined in a standard, or a frequency-domain density negotiated by the first terminal device and the second terminal device through communication, the configuration information may not include the frequency-domain density.

Figure 20:
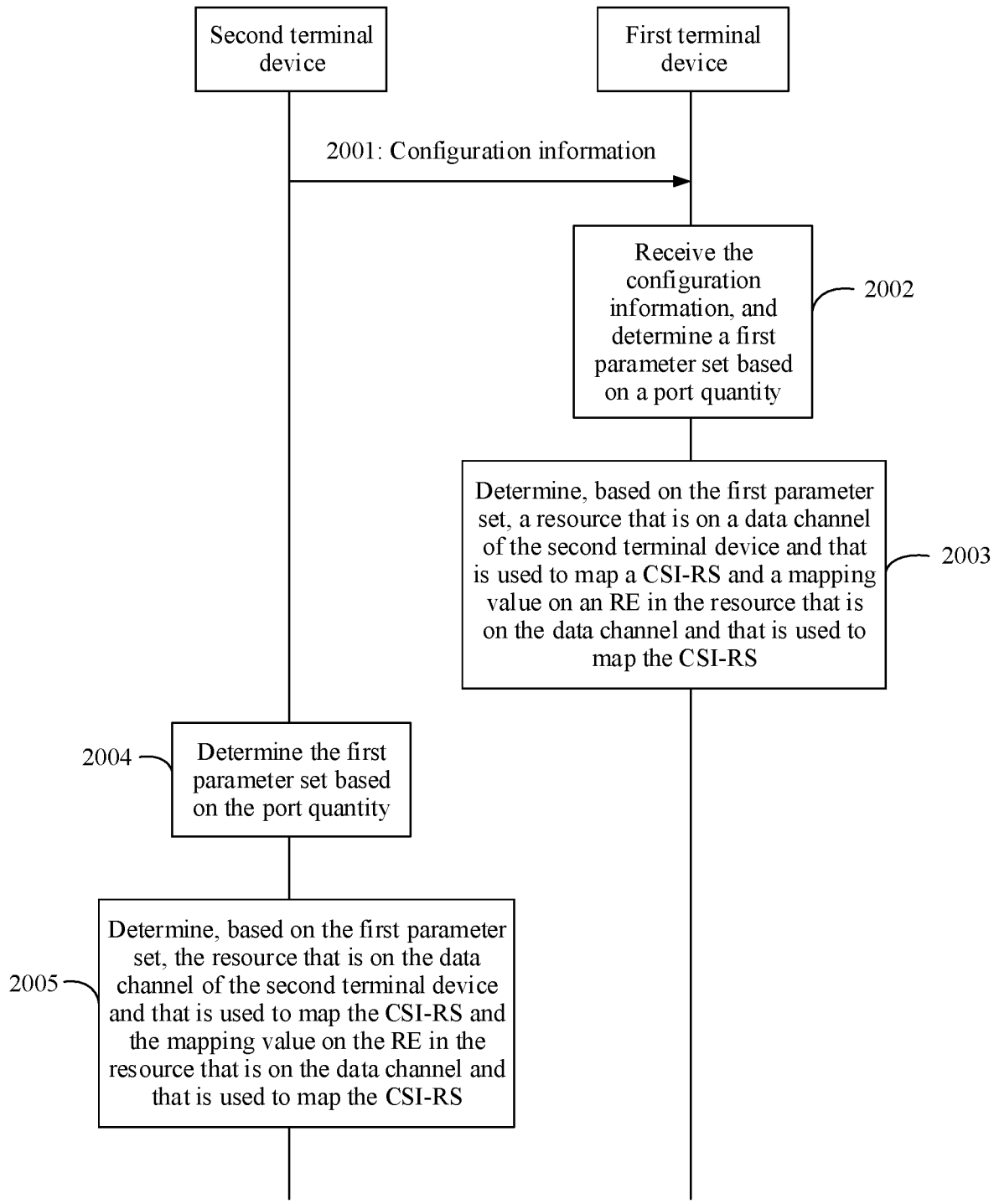
FIG. 20 is a schematic flowchart 3 of a method for determining CSI-RS resource mapping according to an embodiment of this application.

FIG. 20 shows another method for determining CSI-RS resource mapping according to an embodiment of this application. The method for determining CSI-RS resource mapping is described by using an SL as an example. The method for determining CSI-RS resource mapping includes step 2001 to step 2005.

Step 2001: A second terminal device or a network device sends configuration information to a first terminal device.

The first terminal device and the second terminal device may be terminal devices in the communications system shown in FIG. 1. For example, the first terminal device may be the terminal device 103 in the communications system shown in FIG. 1, and the second terminal device may be the terminal device 104 in the communications system shown in FIG. 1. For another example, the first terminal device may be the terminal device 106 in the communications system shown in FIG. 1, and the second terminal device may be the terminal device 104 in the communications system shown in FIG. 1.

The network device may be a network device in the communications system shown in FIG. 1. For example, if the first terminal device is the terminal device 103 in the communications system shown in FIG. 1, the network device may be the network device 101 in the communications system shown in FIG. 1; or if the first terminal device is the terminal device 106 in the communications system shown in FIG. 1, the network device may be the network device 102 in the communications system shown in FIG. 1.

The configuration information may include a port quantity corresponding to a CSI-RS.

Optionally, the CSI-RS may alternatively be expressed as an SL CSI-RS.

Optionally, before the first terminal device performs SL channel estimation, the second terminal device or the network device sends the configuration information to the first terminal device.

In a case, if the first terminal device and the second terminal device are in a service coverage area of a same network device (for example, the first terminal device is the terminal device 103 in the communications system shown in FIG. 1, and the second terminal device is the terminal device 104 in the communications system shown in FIG. 1), the second terminal device or the network device may send the configuration information to the first terminal device.

In another case, if the first terminal device and the second terminal device are not in a service coverage area of a same network device (for example, the first terminal device is the terminal device 106 in the communications system shown in FIG. 1, and the second terminal device is the terminal device 104 in the communications system shown in FIG. 1), or the first terminal device and the second terminal device are not in a service coverage area of a network device, the second terminal device sends the configuration information to the first terminal device, and subsequently, the second terminal device and the first terminal device may perform resource mapping based on the configuration information.

Optionally, if the network device sends the configuration information to the first terminal device, the configuration information is carried in RRC signaling.

For example, the network device sends the RRC signaling to the first terminal device, and the RRC signaling may carry the configuration information. In the RRC signaling, a CSI-RS-ResourceMapping IE may be used to indicate CSI-RS resource mapping. A design of the CSI-RS-ResourceMapping IE may be shown as follows:

```
CSI-RS-ResourceMapping ::= SEQUENCE{
    nrofPorts           ENUMERATED {p1, p2, p4},
    ...
}
``` nrofPorts may be used to indicate the port quantity. The port quantity may be 1, 2, or 4.

A design of the CSI-RS-ResourceMapping IE may alternatively be shown as follows:

```
CSI-RS-ResourceMapping ::= SEQUENCE {
    nrofPorts           ENUMERATED {p1, p2},
    ...
}
``` nrofPorts may be used to indicate the port quantity. The port quantity may be 1 or 2.

Optionally, if the second terminal device sends the configuration information to the first terminal device, the configuration information is carried in PC5 RRC signaling.

For example, the second terminal device sends the PC5 RRC signaling to the first terminal device, where the PC5 RRC signaling may include the configuration information. In the PC5 RRC signaling, an SL-CSI-RS-ResourceMapping IE may be used to indicate CSI-RS resource mapping. A design of the SL-CSI-RS-ResourceMapping IE may be shown as follows:

```
SL-CSI-RS-ResourceMapping ::= SEQUENCE{
    nrofPorts           ENUMERATED {p1, p2, p4},
    ...
}
``` nrofPorts may be used to indicate the port quantity. The port quantity may be 1, 2, or 4.

A design of the SL-CSI-RS-ResourceMapping IE may alternatively be shown as follows:

```
SL-CSI-RS-ResourceMapping ::= SEQUENCE {
   nrofPorts           ENUMERATED {p1, p2},
   ...
}
``` nrofPorts may be used to indicate the port quantity. The port quantity may be 1 or 2.

Step 2002: The first terminal device receives the configuration information, and determines a first parameter set based on the port quantity.

For a description of the first parameter set, refer to the description in step 302. Details are not described again.

Optionally, the first terminal device maintains a second mapping table.

The second mapping table includes a mapping relationship between at least one port quantity and at least one first parameter set.

Optionally, that the first terminal device determines a first parameter set based on the port quantity includes: obtaining, by the first terminal device, the first parameter set through table lookup based on the port quantity.

For example, the second mapping table may be shown in Table 8. The first terminal device may determine the first parameter set by looking up in Table 8. In Table 8, when the port quantity is 1, it may be determined that the first parameter set includes: no CDM, a frequency domain resource starting point 0 of a CDM group, a CDM group number 0, and a frequency domain resource number 0 in the CDM group. When the port quantity is 2, it may be determined that the first parameter set includes: FD-CDM2, the frequency domain resource starting point 0 of the CDM group, the CDM group number 0, and frequency domain resource numbers 0 and 1 in the CDM group. When the port quantity is 4, it may be determined that the first parameter set includes: FD-CDM2, frequency domain resource starting points 0 and 2 of the CDM group, CDM group numbers 0 and 1, and the frequency domain resource numbers 0 and 1 in the CDM group.

TABLE 8

| Port quantity | CDM type | Frequency domain resource starting point of a CDM group | CDM group number | Frequency domain resource number in the CDM group |
|---|---|---|---|---|
| 1 | No CDM | 0 | 0 | 0 |
| 2 | FD-CDM2 | 0 | 0 | 0 and 1 |
| 4 | FD-CDM2 | 0 and 2 | 0 and 1 | 0 and 1 |

It should be noted that Table 8 is merely an example of the second mapping table. During actual application, the second mapping table may alternatively include a row or several rows in Table 8, all in Table 8, more rows than those shown in Table 8, several columns in Table 8, or more columns than those shown in Table 8. This is not limited.

For example, the second mapping table may alternatively be shown in Table 9, Table 10, or Table 11. In Table 9, the second mapping table shows a mapping relationship that is between the port quantity and the first parameter set and that corresponds when port quantities are 1 and 2. In Table 10, the second mapping table may further include a frequency-domain density. The frequency-domain density may be 1 RE/port/RB. In Table 11, the second mapping table shows a mapping relationship that is between the port quantity and the first parameter set and that corresponds when the port quantities are 1 and 2. The second mapping table includes the frequency-domain density. The frequency-domain density may be 1 RE/port/RB.

TABLE 9

| Port quantity | CDM type | Frequency domain resource starting point of a CDM group | CDM group number | Frequency domain resource number in the CDM group |
|---|---|---|---|---|
| 1 | No CDM | 0 | 0 | 0 |
| 2 | FD-CDM2 | 0 | 0 | 0 and 1 |

TABLE 10

| Port quantity | Frequency-domain density (RE/port/RB) | CDM type | Frequency domain resource starting point of a CDM group | CDM group number | Frequency domain resource number in the CDM group |
|---|---|---|---|---|---|
| 1 | 1 | No CDM | 0 | 0 | 0 |
| 2 | 1 | FD-CDM2 | 0 | 0 | 0 and 1 |
| 4 | 1 | FD-CDM2 | 0 and 2 | 0 and 1 | 0 and 1 |

TABLE 11

| Port quantity | Frequency-domain density (RE/port/RB) | CDM type | Frequency domain resource starting point of a CDM group | CDM group number | Frequency domain resource number in the CDM group |
|---|---|---|---|---|---|
| 1 | 1 | No CDM | 0 | 0 | 0 |
| 2 | 1 | FD-CDM2 | 0 | 0 | 0 and 1 |

Step 2003: The first terminal device determines, based on the first parameter set, a resource that is on a data channel of the second terminal device and that is used to map the CSI-RS and a mapping value on an RE in the resource that is on the data channel and that is used to map the CSI-RS.

The data channel may be a PSSCH.

The resource used to map the CSI-RS may include a frequency domain resource used to map the CSI-RS, a time domain resource used to map the CSI-RS, and a space domain resource used to map the CSI-RS.

The frequency domain resource used to map the CSI-RS may be used to indicate a frequency domain position at which the second terminal device sends the CSI-RS. The time-domain resource used to map the CSI-RS may be used to indicate a time domain position at which the second terminal device sends the CSI-RS. The space domain resource used to map the CSI-RS may be used to indicate a port on which the second terminal device sends the CSI-RS.

Optionally, the frequency domain resource used to map the CSI-RS is determined based on the first parameter set. For a specific description of the process, refer to the description in step 303. Details are not described again.

Optionally, the time domain resource used to map the CSI-RS is the last symbol on the data channel.

In some embodiments, the second mapping table may further include a time domain resource of the CSI-RS.

Optionally, an identifier of the last symbol on the data channel is less than or equal to 12.

Optionally, the space domain resource used to map the CSI-RS is determined based on the first parameter set. For a specific description of the process, refer to the description in step 303. Details are not described again.

Optionally, the mapping value on the RE in the resource that is on the data channel of the second terminal device and that is used to map the CSI-RS satisfies: $a_{k,l}^{(p,\mu)}=\beta_{CSIRS}w_f(k')r(m')$. For a specific description of the process, refer to the description in step 303. Details are not described again.

Optionally, m' satisfies:

$$m' = \lfloor n\alpha \rfloor + k'\lceil \rho \rceil + \left\lfloor \frac{\bar{k}\rho}{N_{sc}^{RB}} \right\rfloor.$$

n represents a number of an RB, α is an intermediate variable calculated based on the port quantity and the frequency-domain density that corresponds to the CSI-RS, ⌊ ⌋ represents rounding down, ⌈ ⌉ represents rounding up, ρ represents the frequency-domain density corresponding to the CSI-RS, $\bar{k}$ represents a frequency domain resource starting point of a CDM group, and $N_{sc}^{RB}$ represents a quantity of subcarriers in an RB.

Optionally, if the port quantity is 1, α=ρ; or if the port quantity is greater than 1, α=2ρ.

It should be noted that the frequency-domain density in the formula that satisfies may be a predefined frequency-domain density, a frequency-domain density defined in a standard, or a frequency-domain density negotiated by the first terminal device and the second terminal device through communication. The predefined frequency-domain density may be a frequency-domain density set before delivery of the first terminal device or the second terminal device. The frequency-domain density defined in the standard may be a frequency-domain density specified in a protocol or the standard.

Optionally, the CSI-RS and the PSSCH have a same bandwidth.

Step 2004: The second terminal device determines the first parameter set based on the port quantity.

For a specific process of step 2004, refer to the process of determining, by the first terminal device, the first parameter set based on the port quantity in step 2002. Details are not described again.

Step 2005: The second terminal device determines, based on the first parameter set, the resource that is on the data channel of the second terminal device and that is used to map the CSI-RS and the mapping value on the RE in the resource that is on the data channel and that is used to map the CSI-RS.

For a specific process of step 2005, refer to the specific process of determining, by the first terminal device based on the first parameter set, the resource that is on the data channel of the second terminal device and that is used to map the CSI-RS and the mapping value on the RE in the resource that is on the data channel and that is used to map the CSI-RS in step 2003. Details are not described again.

Subsequently, the second terminal device may send the data channel to the first terminal device, and the first terminal device may receive the data channel from the second terminal device, and perform channel estimation based on the resource used to map the CSI-RS and the mapping value on the RE in the resource used to map the CSI-RS.

It should be noted that the first terminal device may first receive the data channel from the second terminal device, and then determine, based on the first parameter set, the resource that is the data channel of the second terminal device and that is used to map the CSI-RS and the mapping value on the RE in the resource that is on the data channel and that is used to map the CSI-RS. Alternatively, the first terminal device may first determine, based on the first parameter set, the resource that is on the data channel of the second terminal device and that is used to map the CSI-RS and the mapping value on the RE in the resource that is on the data channel and that is used to map the CSI-RS, and then receive the data channel from the second terminal device. Alternatively, the first terminal device may determine, based on the first parameter set when receiving the data channel from the second terminal device, the resource that is on the data channel of the second terminal device and that is used to map the CSI-RS and the mapping value on the RE in the resource that is on the data channel and that is used to map the CSI-RS. This is not limited.

It should be noted that an execution sequence between both step 2002 and step 2003 and both step 2004 and step 2005 is not limited in this embodiment of this application. For example, step 2002 and step 2003 may be performed before step 2004 and step 2005; step 2004 and step 2005 may be performed before step 2002 and step 2003; or both step 2002 and step 2003 and both step 2004 and step 2005 may be simultaneously performed.

Based on the method shown in FIG. 20, the second terminal device may send the configuration information to the first terminal device. The configuration information includes the port quantity corresponding to the CSI-RS. After receiving the port quantity corresponding to the CSI-RS, the first terminal device may determine the first parameter set based on the port quantity corresponding to the CSI-RS, and determine, based on the first parameter set, the resource that is on the data channel of the second terminal device and that is used to map the CSI-RS and the mapping value on the RE in the resource that is on the data channel and that is used to map the CSI-RS. In this way, the configuration information does not need to include information such as the frequency-domain density corresponding to the CSI-RS, the CDM type corresponding to the CSI-RS, and a frequency-domain bandwidth corresponding to the CSI-RS, but the first terminal device can also determine the resource that is on the data channel of the second terminal device and that is used to map the CSI-RS and the mapping value on the RE in the resource that is on the data channel and that is used to map the CSI-RS.

Further, optionally, in a first implementation scenario of the method shown in FIG. 20, the configuration information further includes first indication information and/or second indication information. The first indication information may be used to indicate a frequency domain offset. The first terminal device or the second terminal device may determine the first parameter set based on the port quantity and the frequency domain offset. The second indication information may be used to indicate the time domain resource used to map the CSI-RS.

Optionally, if the configuration information further includes the first indication information, the second mapping table may be shown in Table 12.

In Table 12, $k_0$ represents the frequency domain offset. When the port quantity is 1, it may be determined that the first parameter set includes: no CDM, a frequency domain resource starting point $k_0$ of a CDM group, a CDM group number 0, and a frequency domain resource number 0 in the CDM group. When the port quantity is 2, it may be determined that the first parameter set includes: FD-CDM2, the frequency domain resource starting point $k_0$ of the CDM group, the CDM group number 0, and frequency domain resource numbers 0 and 1 in the CDM group. When the port quantity is 4, it may be determined that the first parameter set includes: FD-CDM2, frequency domain resource starting points $k_0$ and $k_0+2$ of the CDM group, CDM group numbers 0 and 1, and the frequency domain resource numbers 0 and 1 in the CDM group.

TABLE 12

| Port quantity | CDM type | $\bar{k}$ | CDM group number | Frequency domain resource number in a CDM group |
|---|---|---|---|---|
| 1 | No CDM | $k_0$ | 0 | 0 |
| 2 | FD-CDM2 | $k_0$ | 0 | 0 and 1 |
| 4 | FD-CDM2 | $k_0$ and $k_0+2$ | 0 and 1 | 0 and 1 |

In some embodiments, as shown in Table 13, the second mapping table may show a mapping relationship that is between the port quantity and the first parameter set and that corresponds when the port quantities are 1 and 2.

TABLE 13

| Port quantity | CDM type | $\bar{k}$ | CDM group number | Frequency domain resource number in a CDM group |
|---|---|---|---|---|
| 1 | No CDM | $k_0$ | 0 | 0 |
| 2 | FD-CDM2 | $k_0$ | 0 | 0 and 1 |

In some embodiments, the second mapping table may further include the frequency-domain density. For example, the frequency-domain density is 1 RE/port/RB. The second mapping table may alternatively be shown in Table 14.

TABLE 14

| Port quantity | Frequency-domain density (RE/port/RB) | CDM type | $\bar{k}$ | CDM group number | Frequency domain resource number in a CDM group |
|---|---|---|---|---|---|
| 1 | 1 | No CDM | $k_0$ | 0 | 0 |
| 2 | 1 | FD-CDM2 | $k_0$ | 0 | 0 and 1 |
| 4 | 1 | FD-CDM2 | $k_0$ and $k_0+2$ | 0 and 1 | 0 and 1 |

In some embodiments, the second mapping table may further show a mapping relationship that is between both the port quantity and the frequency-domain density and the first parameter set and that corresponds when the port quantities are 1 and 2. When the frequency-domain density is 1 RE/port/RB, the second mapping table may alternatively be shown in Table 15.

TABLE 15

| Port quantity | Frequency-domain density (RE/port/RB) | CDM type | $\bar{k}$ | CDM group number | Frequency domain resource number in a CDM group |
|---|---|---|---|---|---|
| 1 | 1 | No CDM | $k_0$ | 0 | 0 |
| 2 | 1 | FD-CDM2 | $k_0$ | 0 | 0 and 1 |

It should be noted that Table 12 to Table 15 are merely examples of the second mapping table. During actual application, the second mapping table may alternatively include a row or several rows in the tables, all in the tables, more rows than those shown in the tables, several columns in the tables, or more columns than those shown in the tables. This is not limited.

Optionally, the first indication information includes a bitmap, and the bitmap is used to indicate the frequency domain offset.

For example, the second mapping table shown in Table 12 is used as an example. When the port quantity is 1, the bitmap may include twelve bits (for example, the bitmap may be $[b_{11}, b_{10}, \ldots, b_0]$). When the port quantity is 2, the bitmap may include six bits (for example, the bitmap may be $[b_5, b_4, \ldots, b_0]$). When the port quantity is 4, the bitmap may include three bits (for example, the bitmap may be $[b_2, b_1, b_0]$).

In a possible implementation, the frequency domain offset $k_0$ is a product of the port quantity and a location identifier of the first element whose value is 1 in the bitmap.

For example, the port quantity is 2, and the bitmap is $[b_5, b_4, b_3, b_2, b_1, b_0]=[0, 0, 0, 0, 1, 0]$. The first terminal device or the second terminal device may determine that the location identifier of the first element whose value is 1 in the bitmap is 1, thereby determining that the frequency domain offset $k_0$ is 2. The first terminal device or the second terminal device may learn, through table lookup based on the port quantity 2, that the first parameter set includes: FD-CDM2, the frequency domain resource starting point 2 of the CDM group, the CDM group number 0, and the frequency domain resource numbers 0 and 1 in the CDM group.

In a possible implementation, the second indication information includes the number of the time domain resource used to map the CSI-RS.

In some embodiments, the second mapping table may further include the time domain resource number of the CSI-RS. Optionally, the number of the time domain resource used to map the CSI-RS is greater than or equal to 0 and less than or equal to 12.

Optionally, if the network device sends the configuration information to the first terminal device, the configuration information is carried in RRC signaling.

For example, the network device sends the RRC signaling to the first terminal device, and the RRC signaling may include the configuration information. In the RRC signaling, a CSI-RS-ResourceMapping IE may be used to indicate CSI-RS resource mapping. A design of the CSI-RS-ResourceMapping IE may be shown as follows:

```
CSI-RS-ResourceMapping ::= SEQUENCE{
    frequencyDomainAllocation    CHOICE{
    row1                         BIT STRING (SIZE (12)),
    row2                         BIT STRING (SIZE (6)),
    row3                         BIT STRING (SIZE (3)),
    },
```

```
    nrofPorts                    ENUMERATED {p1, p2, P4},
    firstOFDMSymbolInTimeDomain  INTEGER (0..12),
    ...
}
``` frequencyDomainAllocation may be used to indicate the bitmap, and a size of the bitmap may be 12 bits, six bits, or three bits. nrofPorts may be used to indicate the port quantity, and the port quantity may be 1, 2, or 4. firstOFDMSymbolInTimeDomain may be used to indicate the time domain resource used to map the CSI-RS.

When the port quantity is 1 or 2, a design of the CSI-RS-ResourceMapping IE may alternatively be shown as follows:

```
CSI-RS-ResourceMapping ::= SEQUENCE{
    frequencyDomainAllocation    CHOICE{
        row1                     BIT STRING (SIZE (12)),
        row2                     BIT STRING (SIZE (6)),
    },
    nrofPorts                    ENUMERATED {p1, p2},
    firstOFDMSymbolInTimeDomain  INTEGER (0..12),
    ...
}
``` frequencyDomainAllocation may be used to indicate the bitmap, and a size of the bitmap may be 12 bits or six bits. nrofPorts may be used to indicate the port quantity, and the port quantity may be 1 or 2. firstOFDMSymbolInTimeDomain may be used to indicate the time domain resource used to map the CSI-RS.

When the configuration information does not include the second indication information and the port quantity is 1, 2, or 4, a design of the CSI-RS-ResourceMapping IE may alternatively be shown as follows:

```
CSI-RS-ResourceMapping ::= SEQUENCE{
    frequencyDomainAllocation    CHOICE{
        row1                     BIT STRING (SIZE (12)),
        row2                     BIT STRING (SIZE (6)),
        row3                     BIT STRING (SIZE (3)),
    },
    nrofPorts                    ENUMERATED {p1, p2, P4},
    ...
}
``` frequencyDomainAllocation may be used to indicate the bitmap, and a size of the bitmap may be 12 bits, six bits, or three bits. nrofPorts may be used to indicate the port quantity, and the port quantity may be 1, 2, or 4.

When the configuration information does not include the second indication information and the port quantity is 1 or 2, a design of the CSI-RS-ResourceMapping IE may alternatively be shown as follows:

```
CSI-RS-ResourceMapping ::= SEQUENCE{
    frequencyDomainAllocation    CHOICE{
        row1                     BIT STRING (SIZE (12)),
        row2                     BIT STRING (SIZE (6)),
    },
    nrofPorts                    ENUMERATED {p1, p2},
    ...
}
``` frequencyDomainAllocation may be used to indicate the bitmap, and a size of the bitmap may be 12 bits or six bits. nrofPorts may be used to indicate the port quantity, and the port quantity may be 1 or 2. Optionally, if the second terminal device sends the configuration information to the first terminal device, the configuration information is carried in PC5 RRC signaling.

For example, the second terminal device sends the PC5 RRC signaling to the first terminal device, where the PC5 RRC signaling may include the configuration information. In the PC5 RRC signaling, an SL-CSI-RS-ResourceMapping IE may be used to indicate CSI-RS resource mapping. A design of the SL-CSI-RS-ResourceMapping IE may be shown as follows:

```
SL-CSI-RS-ResourceMapping ::= SEQUENCE{
    frequencyDomainAllocation    CHOICE{
        row1                     BIT STRING (SIZE (12)),
        row2                     BIT STRING (SIZE (6)),
        row3                     BIT STRING (SIZE (3)),
    },
    nrofPorts                    ENUMERATED {p1, p2, P4},
    firstOFDMSymbolInTimeDomain  INTEGER (0..12),
    ...
}
``` frequencyDomainAllocation may be used to indicate the bitmap, and a size of the bitmap may be 12 bits, six bits, or three bits. nrofPorts may be used to indicate the port quantity, and the port quantity may be 1, 2, or 4. firstOFDMSymbolInTimeDomain may be used to indicate the time domain resource used to map the CSI-RS.

When the port quantity is 1 or 2, a design of the SL-CSI-RS-ResourceMapping IE may alternatively be shown as follows:

```
SL-CSI-RS-ResourceMapping ::= SEQUENCE{
    frequencyDomainAllocation    CHOICE{
        row1                     BIT STRING (SIZE (12)),
        row2                     BIT STRING (SIZE (6)),
    },
    nrofPorts                    ENUMERATED {p1, p2},
    firstOFDMSymbolInTimeDomain  INTEGER (0..12),
    ...
}
``` frequencyDomainAllocation may be used to indicate the bitmap, and a size of the bitmap may be 12 bits or six bits. nrofPorts may be used to indicate the port quantity, and the port quantity may be 1 or 2. firstOFDMSymbolInTimeDomain may be used to indicate the time domain resource used to map the CSI-RS.

When the configuration information does not include the second indication information and the port quantity is 1, 2, or 4, a design of the SL-CSI-RS-ResourceMapping IE may alternatively be shown as follows:

```
SL-CSI-RS-ResourceMapping ::= SEQUENCE{
    frequencyDomainAllocation    CHOICE{
        row1                     BIT STRING (SIZE (12)),
        row2                     BIT STRING (SIZE (6)),
        row3                     BIT STRING (SIZE (3)),
    },
    nrofPorts                    ENUMERATED {p1, p2, P4},
    ...
}
``` frequencyDomainAllocation may be used to indicate the bitmap, and a size of the bitmap may be 12 bits, six bits, or three bits. nrofPorts may be used to indicate the port quantity, and the port quantity may be 1, 2, or 4.

When the configuration information does not include the second indication information and the port quantity is 1 or 2, a design of the SL-CSI-RS-ResourceMapping IE may alternatively be shown as follows:

```
SL-CSI-RS-ResourceMapping ::= SEQUENCE{
    frequencyDomainAllocation   CHOICE{
        row1                    BIT STRING (SIZE (12)),
        row2                    BIT STRING (SIZE (6)),
    },
    nrofPorts                   ENUMERATED {p1, p2},
    ...
}
``` frequencyDomainAllocation may be used to indicate the bitmap, and a size of the bitmap may be 12 bits or six bits. nrofPorts may be used to indicate the port quantity, and the port quantity may be 1 or 2. Based on the first implementation scenario of the method shown in FIG. 20, the configuration information further includes the first indication information and the second indication information. The first indication information is used to indicate the frequency domain offset, and the second indication information is used to indicate the time domain resource used to map the CSI-RS. The first terminal device or the second terminal device may determine the first parameter set based on the port quantity and the frequency domain offset, so that the first terminal device or the second terminal device determines, based on the first parameter set, the resource that is on the data channel of the second terminal device and that is used to map the CSI-RS and the mapping value on the RE in the resource that is on the data channel and that is used to map the CSI-RS.

Figure 21:
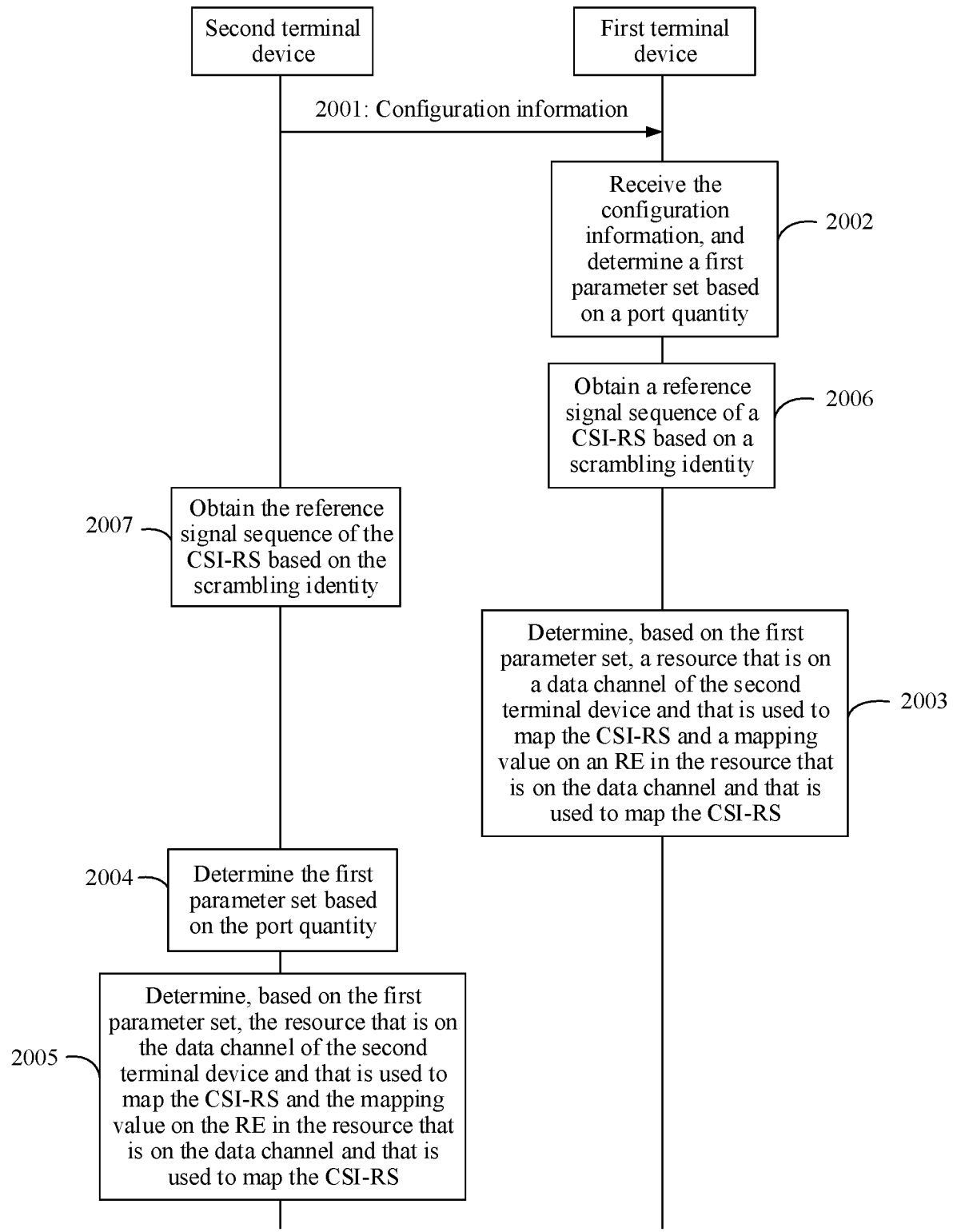
FIG. 21 is a schematic flowchart 4 of a method for determining CSI-RS resource mapping according to an embodiment of this application.

Further, optionally, in a second implementation scenario of the method shown in FIG. 20, as shown in FIG. 21, a method shown in FIG. 21 further includes step 2006 and step 2007.

Step 2006: The first terminal device obtains a reference signal sequence of the CSI-RS based on a scrambling identity.

For a specific process of step 2006, refer to the description in step 306. Details are not described again.

Step 2007: The second terminal device obtains the reference signal sequence of the CSI-RS based on the scrambling identity.

For a specific process of step 2007, refer to the process of obtaining, by the first terminal device, the reference signal sequence of the CSI-RS based on the scrambling identity in step 306. Details are not described again.

It should be noted that step 2006 is performed before step 2003, and step 2007 is performed before step 2005. An execution sequence of step 2006 and step 2007 in the method shown in FIG. 21 is not limited in this embodiment of this application. For example, step 2006 may be performed before step 2002 and after step 2001, and step 2007 may be performed before step 2001.

Based on the second implementation scenario of the method shown in FIG. 20, the first terminal device or the second terminal device may obtain the reference signal sequence of the CSI-RS based on the scrambling identity. Subsequently, the first terminal device or the second terminal device may determine, based on the reference signal sequence of the CSI-RS, the mapping value on the RE in the resource that is on the data channel of the second terminal device and that is used to map the CSI-RS.

The foregoing mainly describes the solutions provided in the embodiments of this application from a perspective of interaction between the network elements. It may be understood that, to implement the foregoing functions, the first terminal device or the second terminal device includes corresponding hardware structures and/or software modules for performing the functions. A person skilled in the art should be easily aware that, in combination with units and algorithm operations of the examples described in the embodiments disclosed in this specification, this application can be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the first terminal device or the second terminal device based on the foregoing method examples. For example, each function module may be obtained through division corresponding to each function, or two or more functions may be integrated in one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 22:
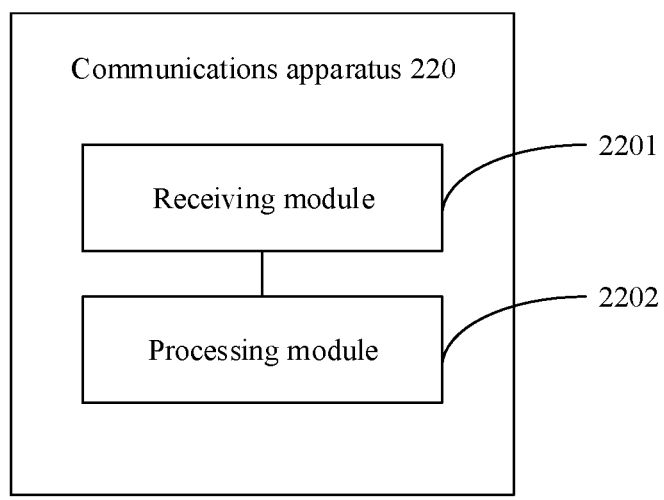
FIG. 22 is a schematic structural diagram 9 of a communications apparatus according to an embodiment of this application.

For example, when the function modules are obtained through division in an integrated manner, FIG. 22 is a schematic structural diagram of a communications apparatus 220. The communications apparatus 220 may be a first terminal device, a chip or a system on a chip in a first terminal device, another combined component or part that can implement functions of the foregoing terminal device, or the like. The communications apparatus 220 may be configured to perform functions of the first terminal device in the foregoing embodiments.

In a possible implementation, the communications apparatus 220 shown in FIG. 22 includes a receiving module 2201 and a processing module 2202.

The receiving module 2201 is configured to receive configuration information from a second terminal device or a network device, where the configuration information includes a port quantity corresponding to a channel state information reference signal.

The processing module 2202 is configured to determine a first parameter set based on the port quantity, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group.

The processing module 2202 is further configured to determine, based on the first parameter set, a resource that is on a data channel of the second terminal device and that is used to map the channel state information reference signal and a mapping value on a resource element RE in the resource that is on the data channel and that is used to map the channel state information reference signal.

Optionally, the receiving module 2201 is further configured to: receive the data channel from the second terminal device, and perform channel estimation based on the resource used to map the channel state information reference signal and the mapping value on the RE in the resource used to map the channel state information reference signal.

Optionally, the processing module 2202 is specifically configured to: the mapping value on the RE in the resource that is on the data channel of the second terminal device and that is used to map the channel state information reference signal satisfies: $a_{k,l}^{(p,\mu)} = \beta_{CSIRS} w_f(k') r(m')$, where $a_{k,l}^{(p,\mu)}$ represents a mapping value on an RE corresponding to a time domain resource number l, a frequency domain resource number k, a space domain resource number p, and a sub-carrier spacing number µ, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m') represents a value of an $m'_{th}$ element in a reference signal sequence of the channel state information reference signal, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of a resource block RB, α is an intermediate variable calculated based on the port quantity and a frequency-domain density that corresponds to the channel state information reference signal, $\lfloor\ \rfloor$ represents rounding down, $\lceil\ \rceil$ represents rounding up, ρ represents the frequency-domain density, $\bar{k}$ represents a frequency domain resource starting point of the code division multiplexing group, and $N_{sc}^{RB}$ represents a quantity of subcarriers in an RB.

Optionally, the processing module 2202 is further configured to maintain a second mapping table, where the second mapping table includes a mapping relationship between at least one port quantity and at least one first parameter set. The processing module 2202 is further specifically configured to obtain the first parameter set through table lookup based on the port quantity.

Optionally, the configuration information further includes first indication information, and the first indication information is used to indicate a frequency domain offset. The processing module 2202 is further specifically configured to determine the first parameter set based on the port quantity and the frequency domain offset.

Optionally, the resource used to map the channel state information reference signal includes a frequency domain resource used to map the channel state information reference signal, a time domain resource used to map the channel state information reference signal, and a space domain resource used to map the channel state information reference signal.

Optionally, the time domain resource used to map the channel state information reference signal is the last symbol on the data channel; or the configuration information further includes second indication information, and the second indication information is used to indicate the time domain resource used to map the channel state information reference signal.

Optionally, the processing module 2202 is further configured to obtain the reference signal sequence of the channel state information reference signal based on a scrambling identity.

Optionally, the configuration information further includes third indication information, and the third indication information is used to indicate the scrambling identity.

Optionally, the receiving module 2201 is further configured to receive control information from the second terminal device, where the control information includes a physical layer source identity and/or a physical layer destination identity; and the processing module 2202 is further configured to determine the physical layer source identity or the physical layer destination identity as the scrambling identity.

Optionally, the receiving module 2201 is further configured to receive control information from the second terminal device; the processing module 2202 is further configured to obtain a cyclic redundancy check code based on the control information; and the processing module 2202 is further configured to use L least significant bits or L most significant bits of the cyclic redundancy check code as the scrambling identity, where L is a positive integer, and L is greater than or equal to 1 and less than or equal to a length of the cyclic redundancy check code.

All related content of the operations in the foregoing method embodiments may be cited in function descriptions of the corresponding function modules. Details are not described herein again.

In this embodiment, the communications apparatus 220 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 220 may be in the form shown in FIG. 2.

For example, the processor 201 in FIG. 2 may invoke the computer-executable instruction stored in the memory 203, so that the communications apparatus 220 performs the method for determining channel state information reference signal resource mapping in the foregoing method embodiments.

For example, functions/implementation processes of the receiving module 2201 and the processing module 2202 in FIG. 22 may be implemented by the processor 201 in FIG. 2 by invoking the computer-executable instruction stored in the memory 203. Alternatively, functions/implementation processes of the processing module 2202 in FIG. 22 may be implemented by the processor 201 in FIG. 2 by invoking the computer-executable instruction stored in the memory 203, and functions/implementation processes of the receiving module 2201 in FIG. 22 may be implemented by the communications interface 204 in FIG. 2.

Because the communications apparatus 220 provided in this embodiment may perform the foregoing method for determining channel state information reference signal resource mapping, for a technical effect that can be achieved by the communications apparatus 220, refer to the foregoing method embodiments. Details are not described herein again.

Figure 23:
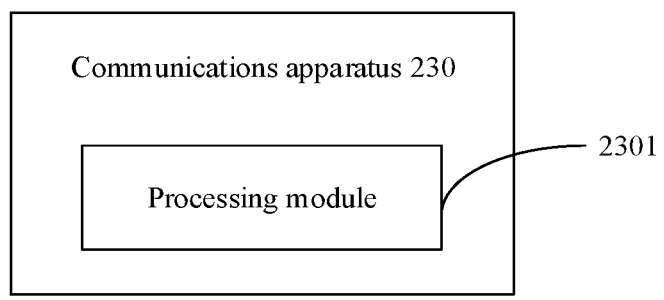
FIG. 23 is a schematic structural diagram 10 of a communications device according to an embodiment of this application.

For example, when the function modules are obtained through division in an integrated manner, FIG. 23 is a schematic structural diagram of a communications apparatus 230. The communications apparatus 230 may be a second terminal device, or a chip or a system on a chip in a second terminal device. The communications apparatus 230 may be configured to perform functions of the second terminal device in the foregoing embodiments.

In a possible implementation, the communications apparatus 230 shown in FIG. 23 includes a processing module 2301.

The processing module 2301 is configured to determine a first parameter set based on a port quantity corresponding to a channel state information reference signal, where the first parameter set includes at least one of the following parameters: a code division multiplexing type corresponding to the channel state information reference signal, at least one code division multiplexing group number, a frequency domain resource starting point of at least one code division multiplexing group, or a frequency domain resource number in a code division multiplexing group.

The processing module 2301 is further configured to determine, based on the first parameter set, a resource that is on a data channel of the communications apparatus and that is used to map the channel state information reference signal and a mapping value on an RE in the resource that is on the data channel and that is used to map the channel state information reference signal.

Figure 24:
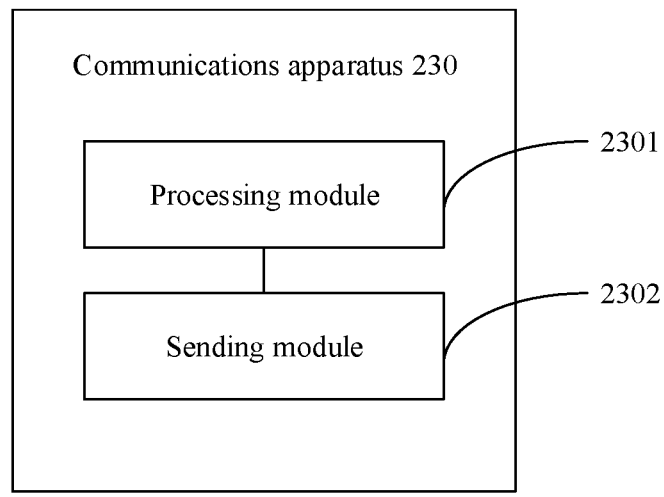
FIG. 24 is a schematic structural diagram 11 of a communications device according to an embodiment of this application.

Optionally, as shown in FIG. 24, the communications apparatus 230 further includes a sending module 2302. The sending module 2302 is configured to send the data channel to the first terminal device.

Optionally, the sending module 2302 is further configured to send configuration information to the first terminal device, where the configuration information includes the port quantity.

Optionally, the processing module 2302 is specifically configured to: the mapping value on the RE in the resource that is on the data channel of the second terminal device and that is used to map the channel state information reference signal satisfies: where $a_{k,l}^{(p,\mu)}$ represents a mapping value on an RE corresponding to a time domain resource number l, a frequency domain resource number k, a space domain resource number p, and a subcarrier spacing number μ, $\beta_{CSIRS}$ represents a power control factor of the channel state information reference signal, $w_f(k')$ represents a value of a $k'_{th}$ element in a code division multiplexing sequence corresponding to a code division multiplexing group on a frequency domain resource, k' represents a frequency domain resource number in the code division multiplexing group, r(m')represents a value of an $m'^{th}$ element in a reference signal sequence of the channel state information reference signal, and m' satisfies:

$$m' = \lfloor n\alpha \rfloor + k'\lceil \rho \rceil + \left\lfloor \frac{\bar{k}\rho}{N_{sc}^{RB}} \right\rfloor,$$

where n represents a number of a resource block RB, α is an intermediate variable calculated based on the port quantity and a frequency-domain density that corresponds to the channel state information reference signal, ⌊ ⌋ represents rounding down, ⌈ ⌉ represents rounding up, ρ represents the frequency-domain density, $\bar{k}$ represents a frequency domain resource starting point of the code division multiplexing group, and $N_{sc}^{RB}$ represents a quantity of subcarriers in an RB.

Optionally, the processing module 2301 is further configured to maintain a second mapping table, where the second mapping table includes a mapping relationship between at least one port quantity and at least one first parameter set. The processing module 2301 is further specifically configured to obtain the first parameter set through table lookup based on the port quantity.

Optionally, the configuration information further includes first indication information, and the first indication information is used to indicate a frequency domain offset. The processing module 2301 is further specifically configured to determine the first parameter set based on the port quantity and the frequency domain offset.

Optionally, the resource used to map the channel state information reference signal includes a frequency domain resource used to map the channel state information reference signal, a time domain resource used to map the channel state information reference signal, and a space domain resource used to map the channel state information reference signal.

Optionally, the time domain resource used to map the channel state information reference signal is the last symbol on the data channel; or the configuration information further includes second indication information, and the second indication information is used to indicate the time domain resource used to map the channel state information reference signal.

Optionally, the processing module 2301 is further configured to obtain the reference signal sequence of the channel state information reference signal based on a scrambling identity.

Optionally, the configuration information further includes third indication information, and the third indication information is used to indicate the scrambling identity.

Optionally, the sending module 2302 is further configured to send control information to the first terminal device, where the control information includes a physical layer source identity and/or a physical layer destination identity; and the processing module 2301 is further configured to determine the physical layer source identity or the physical layer destination identity as the scrambling identity.

Optionally, the sending module 2302 is further configured to send control information to the first terminal device; the processing module 2301 is further configured to obtain a cyclic redundancy check code based on the control information; and the processing module 2301 is further configured to use L least significant bits or L most significant bits of the cyclic redundancy check code as the scrambling identity, where L is a positive integer, and L is greater than or equal to 1 and less than or equal to a length of the cyclic redundancy check code.

All related content of the operations in the foregoing method embodiments may be cited in function descriptions of the corresponding function modules. Details are not described herein again.

In this embodiment, the communications apparatus 230 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 230 may be in the form shown in FIG. 2.

For example, the processor 201 in FIG. 2 may invoke the computer-executable instruction stored in the memory 203, so that the communications apparatus 230 performs the method for determining channel state information reference signal resource mapping in the foregoing method embodiments.

For example, functions/implementation processes of the processing module 2301 and the sending module 2302 in FIG. 24 may be implemented by the processor 201 in FIG.

2 by invoking the computer-executable instruction stored in the memory 203. Alternatively, functions/implementation processes of the processing module 2301 in FIG. 24 may be implemented by the processor 201 in FIG. 2 by invoking the computer-executable instruction stored in the memory 203, and functions/implementation processes of the sending module 2302 in FIG. 24 may be implemented by the communications interface 204 in FIG. 2.

Because the communications apparatus 230 provided in this embodiment may perform the foregoing method for determining channel state information reference signal resource mapping, for a technical effect that can be achieved by the communications apparatus 230, refer to the foregoing method embodiments. Details are not described herein again.

Figure 25:
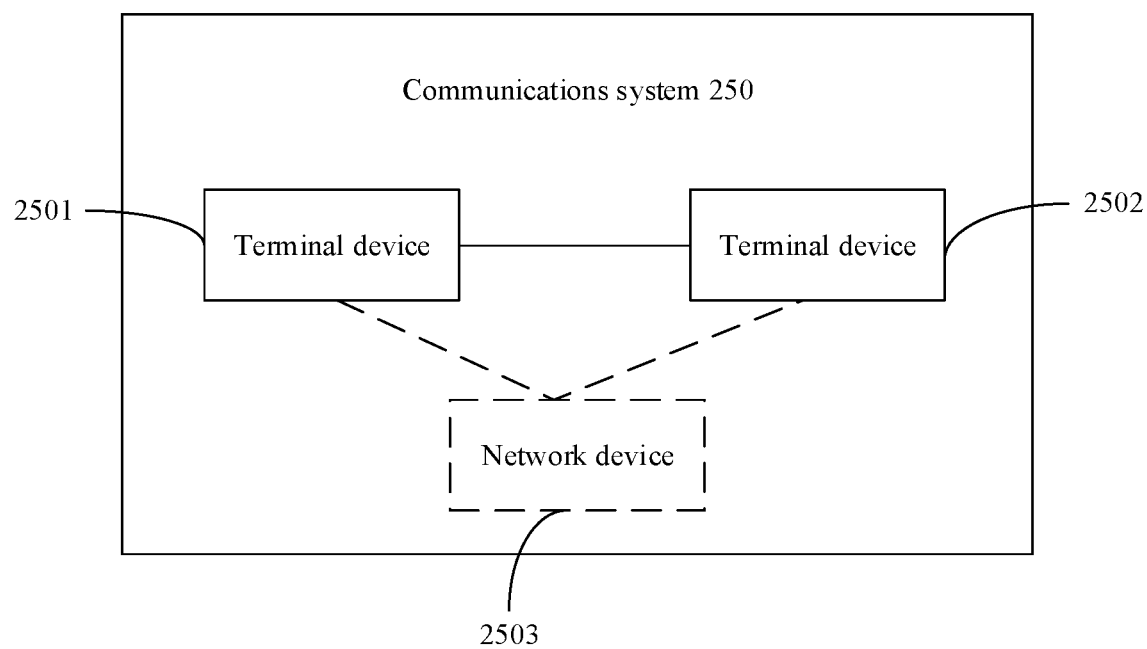
FIG. 25 is a schematic diagram 3 of a communications system according to an embodiment of this application.

FIG. 25 is a schematic composition diagram of a communications system. As shown in FIG. 25, the communications system 250 may include a terminal device 2501 and a terminal device 2502. It should be noted that FIG. 25 is merely an example of an accompanying drawing. Network elements included in the communications system 250 shown in FIG. 25 and a quantity of the network elements are not limited in this embodiment of this application.

The terminal device 2501 has a function of the communications apparatus 220 shown in FIG. 22, and may be configured to: receive a port quantity that corresponds to a CSI-RS and that is sent by the terminal device 2502; determine a first parameter based on the port number; and determine, based on the first parameter set, a resource that is on a data channel of the terminal device 2502 and that is used to map the CSI-RS and a mapping value on an RE in the resource that is on the data channel and that is used to map the CSI-RS.

The terminal device 2502 has a function of the communications apparatus 230 shown in FIG. 23 or FIG. 24, and may be configured to: send the port quantity corresponding to the CSI-RS to the terminal device 2501; determine the first parameter based on the port number; and determine, based on the first parameter set, the resource that is on the data channel of the terminal device 2502 and that is used to map the CSI-RS and the mapping value on the RE in the resource that is on the data channel and that is used to map the CSI-RS.

Optionally, the communications system 250 further includes a network device 2503.

The network device 2503 may be configured to send, to the terminal device 2501 and/or the terminal device 2502, a port quantity corresponding to a CSI-RS.

It should be noted that all related content of the steps in the foregoing method embodiments may be cited in function descriptions of the corresponding network elements in the communications system 250. Details are not described herein again.

By using the foregoing descriptions of the implementations, a person skilled in the art may clearly understand that, for the purpose of convenient and brief description, division into the foregoing function modules is used as an example for description. During actual application, the foregoing functions may be allocated to different function modules and implemented based on a requirement. That is, an inner structure of an apparatus is divided into different function modules to implement all or some of the functions described above.

In the several embodiments provided in this application, it should be understood that the disclosed apparatus and method may be implemented in other manners. For example, the foregoing apparatus embodiment is merely an example.

For example, division into the modules or units is merely logical function division. During actual implementation, another division manner may be used. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit. The integrated unit may be implemented in a form of hardware, or may be implemented in a form of a software functional unit.

If the integrated unit is implemented in the form of a software functional unit and sold or used as an independent product, the integrated unit may be stored in a readable storage medium. Based on such an understanding, the technical solutions in the embodiments of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
receiving, by a first communications apparatus, first information, where the first information is comprised in sidelink control information (SCI);
obtaining, by the first communications apparatus, a cyclic redundancy check (CRC) code based on the first information; and
obtaining, by the first communications apparatus, a reference signal sequence of a channel state information reference signal (CSI-RS) based on a first identity, wherein the first identity is L least significant bits of the CRC code or L most significant bits of the CRC code, and L is a positive integer.

2. The method according to claim 1, wherein the first identity is 10 least significant bits of the CRC code.

3. The method according to claim 1, wherein obtaining the reference signal sequence of the CSI-RS based on the first identity comprises:

obtaining, by the first communications apparatus, an initial value of a pseudo-random sequence based on the first identity; and obtaining, by the first communications apparatus, the reference signal sequence of the CSI-RS based on the initial value of the pseudo-random sequence.

4. The method according to claim 3, wherein the initial value of the pseudo-random sequence satisfies: $c_{init}=(2^L(N_{symb}^{slot}n_{s,f}^{\mu}+l+1)(2n_{ID}+1)+n_{ID})\mod 2^{31}$; and wherein $N_{symb}^{slot}$ is a quantity of symbols of a slot, $n_{s,f}^{\mu}$ is a slot number within a radio frame for a subcarrier spacing configuration $\mu$, l is a symbol number in the slot, $n_{ID}$ is the first identity, and $c_{init}$ is the initial value of the pseudo-random sequence.

5. The method according to claim 1, wherein the first identity is the L least significant bits of the CRC code.

6. The method according to claim 1, wherein the first identity is the L most significant bits of the CRC code.

7. A method, comprising:
sending, by a second communications apparatus, first information, where the first information is comprised in sidelink control information (SCI);

obtaining, by the second communications apparatus, a cyclic redundancy check (CRC) code based on the first information; and obtaining, by the second communications apparatus, a reference signal sequence of channel state information reference signal (CSI-RS) based on a first identity, wherein the first identity is L least significant bits of the CRC code or L most significant bits of the CRC code, and L is a positive integer.

8. The method according to claim 7, wherein the first identity is 10 least significant bits of the CRC code.

9. The method according to claim 7, wherein obtaining the reference signal sequence of the CSI-RS based on the first identity comprises:

obtaining, by the second communications apparatus, an initial value of a pseudo-random sequence based on the first identity; and obtaining, by the second communications apparatus, the reference signal sequence of the CSI-RS based on the initial value of the pseudo-random sequence.

10. The method according to claim 9, wherein the initial value of the pseudo-random sequence satisfies: $c_{init}=(2^L(N_{symb}^{slot}n_{s,f}^{\mu}+l+1)(2n_{ID}+1)+n_{ID})\mod 2^{31}$; and wherein $N_{symb}^{slot}$ is a quantity of symbols of a slot, $n_{s,f}^{\mu}$ is a slot number within a radio frame for a subcarrier spacing configuration $\mu$, l is a symbol number in the slot, $n_{ID}$ is the first identity, and $c_{init}$ is the initial value of the pseudo-random sequence.

11. The method according to claim 7, wherein the first identity is L least significant bits of the CRC code.

12. The method according to claim 7, wherein the first identity is L most significant bits of the CRC code.

13. An apparatus, comprising:
one or more processors; and
one or more memories coupled to the one or more processors and storing programming instructions for execution by the one or more processors, wherein execution of the programming instructions causes the apparatus to perform operations comprising:

receiving first information, where the first information is comprised in sidelink control information (SCI);

obtaining a cyclic redundancy check (CRC) code based on the first information; and obtaining a reference signal sequence of a channel state information reference signal (CSI-RS) based on a first identity, where the first identity is L least significant bits of the CRC code or L most significant bits of the CRC code, and L is a positive integer.

14. The apparatus according to claim 13, wherein the first identity is 10 least significant bits of the CRC code.

15. The apparatus according to claim 13, wherein obtaining the reference signal sequence of the CSI-RS based on the first identity comprises:

obtaining an initial value of a pseudo-random sequence based on the first identity; and obtaining the reference signal sequence of the CSI-RS based on the initial value of the pseudo-random sequence.

16. The apparatus according to claim 15, wherein the initial value of the pseudo-random sequence satisfies: $c_{init}=(2^L(N_{symb}^{slot}n_{s,f}^{\mu}+l+1)(2n_{ID}+1)+n_{ID})\mod 2^{31}$; and wherein $N_{symb}^{slot}$ is a quantity of symbols of a slot, $n_{s,f}^{\mu}$ is a slot number within a radio frame for a subcarrier spacing configuration $\mu$, l is a symbol number in the slot, $n_{ID}$ is the first identity, and $c_{init}$ is the initial value of the pseudo-random sequence.

17. The apparatus according to claim 13, where the first identity is the L least significant bits of the CRC code.

18. The apparatus according to claim 13, where the first identity is the L most significant bits of the CRC code.

19. The apparatus according to claim 13, wherein the first information comprises a physical layer source identity.

20. The apparatus according to claim 13, wherein the first information comprises a physical layer destination identity.

* * * * *